US012080300B2

(12) United States Patent
Fuchs et al.

(10) Patent No.: US 12,080,300 B2
(45) Date of Patent: Sep. 3, 2024

(54) AUDIO ENCODER, AUDIO DECODER, METHOD FOR ENCODING AN AUDIO INFORMATION, METHOD FOR DECODING AN AUDIO INFORMATION AND COMPUTER PROGRAM USING A DETECTION OF A GROUP OF PREVIOUSLY-DECODED SPECTRAL VALUES

(71) Applicant: Fraunhofer-Gesellschaft zur Foerderung der angewandten Forschung e.V., Munich (DE)

(72) Inventors: Guillaume Fuchs, Erlangen (DE); Vignesh Subbaraman, Germering (DE); Nikolaus Rettelbach, Nuremberg (DE); Markus Multrus, Nuremberg (DE); Marc Gayer, Erlangen (DE); Patrick Warmbold, Emskirchen (DE); Christian Griebel, Nuremberg (DE); Oliver Weiss, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/820,990

(22) Filed: Aug. 19, 2022

(65) Prior Publication Data

US 2023/0162742 A1 May 25, 2023

Related U.S. Application Data

(63) Continuation of application No. 15/845,616, filed on Dec. 18, 2017, now Pat. No. 11,443,752, which is a (Continued)

(51) Int. Cl.
*G10L 19/00* (2013.01)
*G10L 19/008* (2013.01)
*G10L 19/02* (2013.01)

(52) U.S. Cl.
CPC ........ *G10L 19/008* (2013.01); *G10L 19/0017* (2013.01); *G10L 19/0208* (2013.01)

(58) Field of Classification Search
CPC ... G10L 19/00; G10L 19/008; G10L 19/0017; G10L 19/0208
See application file for complete search history.

(56) References Cited

U.S. PATENT DOCUMENTS 5,222,189 A 6/1993 Fielder
5,388,181 A 2/1995 Anderson et al.
(Continued)

FOREIGN PATENT DOCUMENTS

CN 1322405 A 11/2001
CN 1377499 A 10/2002
(Continued)

OTHER PUBLICATIONS

Geiger, Ralf, et al. "ISO/IEC MPEG-4 high-definition scalable advanced audio coding." Journal of the Audio Engineering Society 55.1/2 (2007): 27-43. (Year: 2007).*
(Continued)

*Primary Examiner* — Daniel C Washburn
*Assistant Examiner* — Oluwadamilola M Ogunbiyi
(74) *Attorney, Agent, or Firm* — Perkins Coie LLP; Michael A. Glenn

(57) ABSTRACT

An audio decoder for providing a decoded audio information includes a arithmetic decoder for providing a plurality of decoded spectral values on the basis of an arithmetically-encoded representation of the spectral values and a frequency-domain-to-time-domain converter for providing a (Continued)

AUDIO DECODER time-domain audio representation using the decoded spectral values. The arithmetic decoder is configured to select a mapping rule describing a mapping of a code value onto a symbol code in dependence on a context state. The arithmetic decoder is configured to determine or modify the current context state in dependence on a plurality of previously-decoded spectral values. The arithmetic decoder is configured to detect a group of a plurality of previously-decoded spectral values, which fulfill, individually or taken together, a predetermined condition regarding their magnitudes, and to determine the current context state in dependence on a result of the detection.
An audio encoder uses similar principles.

12 Claims, 41 Drawing Sheets

Related U.S. Application Data continuation of application No. 14/083,412, filed on Nov. 18, 2013, now Pat. No. 9,978,380, which is a continuation of application No. 13/450,014, filed on Apr. 18, 2012, now Pat. No. 8,706,510, which is a continuation of application No. PCT/EP2010/065725, filed on Oct. 19, 2010.

(60) Provisional application No. 61/253,459, filed on Oct. 20, 2009.

(56) References Cited

U.S. PATENT DOCUMENTS 5,659,659 A 8/1997 Kolesnik et al.
6,029,126 A 2/2000 Malvar
6,061,398 A 5/2000 Satoh et al.
6,075,471 A 6/2000 Kimura et al.
6,217,234 B1 4/2001 Dewar et al.
6,269,338 B1 7/2001 Bruekers et al.
6,424,939 B1 7/2002 Herre et al.
6,449,596 B1 9/2002 Ejima
6,538,583 B1 3/2003 Hallmark et al.
6,646,578 B1 11/2003 Au
6,704,705 B1 3/2004 Kabal et al.
6,751,641 B1 6/2004 Swanson
6,864,813 B2 3/2005 Horie
7,079,057 B2 7/2006 Kim et al.
7,088,271 B2 8/2006 Marpe et al.
7,132,964 B2 11/2006 Tsuru
7,167,825 B1 1/2007 Poetter
7,197,190 B1 3/2007 Andrew
7,262,721 B2 8/2007 Jeon et al.
7,283,073 B2 10/2007 Chen
7,304,590 B2 12/2007 Park
7,330,139 B2 2/2008 Kim et al.
7,334,129 B1 2/2008 Kamperman et al.
7,365,659 B1 4/2008 Hoffmann et al.
7,447,631 B2 11/2008 Truman et al.
7,516,064 B2 4/2009 Vinton et al.
7,528,749 B2 5/2009 Otsuka
7,528,750 B2 5/2009 Kim et al.
7,554,468 B2 6/2009 Xu
7,577,300 B2 * 8/2009 Hirao .................. H04N 19/647 382/232
7,617,110 B2 11/2009 Kim et al.
7,656,319 B2 2/2010 Yu et al.
7,660,720 B2 2/2010 Oh et al.
7,714,753 B2 5/2010 Lu
7,777,654 B2 8/2010 Chang
7,808,406 B2 10/2010 He et al.
7,821,430 B2 10/2010 Sakaguchi
7,839,311 B2 11/2010 Bao et al.
7,840,403 B2 11/2010 Mehrotra et al.
7,864,083 B2 1/2011 Mahoney
7,903,824 B2 3/2011 Faller et al.
7,932,843 B2 4/2011 Demircin et al.
7,948,409 B2 5/2011 Wu et al.
7,979,271 B2 7/2011 Bessette
7,982,641 B1 7/2011 Su et al.
7,991,621 B2 8/2011 Oh et al.
8,018,996 B2 9/2011 Chiba
8,149,144 B2 4/2012 Mittal et al.
8,224,658 B2 7/2012 Lei et al.
8,301,441 B2 10/2012 Vos
8,321,210 B2 11/2012 Grill et al.
8,340,451 B2 12/2012 Noguchi et al.
8,682,645 B2 3/2014 Taleb et al.
2002/0016161 A1 2/2002 Dellien et al.
2003/0093451 A1 5/2003 Chuang et al.
2003/0206582 A1 11/2003 Srinivasan et al.
2004/0002854 A1 1/2004 Ha
2004/0044527 A1 3/2004 Thumpudi et al.
2004/0044534 A1 3/2004 Chen et al.
2004/0114683 A1 6/2004 Schwarz et al.
2004/0184544 A1 9/2004 Kondo et al.
2005/0015249 A1 * 1/2005 Mehrotra ................ G10L 19/24 704/E19.017
2005/0050202 A1 3/2005 Aiken, Jr. et al.
2005/0088324 A1 4/2005 Fuchigami et al.
2005/0089234 A1 4/2005 Base et al.
2005/0117652 A1 6/2005 Schwarz et al.
2005/0192799 A1 9/2005 Kim et al.
2005/0203731 A1 9/2005 Oh et al.
2005/0210255 A1 9/2005 Kirovski
2005/0231396 A1 10/2005 Dunn
2005/0289063 A1 12/2005 Lecomte et al.
2006/0028359 A1 2/2006 Kim et al.
2006/0047704 A1 3/2006 Gopalakrishnan
2006/0053004 A1 3/2006 Ceperkovic et al.
2006/0173675 A1 8/2006 Ojanpera et al.
2006/0232452 A1 10/2006 Cha
2006/0238386 A1 * 10/2006 Huang .................. G10L 19/008 704/E19.044
2006/0284748 A1 12/2006 Kim et al.
2007/0016404 A1 1/2007 Kim et al.
2007/0016405 A1 1/2007 Mehrotra et al.
2007/0016427 A1 1/2007 Thumpudi et al.
2007/0036228 A1 2/2007 Tseng
2007/0094027 A1 4/2007 Vasilache
2007/0112521 A1 * 5/2007 Akimov .................. E21B 47/12 702/6
2007/0112565 A1 5/2007 Kim et al.
2007/0126853 A1 6/2007 Ridge et al.
2007/0183491 A1 8/2007 Pearson et al.
2007/0192087 A1 8/2007 Kim et al.
2007/0282603 A1 12/2007 Bessette
2008/0094259 A1 4/2008 Yu et al.
2008/0133223 A1 6/2008 Son et al.
2008/0221907 A1 9/2008 Pang et al.
2008/0243518 A1 10/2008 Oraevsky et al.
2008/0255856 A1 10/2008 Schuijers et al.
2008/0258947 A1 10/2008 Wilson et al.
2008/0262855 A1 10/2008 Mehrotra et al.
2008/0266151 A1 * 10/2008 Sankaran ............. H04N 19/423 341/107
2008/0267513 A1 10/2008 Sankaran
2009/0048852 A1 2/2009 Burns et al.
2009/0074052 A1 3/2009 Fukuhara et al.
2009/0085779 A1 4/2009 Tsao et al.
2009/0157785 A1 6/2009 Reznik et al.
2009/0190780 A1 7/2009 Nagaraja et al.
2009/0192790 A1 7/2009 El-maleh et al.
2009/0192791 A1 7/2009 El-maleh et al.
2009/0196355 A1 8/2009 Kao et al.
2009/0234644 A1 9/2009 Reznik et al.
2009/0299756 A1 12/2009 Davis et al.
2009/0299757 A1 12/2009 Guo et al.
2010/0007534 A1 1/2010 Girardeau, Jr.
2010/0070284 A1 3/2010 Oh et al.
2010/0088090 A1 * 4/2010 Ramabadran ....... G10L 19/0017 704/223

(56) References Cited

U.S. PATENT DOCUMENTS

| | | | | |
|---|---|---|---|---|
| 2010/0111432 | A1* | 5/2010 | Mohr | H04N 19/91 382/247 |
| 2010/0217607 | A1 | 8/2010 | Neuendorf et al. | |
| 2010/0256980 | A1 | 10/2010 | Oshikiri et al. | |
| 2010/0262420 | A1 | 10/2010 | Herre et al. | |
| 2010/0324912 | A1 | 12/2010 | Choo et al. | |
| 2010/0332221 | A1 | 12/2010 | Yamanashi et al. | |
| 2011/0116542 | A1 | 5/2011 | Oger et al. | |
| 2011/0137661 | A1 | 6/2011 | Morii et al. | |
| 2011/0153333 | A1 | 6/2011 | Bessette et al. | |
| 2011/0173007 | A1 | 7/2011 | Multrus et al. | |
| 2011/0238426 | A1 | 9/2011 | Fuchs et al. | |
| 2011/0320196 | A1 | 12/2011 | Choo et al. | |
| 2012/0033886 | A1 | 2/2012 | Balster et al. | |
| 2012/0069899 | A1 | 3/2012 | Mehrotra et al. | |
| 2012/0195375 | A1 | 8/2012 | Wuebbolt | |
| 2012/0207400 | A1 | 8/2012 | Sasai et al. | |
| 2012/0215525 | A1 | 8/2012 | Jiang et al. | |
| 2012/0245947 | A1 | 9/2012 | Neuendorf et al. | |
| 2012/0265540 | A1 | 10/2012 | Fuchs et al. | |
| 2012/0278086 | A1 | 11/2012 | Fuchs et al. | |
| 2012/0330670 | A1 | 12/2012 | Fuchs et al. | |
| 2013/0010983 | A1 | 1/2013 | Disch et al. | |
| 2013/0013301 | A1 | 1/2013 | Subbaraman et al. | |
| 2013/0013322 | A1 | 1/2013 | Fuchs et al. | |
| 2013/0013323 | A1 | 1/2013 | Subbaraman et al. | |
| 2013/0226594 | A1 | 8/2013 | Fuchs et al. | |
| 2013/0282383 | A1* | 10/2013 | Hedelin | G10L 19/032 704/500 |
| 2014/0081645 | A1 | 3/2014 | Fuchs et al. | |

FOREIGN PATENT DOCUMENTS

| | | | |
|---|---|---|---|
| CN | 1681213 | A | 10/2005 |
| CN | 101015216 | A | 8/2007 |
| CN | 101160618 | A | 4/2008 |
| CN | 101460997 | A | 6/2009 |
| CN | 101548316 | A | 9/2009 |
| CN | 101601087 | A | 12/2009 |
| EP | 1111589 | A1 | 6/2001 |
| EP | 1883067 | A1 | 1/2008 |
| EP | 1439524 | B1 | 4/2009 |
| EP | 2077550 | A1 | 7/2009 |
| JP | 2001119302 | A | 4/2001 |
| JP | 2003255999 | A | 9/2003 |
| JP | 2005223533 | A | 8/2005 |
| JP | 2006054877 | A | 2/2006 |
| JP | 2007295599 | A | 11/2007 |
| JP | 2008506987 | A | 3/2008 |
| JP | 2009518934 | A | 5/2009 |
| JP | 2013507808 | A | 3/2013 |
| JP | 2013508762 | A | 3/2013 |
| KR | 20080093994 | A | 10/2008 |
| RU | 2178618 | C2 | 1/2002 |
| RU | 2185024 | C2 | 7/2002 |
| RU | 2197776 | C2 | 1/2003 |
| RU | 2214047 | C2 | 10/2003 |
| RU | 2251819 | C2 | 5/2005 |
| RU | 2289858 | C2 | 12/2006 |
| RU | 2335809 | C2 | 10/2008 |
| RU | 2007140383 | A | 5/2009 |
| TW | 200537436 | A | 11/2005 |
| TW | 200727729 | A | 7/2007 |
| TW | 200746871 | A | 12/2007 |
| TW | 200818123 | A | 4/2008 |
| TW | I302664 | B | 11/2008 |
| TW | 200935403 | A | 8/2009 |
| TW | 200947419 | A | 11/2009 |
| WO | 03003350 | A1 | 1/2003 |
| WO | 2004028142 | A2 | 4/2004 |
| WO | 2006006936 | A1 | 1/2006 |
| WO | 2007066970 | A1 | 6/2007 |
| WO | 2007/080225 | A1 | 7/2007 |
| WO | 2008131903 | A1 | 11/2008 |
| WO | 2008150141 | A1 | 12/2008 |
| WO | 2009027606 | A1 | 3/2009 |
| WO | 2009133856 | A1 | 11/2009 |
| WO | 2011042366 | A1 | 4/2011 |
| WO | 2011048098 | A1 | 4/2011 |
| WO | 2011048099 | A1 | 4/2011 |
| WO | 2011048100 | A1 | 4/2011 |

OTHER PUBLICATIONS

Geiger, Ralf , et al. , "ISO/IEC MPEG-4 high-definition scalable advanced audio coding", Journal of the Audio Engineering Society vol. 55, No. 1/2, , pp. 27-43.

Hoang, Thi Minh Nguyet, et al. , "Embedded transform coding of audio signals by model-based bit plane coding", IEEE International Conference on Acoustics, Speech and Signal Processing. IEEE, Mar. 2008, pp. 4013-4016. (Year: 2008) , Mar. 2008.

Imm, Eunju , et al. , "Lossless Coding of Audio Spectral Coeeficients using Selective Bitplane Coding", Proc. 9th Int'l Symposium on Communications and Information Technology, IEEE, Sep. 2009, pp. 525-530. , pp. 525-530.

ISO/IEC 14496-3:2005(E) , "Subpart 4: General Audio Coding (GA)—AAC, TwinVQ, BSAC", 2005, pp. 1-344. , Dec. 2005 , pp. 1-344.

Lu, Min , et al. , "Dual-mode switching used for unified speech and audio codec", Int'l Conference on Audio Language and Image Processing 2010 (ICALIP) , pp. 700-704.

Meine, Nikolaus , et al. , "Improved Quantization and Lossless Coding for Subband Audio Coding", 118th AES Convention, vol. 1-4, XP040507276, May 2005, pp. 1-9. , pp. 1-9.

Neuendorf, M. , et al. , "Unified Speech and Audio Coding Scheme for High Quality at Low Bitrates", IEEE Int'l Conference on Acoustics, Speech and Signal Processing , pp. 1-4.

Neuendorf, Max , et al. , "A Novel Scheme for Low Bitrate Unified Speech and Audio Coding—MPEG RMO", AES 126th Convention, Paper 7713, Munich, Germany. XP040508995 , 14 pp.

Neuendorf, Max , et al. , "Detailed Technical Description of Reference Model 0 of the CfP on Unified Speech and Audio Coding (USAC)", ISO/IEC JTC1/SC29/WG11, MPEG2008/M15867, Busan, South Korea, Oct. 2008 , 100 pp.

Neuendorf, Max, et al. , "Detailed Technical Description of Reference Model 0 of the CfP on Unified Speech and Audio Coding (USAC)", Int'l Organisation for Standardisation ISO/IEC JTC1/SC29/WG11 Coding of Moving Pictures and Audio, MPEG2008/M15867, Busan, South Korea , 95 pp.

Nunez-Yanez, J. L., et al., "Hardware assisted rate distortion optimization with embedded CABAC accelerator for the H. 264 advanced video codec", IEEE Transactions on Consumer Electronics 52.2, pp. 590-597. (Year: 2006).

Oger, Marie, et al., "Stack-Run Audio Coding", Audio Engineering Society Convention 120. Audio Engineering Society, May 2006, pp. 1-10. (Year: 2006).

Oger, Marie, et al. , "Transform Audio Coding with Arithmetic-Coding Scalar Quantization and Model-Based Bit Allocation", IEEE Int'l Conference on Acoustics, Speech and Signal Processing 2007 (ICASSP 2007); vol. 4 , pp. IV-545-IV-548.

Quackenbush, S. R, et al., "Revised Report on Complexity of MPEG-2 AAC Tools", Quackenbush, et al., "Revised Report on Complexity of MPEG-2 AAC Tools", ISO/IEC JTC1/SC29/WG11 N2957, Melbourne, Oct. 1999 (Based Upon ISO/IEC JTC1/SC29/WG11 N2005, MPEG98, Feb. 1998, San José), pp. 1-17. , Oct. 1999 , 17 pp.

Sayood, K, "Introduction to Data Compression", Sayood, K., "Introduction to Data Compression", Third Edition, Chapter 4 "Arithmetic Coding," 2006, Elsevier Inc., pp. 81-97. , pp. 81-97.

Sayood, K., "Introduction to Data Compression", 3rd edition, Elsevier, Inc., pp. 81-97.

Shin, Sang-Wook, et al., "Designing a unified speech/audio codec by adopting a single channel harmonic source separation module", Acoustics, Speech and Signal Processing, 2008. ICASSP 2008. IEEE International Conference, IEEE, Piscataway, NJ, USA, pp. 185-188.

(56) References Cited

OTHER PUBLICATIONS

Wubbolt, Oliver, "Spectral Noiseless Coding CE: Thomson Proposal", ISO/IEC JTC1/SC29/WG11, MPEG2009/M16953, Xian, China, Oct. 2009, 20 pp.
Yang, Dai Tracy, et al., "High-Fidelity Multichannel Audio Coding", EURASIP Book Series on Signal Processing and Communications. Hindawi Publishing Corporation, 2006, pp. 42-50.
Yu, Rongshan, et al., "Improving coding efficiency for MPEG-4 Audio Scalable Lossless coding", Acoustics, Speech, and Signal Processing, 2005. Proceedings. (ICASSP'05). IEEE International Conference on. vol. 3. IEEE, pp. 169-172.
Yu, Rongshan, et al., "MPEG-4 Scalable to Lossless Audio Coding", 117th AES Convention, Oct. 31, 2004, XP040372512, pp. 1-14.

* cited by examiner

AUDIO ENCODER

AUDIO ENCODER

AUDIO DECODER

AUDIO DECODER

| FIG 2 | |
|---|---|
| FIG 2A | FIG 2B |

```
value_decode ()
{
310 ---> arith_map_context(lg);

    for (i=0; i<lg; i++) {
312a      s = arith_get_context (i,lg,arith_reset_flag,N/2);
          lev0 = lev = s>>24;
          t = s & 0xFFFFFF + 1;
312b      for (j=0;;) {
312ba         pki = arith_get_pk(t+((lev-lev0)<<24))
              cum_freq = table_start_position (pki);
              cfl = table_length (pki);
              m = arith_decode();          use between 1 and 20 bits
                                           of bits acod_m
              if ( m != ARITH_ESCAPE)
                  break;
              lev += 1;
          }

          a = m;

312c      for (l=lev; l>0; l--) {
              cum_freq = arith_cf_r;
              cfl = 2;
              r = arith_decode;            use between 1 and 20 bits
                                           of bits acod_r
              a=a<<1+r;
          }
314 --->      Arith_update_context(a,i,lg);
    }
}
```

312

FIG 3

CONTEXT FOR THE STATE CALCULATION

```
/*Input variables*/
lg /*number of sepctral coefficients to decode in the frame*/
previous_lg /Previous number of spectral lines of the previous frame*/

arith_map_context()
{
    v=w=0

    ratio= ((float)previous_lg)/((float)lg);
    for(j=0; j<lg; j++){
        k = (int) ((float)) ((j)*ratio);
        q[0][v++].c = qs[w+k];
    }

    previous_lg=lg;
}
```

FIG 5A

FIG 5B

```
/*Input variables*/
i  /*Index of the spectral value to decode in the vector*/
lg /*Number of expected quantized coefficients*/
N  /*Number of lines of the transformation*/
ari_reset_flag  /*flag indicating whether the context should be reset*/
/*Output value*/
t  /*Concatenated state index s and predicted bit-plane level lev0*/

arith_get_context()
{
      int a0,c0,c1,c2,c3,c4,c5,c6,lev0,region;

510   if(arith_reset_flag && i==0)
           return(0);
512   if((!arith_reset_flag) && (i!=0)){
           int k;
           int lim_min,lim_max;
512a       int flag=1;
512b       lim_max = i+6;
           if((i+lim_max)>lg-1)
                 lim_max=lg-1-i;
           lim_min = -5;
           if((i+lim_min)<0)
                 lim_min=-i;
512c       for(k=lim_min;k<0;k++)
                 if(q[0][k].c!=0 && q[1][k].c!=0)
                       flag=0; break;
           for(;k<=lim_max;k++)
                 if(q[0][k].c!=0)
                       flag=0; break;
512d       if(flag)
                 return(1);
      }
514   if(i>0){
514a       a0=q[1][i-1];
           c0=ABS(a0);
           lev0=0;
514b       while((a0<-4)||(a0>=4)){
                 a0>>=1;
                 lev0++;
                 c0=4+lev0;
           }
514c       if(c0>7)
                 c0=7;
           if(lev0>3)
                 lev0=3;

514d       if(arith_reset_flag && i==1)
                 return((2+c0)|(lev0<<24));
514e       c4=q[0][i-1].c;
      }
```

<CONTINUED IN FIG 5C>

<CONTINUATION FROM FIG 5B>

```
516      if(i>1){
             c1=q[1][i-2].c;
             lev0=MAX(q[1][i-2].l,lev0);
             c6=q[0][i-2].c;
         }
         if(i>2){
518 ->       lev0=MAX(q[1][i-3].l,lev0);
520          if(i<N/4)
                 region=0;
             else if(i<N /2)
                 region=1;
             else
                 region=2;
         }

522      if(i>3)
             lev0=MAX(q[1][i-4].l,lev0);
524      if(lev0>3)
             lev0=3;
526      if(arith_reset_flag)
             return((10+4*(8*c0+c1)+region)|(lev0<<24));

528 ->   c2=q[0][i].c;
530      if(i<lg-1)
             c3=q[0][i+1].c;
         else
             c3=0;
532      if(i<lg-2)
             c5=q[0][i+2].c;
         else
             c5=0;

534      if(lev0==0)
             if((c2==3 || c3 ==3) &&i==0)
                 lev0=1;

536      if(i==0)
  536a ->    return((249+4*(4*c2+c3)+c5)|(lev0<<24));
         else if(i==1)
  536b ->    return((313+4*(4*(4*(8*c0+c2)+c3)+c4)+c5)|(lev0<<24));
         else
  536c ->    return((4212+4*(4*(4*(4*(4*(4*(8*c0+c2)+c3)+c4)+c1)+c5)+c6)+region)
                     |(lev0<<24));
     }
```

FIG 5C

```
unsigned long get_pk(unsigned long s)
{
    register unsigned long j;
    register long i,i_min,i_max;

    ari_get_pk_call_total++;    -------------optional

    i_min=-1;                                          } 541
    i=i_min;
    i_max=386;
    while((i_max-i_min)>1){                            } 542
542a→   i=i_min+((i_max-i_min)/2);
542b→   j=ari_s_hash[i];
        ari_get_pk_inc++;       -------------optional
        if(s<(j>>8))
            i_max=i;
        else if(s>(j>>8))
            i_min=i;
        else
            return(j&0xFF);
    }
    if(i_max==i){                                      } 543
        j=ari_s_hash[i_min];
        ari_get_pk_inc++;       -------------optional
        if(s==(j>>8))
            return(j&0xFF);
    }
    else{
        j=ari_s_hash[i_max];
        ari_get_pk_inc++;       -------------optional
        if(s==(j>>8))
            return(j&0xFF);
    }
                                                       (541–543: 540)
```

FIG 5D1

| FIG 5D1 | FIG 5D |
| --- | --- |
| FIG 5D2 | |

```
544 {
545 {      i_min=-1;
           i=i_min;
           i_max=224;
546 {      while((i_max-i_min)>1){
546a  -->      i=i_min+((i_max-i_min)/2);
546b  -->      j=ari_gs_hash[i];
               ari_get_pk_inc++;
               if(s<(j>>8))
546c  -->          i_max=i;
               else if(s>(j>>8))
546d  -->          i_min=i;
               else{
                   i_max=i+1;
                   if(i_max>224)
                       i_max=224;
                   break;
               }
           }
547 {      j=ari_gs_hash[i_max];
           ari_get_pk_inc++;          -------------optional
           return(j&0xFF);
       }

       const unsigned short ari_pk_2[2] ={(1<<stat_bits)/2, 0};
```
FIG 5D2
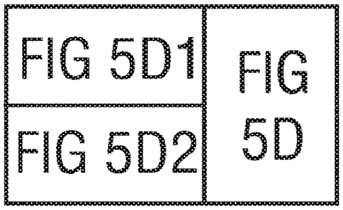

```
/*Input variable*/
s   /*State of the context*/
/*Output value*/
pki /*Index of the probability model */

arith_get_pk(s)
{
      register unsigned long i,j;

    ┌ for (i=0;i<387;i++)
    │ {
550 {       j=ari_s_hash[i];
    │       if ( (j>>8)==s ) return j&255;
    │ }
    ┌ for (i=0;i<225;i++)
    │ {
560 {       j=ari_gs_hash[i];
    │       if ( s<(j>>8) ) return j&255;
    └ }
      return j&255;
}
```

FIG 5E

```
unsigned long get_pk(unsigned long s)
{
      register unsigned longlong j;
      register unsigned long  i;

      for (i=0;i<387;i++)
      {
            j=ari_s_hash[i];
            if ( (j>>8)==s )
                  return j&0xFF;
      }
      for(i=0;i<225;i++){
            j=ari_gs_hash[i];
            if ( s<(j>>8) ) return j&0xFF;
      }
      return(j&0xFF);
}
```

FIG 5F

```
/*helper funtions*/
bool arith_first_symbol(void);
      /* Return TRUE if it is the first symbol of the sequence, FALSE otherwise*/
Ushort arith_get_next_bit(void);
      /* Get the next bit of the bitstream*/

/* global variables */
low
high
value

/* Input variables */
cum_freq[];   /* cumulative frequencies table*/
cfl;          /* length of cum_freq[] */

arith_decode()
{
      if(arith_first_symbol())
      {
            value = 0;
            for (i=1; i<=20; i++)
            {
            value = (val<<1) | arith_get_next_bit();
            }
            low=0;
            high=1048575;
      }

      range = high-low+1;
      cum =((((int64) (value-low+1))<<16)-((int64) 1))/((int64) range);
      p = cum_freq-1;

      do
      {
            q=p+(cfl>>1);
            if ( *q > cum ) {p=q; cfl++; }
            cfl>>=1;
      }
            while ( cfl>1 );
```

570a (brace spanning the if(arith_first_symbol()) block)

570b (brace spanning range / cum / p lines)

570c (brace spanning the do … while loop)

FIG 5G1

| FIG 5G1 | FIG 5G |
|---|---|
| FIG 5G2 | |

```
570d ──► symbol = p-cum_freq+1;
         if(symbol)
570e         high=low+(((int64) range)*((int64)cum_freq[symbol-1]))>>16 - 1;

         low  += (((int64) range)* ((int64) cum_freq[symbol]))>>16;

         for (;;)
         {
         if ( high<524286) { }
             else if ( low>=524286)
             {
                 value -=524286;
                 low -=524286;
                 high -=524286;
570f  570fa  }
             else if ( low>=262143 && high<786429)
             {
                 value -= 262143;
                 low -= 262143;
                 high -= 262143;
             }
         else break;

      570fb  low += low;
             high += high+1;
             value = (value<<1) | arith_get_next_bit();
         }
         return symbol;
     }
```

FIG 5G2

| FIG 5G1 | FIG 5G |
|---|---|
| FIG 5G2 | |

```
/*input variables*/
a /*Decoded quantized spectral coefficient */
i /*Index of the quantized spectral coefficient to decode*/
lg /*number of coefficients in the frame*/

arith_update_context()
{     int a0;

580 ---> q[1][i]=a0=a;
582 {    q[1][i].l=0;
         while(ABS(a0)>4){
               a0=a0>>1;
               q[1][i].l++;
         }
584 {    if(a==0)
               q[1][i].c=0;
         else if(ABS(a)<=1)
               q[1][i].c=1;
         else if(ABS(a)<=3)
               q[1][i].c=2;
         else
               q[1][i].c=3;

586 {    if(i==lg && core_mode==1){
               ratio= ((float) lg)/((float)1024);
               for(j=0; j<1024; j++){
                     k = (int) ((float) j*ratio);
                     qs[j] = q[1][k].c ;
               }
               previous_lg = 1024;
         }
588 {    if(i==lg/4 && core_mode==0){
               for(j=0; j<MIN(lg,1024; j++){
                     qs[j] = q[1][j].c;
               }
               previous_lg = MIN(1024,lg);
         }
}
```

FIG 5H

Definitions

| | |
|---|---|
| a | The quantized coefficient to decode |
| m | The most significant 2-bits wise plane of the quantized spectral coefficient to decode. |
| r | The most significant 2-bits wise plane of the quantized spectral coefficient to decode. |
| lev | Level of the remaining bit-planes. It corresponds to number the bit planes less significant than the most significant 2 bits-wise plane. |
| lev0 | Predicted bit-plane level |
| arith_s_hash[] | Hash table mapping states of the context to a cumulative frequencies table index pki. |
| arith_gs_hash[] | Hash table mapping group of states of context to a cumulative frequencies table index pki. |
| arith_cf_m[pki][9] | Models of the cumulative frequencies for the most significant 2-bits wise plane m and the ARITH_ESCAPE symbol. |
| arith_cf_r [] | Cumulative frequencies for the least significant bit-planes symbol r |
| previous_lg | number of transmitted spectral coefficients previously decoded by the arithmetic decoder |
| N | Window length. For AAC it is deduced from the window_sequence (see section 6.8.3.1) and for TCX N=2.lg. |
| q[2][] | The current context for the spectral coefficient to decode. |
| qs[] | The past context stored for the next frame. |
| arith_reset_flag | Flag which indicates if the spectral noiseless context must be reset. |

FIG 5I

```
usac_raw_data_block ()
{
    single_channel_element (); and/or
    channel_pair_element ();
}
```

FIG 6A

Syntax of single_channel_element()

| Syntax | No. of bits | Mnemonic |
|---|---|---|
| single_channel_element() | | |
| { | | |
|     **core_mode** | 1 | **uimsbf** |
|     if ( core_mode == 1 ) { | | |
|         lpd_channel_stream(); | | |
|     } | | |
|     else { | | |
|         fd_channel_stream(); | | |
|     } | | |
| } | | |

FIG 6B

Syntax of channel_pair_element()

| Syntax | No. of bits | Mnemonic |
|---|---|---|
| channel_pair_element() | | |
| { | | |
| **core_mode0** | **1** | **uimsbf** |
| **core_mode1** | **1** | **uimsbf** |
| ics_info(); optional: common ics_info for two channels | | |
| if ( core_mode0 == 1 ) { | | |
| lpd_channel_stream(); | | |
| } | | |
| else { | | |
| fd_channel_stream(); | | |
| } | | |
| if ( core_mode1 == 1 ) { | | |
| lpd_channel_stream(); | | |
| } | | |
| else { | | |
| fd_channel_stream(); | | |
| } | | |
| } | | |

FIG 6C

Syntax of ics_info()

| Syntax | No. of bits | Mnemonic |
|---|---|---|
| ics_info() | | |
| { | | |
| **window_length;** | 1 | uimsbf |
| if(window_length != 0) { | | |
| **transform_length;** | 1 | uimsbf |
| } | | |
| else { | | |
| transform_length = 0; | | |
| } | | |
| **window_shape;** | 1 | uimsbf |
| if (window_length != 0 && transform_length != 0) { | | |
| **max_sfb;** | 4 | uimsbf |
| **scale_factor_grouping;** | 7 | uimsbf |
| } | | |
| else { | | |
| **max_sfb;** | 6 | uimsbf |
| } | | |
| } | | |

optional

FIG 6D

Syntax of fd_channel_stream()

| Syntax | No. of bits | Mnemonic |
|---|---|---|
| fd_channel_stream() | | |
| { | | |
| **global_gain;** | **8** | **uimsbf** |
| ics_info(); (unless included in channel pair element) | | |
| scale_factor_data (); | | |
| ac_spectral_data (); | | |
| } | | |

FIG 6E

Syntax of ac_spectral_data()

| Syntax | No. of bits | Mnemonic |
|---|---|---|
| ac_spectral_data() | | |
| { | | |
| **arith_reset_flag** | **1** | **uimsbf** |
| for (win=0; win<num_windows; win++){ | | |
| arith_data(num_bands, arith_reset_flag) | | |
| } | | |
| } | | |

FIG 6F

FIG 6G

Syntax of arith_data()

| Syntax | No. of bits | Mnemonic |
| --- | --- | --- |
| Arith_data(lg, arith_reset_flag) | | |
| { | | |
| 660 arith_map_context(lg); | | |
| | | |
| for (i=0; i<lg; i++) { | | |
| s = arith_get_context (i,lg,arith_reset_flag,N/2); | | |
| lev0 = lev = s>>24; | | |
| t = s & 0xFFFFFF + 1; | | |
| for (j=0;;) { | | |
| 662 pki = arith_get_pk(t+((lev-lev0)<<24)) | | |
| 663 **acod_m**[pki][m] | 1..20 | **Vlclbf** |
| 664 if ( m != ARITH_ESCAPE) | | |
| break; | | |
| lev +=1; | | |
| } | | |
| | | |
| a=m; | | |
| for (l=lev; l>0; l--) { | | |
| **acod_r**[r] | 1..20 | **vlclbf** |
| a=a<<1+r; | | |
| } | | |
| 668 Arith_update_context(a,i,lg); | | |
| } | | |
| } | | |

| | |
|---|---|
| **Definitions** | |
| arith_data() | Data element to decode the spectral noiseless coder data |
| **arith_reset_flag** | Flag which indicates if the spectral noiseless context must be reset. |
| **acod _cf_m[pki][a]** | Arithmetic codeword necessary for arithmetic decoding of the most significant 2-bits wise plane a of the quantized spectral coefficient. |
| **arith_cf_r[]** | Arithmetic codeword necessary for arithmetic decoding of the residual bit-planes of the quantized spectral coefficient. |
| **Help elements** | |
| a | The spectral quantized coefficient to decode |
| m | The most significant 2-bits wise plane of the quantized spectral coefficient to decode. |
| r | The most significant 2-bits wise plane of the quantized spectral coefficient to decode. |
| N | Window length. For AAC it is deduced from the window_sequence (see section 6.8.3.1) and for TCX N=2.lg. |
| lg | Number of quantized coefficients to decode. |
| i | Index of the quantized coefficients to decode within the frame. |
| pki | Index of the cumulative frequencies table used by the arithmetic decoder for decoding a. |
| arith_get_pk () | Function that returns the index pki of cumulative frequencies table necessary to decode the codeword **acod _ng[pki][a]**. |
| t | State of context |
| arith_get_context () | Function that returns the state of the context. |
| lev0 | Predicted bit-plane level |
| s | State of the context combined with predicted bit-plane level lev0. |
| lev | Level of bit-planes to decode beyond the most significant 2-bits wise plane. |
| ARITH_ESCAPE | Escape symbol that indicates additional bit-planes to decode beyond the predicted bit-plane level lev0. |

FIG 6H comparison of WD3 noiseless coding with proposed coding scheme context for state calculation,
as used in the proposed scheme

| table name | description | unit of data | memory (words of 32 Bit) |
|---|---|---|---|
| arith_cf_ng_hash[128] | Hash table mapping context to a probability model index. | word | 128 |
| arith_cf_ng[32][545] | Cumulative frequencies of groups for each probability distribution mode ,I | 1/2 word | 8720 |
| egroups[8][8][8][8] | Group index of 4 tuple. | 1/2 word | 2048 |
| dgvectors[4*4096] | Map group index and element index to 4-tuple. | 1/4 word | 4096 |
| dgroups[544] | Map group index to cardinal of the group and offset in dgvectors | word | 544 |
| arith_cf_ne[2701] | Cumulative frequencies of the element index symbol | 1/2 word | 1350.5 |
| arith_cf_r[16] | Cumulative frequencies of least significant bit planes | 1/2 word | 8 |
| **total** | | | **16894.5** |

FIG 11A

TABLES AS USED IN USAC WD4 ARITHMETIC CODING SCHEME

| table name | description | unit of data | memory (words of 32 Bit) |
|---|---|---|---|
| arith_s_hash[387] | Hash table mapping states of the context to a cumulative frequencies table | word | 387 |
| arith_gs_hash[225] | Hash table mapping group of states of context to a cumulative frequencies table | word | 225 |
| arith_cf_m[64][9] | Models of the cumulative frequencies for the most significant 2-bits wise plane m and the ARITH_ESCAPE symbol | 1/2 word | 288 |
| **total** | | | **900** |

FIG 11B

TABLES AS USED IN THE PROPOSED CODING SCHEME

ROM demand noiseless coding scheme as proposed and in WD4 total USAC decoder data ROM demand, WD4 and present proposal average bitrates produced by USAC coder using WD arithmetic coder and new proposal

| operating mode | WD (kbit/s) | new proposal (kbit/s) | difference after transcoding (kbit/s) | difference after transcoding (% of total bitrate) |
|---|---|---|---|---|
| Test 1, 64kbps stereo | 64.00 | 63.34 | -0.66 | -1.04 |
| Test 2, 32kbps stereo | 32.00 | 31.66 | -0.34 | -1.05 |
| Test 3, 24kbps stereo | 24.00 | 23.73 | -0.27 | -1.11 |
| Test 4, 20kbps stereo | 20.00 | 19.78 | -0.22 | -1.11 |
| Test 5, 16kbps stereo | 16.00 | 15.82 | -0.18 | -1.10 |
| Test 6, 24kbps mono | 24.00 | 23.68 | -0.32 | -1.32 |
| Test 7, 20kbps mono | 20.00 | 19.72 | -0.28 | -1.39 |
| Test 8, 16kbps mono | 16.00 | 15.79 | -0.21 | -1.31 |
| Test 9, 12kbps mono | 12.00 | 11.86 | -0.14 | -1.19 |

FIG 13A bitreservoir control for USAC WD3 and new proposal

| operating mode | bitreservoir control | | | | | |
|---|---|---|---|---|---|---|
| | new proposal | | | WD | | |
| | min | max | avg | min | max | avg |
| Test 1, 64kbps stereo | 3653 | 9557 | 8137 | 2314 | 9557 | 7018 |
| Test 2, 32kbps stereo | 1808 | 4505 | 4196 | 581 | 4505 | 3530 |
| Test 3, 24kbps stereo | 1538 | 4704 | 4408 | 957 | 4704 | 3871 |
| Test 4, 20kbps stereo | 2367 | 4864 | 4600 | 712 | 4864 | 3854 |
| Test 5, 16kbps stereo | 2712 | 5006 | 4804 | 724 | 5006 | 4234 |
| Test 6, 24kbps mono | 2185 | 4704 | 4457 | 1002 | 4704 | 3927 |
| Test 7, 20kbps mono | 2599 | 4864 | 4630 | 1192 | 4864 | 3935 |
| Test 8, 16kbps mono | 2820 | 5006 | 4876 | 1434 | 5006 | 4450 |
| Test 9, 12kbps mono | 3529 | 5184 | 5081 | 2256 | 5184 | 4787 |

FIG 13B average bitrates for USAC WD3 and new proposal

| operating mode | average bitrate in kbit/s | | | | | |
|---|---|---|---|---|---|---|
| | new proposal | | | WD | | |
| | FD mode | wLPT mode | total | FD mode | wLPT mode | total |
| Test 1, 64kbps stereo | 53.73 | --- | 53.73 | 54.40 | --- | 54.40 |
| Test 2, 32kbps stereo | 25.31 | 26.34 | 25.60 | 25.80 | 26.61 | 26.02 |
| Test 3, 24kbps stereo | 18.27 | 19.17 | 18.50 | 18.66 | 19.40 | 18.85 |
| Test 4, 20kbps stereo | 15.50 | 15.93 | 15.61 | 15.83 | 16.12 | 15.90 |
| Test 5, 16kbps stereo | 12.45 | 12.60 | 12.52 | 12.80 | 12.73 | 12.77 |
| Test 6, 24kbps mono | 19.94 | 19.51 | 19.73 | 20.41 | 19.42 | 20.15 |
| Test 7, 20kbps mono | 16.15 | 15.91 | 16.08 | 16.56 | 16.12 | 16.45 |
| Test 8, 16kbps mono | 13.02 | 12.59 | 12.81 | 13.45 | 12.73 | 13.09 |
| Test 9, 12kbps mono | 9.35 | 9.66 | 9.51 | 9.68 | 9.71 | 9.70 |

FIG 14 minimum, maximum and average bitrates of USAC on a frame basis

| operating mode | minimum bitrate (kbit/s) | maximum bitrate (kbit/s) | average bitrate (kbit/s) |
|---|---|---|---|
| Test 1, 64kbps stereo | 15.26 | 101.79 | 63.34 |
| Test 2, 32kbps stereo | 13.13 | 48.61 | 31.66 |
| Test 3, 24kbps stereo | 11.69 | 36.58 | 23.73 |
| Test 4, 20kbps stereo | 3.09 | 30.94 | 19.78 |
| Test 5, 16kbps stereo | 4.02 | 26.47 | 15.82 |
| Test 6, 24kbps mono | 1.47 | 37.35 | 23.68 |
| Test 7, 20kbps mono | 1.38 | 31.13 | 19.72 |
| Test 8, 16kbps mono | 11.40 | 24.64 | 15.79 |
| Test 9, 12kbps mono | 8.72 | 18.91 | 11.86 |

FIG 15 best and worst cases on a frame basis

| operating mode | best case | | worst case | |
|---|---|---|---|---|
| | (bit/s) | (%) | (bit/s) | (%) |
| Test 1, 64kbps stereo | -30.87 | -33.06 | 6.14 | 9.07 |
| Test 2, 32kbps stereo | -10.33 | -28.63 | 2.17 | 6.77 |
| Test 3, 24kbps stereo | -11.86 | -30.75 | 1.85 | 7.71 |
| Test 4, 20kbps stereo | -7.45 | -30.27 | 1.67 | 8.36 |
| Test 5, 16kbps stereo | -5.43 | -27.89 | 1.50 | 9.42 |
| Test 6, 24kbps mono | -17.06 | -45.83 | 1.25 | 4.36 |
| Test 7, 20kbps mono | -15.86 | -41.46 | 0.88 | 3.38 |
| Test 8, 16kbps mono | -4.75 | -24.85 | 1.11 | 7.31 |
| Test 9, 12kbps mono | -3.95 | -26.33 | 0.82 | 6.99 |

FIG 16

FIG 17(1)

| FIG 17 | FIG 17(1) |
|---|---|
| | FIG 17(2) |

```
/*
Entropy:
fu mem.: 1.2792 bit (100.00 %)
no mem.  : 1.6289 bit (127.34 %)
split:   : 1.2971 bit (101.40 %)
*/

/*  1224 States, Entropy increase: 0.000384 */

/*Final Entropy : 1.297556 */

/*Total states = 612;*/
/*Signicant states = 387;*/
/*Pseudo states = 225;*/
/*Proba models = 64;*/
unsigned long long ari_get_pk_inc=0;
unsigned long long ari_get_pk_call_total=0;

static unsigned long ari_s_hash[387] = {
0x00000200,0x00000B01,0x00000C02,0x00000D03,0x00000F25,0x0000101C,0x0000110B,
0x00001327,
0x0000142F,0x00002B25,0x00002C22,0x00002D14,0x00002F2D,0x0000302B,0x0000312B,
0x00003330,
0x00003432,0x00003532,0x00004C32,0x00005031,0x00005131,0x0000FA02,0x0000FB01,
0x0000FC1C,
0x0000FE1C,0x0000FF1C,0x0001001E,0x00010A2E,0x00010B25,0x00010E25,0x00010F25,
0x00013938,
0x00013A04,0x00013B02,0x00013C01,0x0010393D,0x00107504,0x00107605,0x00107706,
0x0010790D,
0x00107A07,0x00107B08,0x0010850D,0x00108609,0x0010870A,0x00108B0E,0x0010B50B,
0x0010B60C,
0x0010B70D,0x0010B90B,0x0010BA1D,0x0010BB16,0x0010C615,0x0010C70C,0x0010F521,
0x0010F628,
0x0010F728,0x00110528,0x00117516,0x0011760E,0x0011770F,0x00117A12,0x00117B07,
0x0011870E,
0x0011B514,0x0011B615,0x0011B70C,0x0011B914,0x0011BA15,0x0011BB1D,0x0011C619,
0x0011C715,
0x00147516,0x00147610,0x00147711,0x0014791D,0x00147A0C,0x00147B0E,0x0014851B,
0x00148616,
0x00148707,0x0014890B,0x00148A1D,0x00148B16,0x0014950B,0x0014961D,0x0014B615,
0x0014B71D,
0x0014BA14,0x0014BB15,0x0014C614,0x0014C715,0x0015052D,0x0015750B,0x0015760C,
0x00157710,
0x0015790B,0x00157A1D,0x00157B16,0x0015850B,0x0015861D,0x0015870C,0x00158914,
0x00158A15,
0x00158B1D,0x0015B619,0x0015B714,0x0020751D,0x00207612,0x00207713,0x0020791D,
0x00207A0C,
0x00207B0E,0x0020850B,0x0020860C,0x00208710,0x00208A1D,0x00208B0C,0x0020B615,
0x0020B71D,
0x0021750B,0x0021760C,0x0021770E,0x0021790B,0x00217A1D,0x00217B12,0x00218514,
0x00218615,
0x0021870C,0x0021891C,0x00218A15,0x00218B1D,0x0021B619,0x0021B715,0x0021BA22,
0x0021BB19,
0x00247514,0x0024761D,0x0024770E,0x00247914,0x00247A15,0x00247B0C,0x00248514,
0x0024861D,
0x00248716,0x0024891C,0x00248A15,0x00248B1D,0x0024B619,0x0024B715,0x0025751C,
0x0025760B,
```

```
0x0025771B,0x0025791C,0x00257A0B,0x00257B1B,0x0025851C,0x0025860B,0x0025871B,
0x0025890B,
0x00258A1D,0x00258B1B,0x0025B618,0x0025B722,0x0025BA1F,0x0025BB18,0x0025C61F,
0x0025C718,
0x0025CA1F,0x0025CB1F,0x003A9D1C,0x003A9E0B,0x003A9F0B,0x004FB125,0x004FB21C,
0x004FB31C,
0x00907514,0x00907615,0x00907716,0x00907919,0x00907A15,0x00907B1D,0x00907D1C,
0x00907E1C,
0x00907F14,0x00908522,0x00908614,0x0090871D,0x00908918,0x00908A19,0x00908B14,
0x00908D24,
0x00909523,0x0090961F,0x0090992B,0x0090B517,0x0090B618,0x0090B719,0x0090B91F,
0x0090BA22,
0x0090BB19,0x0090BD1C,0x0090BE1C,0x0090BF1C,0x0090C52B,0x0090C61F,0x0090C718,
0x0090C917,
0x0090CA1F,0x0090CB1F,0x0090CD23,0x0090D52E,0x0090D62C,0x0090D92C,0x0090F52D,
0x0090F62D,
0x0090F72F,0x0090F925,0x0090FA2E,0x0090FB2D,0x0090FD1E,0x0090FE1E,0x0091052F,
0x0091062F,
0x00910928,0x00910D25,0x00917519,0x00917615,0x0091771D,0x00917922,0x00917A14,
0x00917B15,
0x00918619,0x00918714,0x00918A18,0x00918B18,0x0091B618,0x0091B722,0x0091BA18,
0x0091BB18,
0x00947518,0x00947614,0x0094771D,0x0094791F,0x00947A19,0x00947B14,0x00948520,
0x00948619,
0x00948714,0x00948A18,0x00948B18,0x0094B61F,0x0094B718,0x0094BA17,0x0094BB1F,
0x0094C617,
0x0094C717,0x00957520,0x00957622,0x00957714,0x00957924,0x00957A18,0x00957B18,
0x00958524,
0x00958618,0x00958718,0x0095892B,0x00958A17,0x00958B1F,0x0095B52B,0x0095B617,
0x0095B71F,
0x0095B92B,0x0095BA17,0x0095BB17,0x0095C52C,0x0095C617,0x0095C717,0x0095C92C,
0x0095CA2B,
0x0095CB2C,0x00A0751F,0x00A07614,0x00A07715,0x00A0791F,0x00A07A19,0x00A07B14,
0x00A0851F,
0x00A08622,0x00A08714,0x00A08917,0x00A08A18,0x00A08B18,0x00A0B52B,0x00A0B61F,
0x00A0B718,
0x00A0BA17,0x00A0BB1F,0x00A0C617,0x00A0C717,0x00A17524,0x00A17622,0x00A17714,
0x00A17924,
0x00A17A18,0x00A17B18,0x00A1861F,0x00A18718,0x00A18A17,0x00A18B17,0x00A1B617,
0x00A1B71F,
0x00A1BA17,0x00A1BB17,0x00A47524,0x00A47618,0x00A47714,0x00A4792B,0x00A47A18,
0x00A47B18,
0x00A4852B,0x00A4861F,0x00A48718,0x00A4892B,0x00A48A17,0x00A48B17,0x00A4B52C,
0x00A4B617,
0x00A4B717,0x00A4B92C,0x00A4BA17,0x00A4BB17,0x00A4C52E,0x00A4C62B,0x00A4C72B,
0x00A4C92E,
0x00A4CA2C,0x00A4CB2C,0x00A5752C,0x00A57617,0x00A57718,0x00A5792B,0x00A57A17,
0x00A57B1F,
0x00A5852C,0x00A58617,0x00A5871F,0x00A5892C,0x00A58A17,0x00A58B17,0x00A5B52E,
0x00A5B62B,
0x00A5B717,0x00A5B92E,0x00A5BA2C,0x00A5BB2C,0x00A5C52E,0x00A5C62C,0x00A5C72C,
0x00A5C92E,
0x00A5CA2C,0x00A5CB2C,0x00BA9D2D,0x00BA9E2E,0x00BA9F2E,0x00CDD938,0x00CE2D38,
0x00CEE938,
0x00CF2D38,0x00D02D38,0x00D0313A,0x00D0713A,0x0110762F,0x0110B632,0x0110B731,
0x03D0113B,
0x03D0213C,0x03D02D3D,0x03D0313D,0x03D0413C,0x03D04D3D,0x03D0513C,0x03D05D3D,
0x03D06139,
0x03D0693D,0x03D06D3D,0x03D0713D
};
```

FIG 17(2)

| FIG 17 | FIG 17(1) |
|---|---|
| | FIG 17(2) |

```
static unsigned long ari_gs_hash[225] = {
0x00000401,0x0001491A,0x0001590B,0x00017621,0x0001891C,0x0009492A,0x000DFA38,
0x000F6D3D,
0x0010003B,0x0010B21B,0x0011321C,0x00116B29,0x0011B31D,0x00126B1E,0x00136623,
0x00146729,
0x00146F3B,0x0015321F,0x00156E27,0x00163320,0x00182725,0x00186727,0x00196323,
0x001C4721,
0x001E3F30,0x001E433B,0x00203F2A,0x0020463B,0x0020F322,0x00216A2E,0x00226723,
0x00245625,
0x00256724,0x00286625,0x002D3726,0x002D573A,0x00316627,0x00326628,0x00344729,
0x00366628,
0x003D4329,0x00416A2A,0x0042533A,0x00916A2A,0x00926B2B,0x0093E72E,0x00956B2C,
0x009D362D,
0x009D3B39,0x009E4330,0x00A2672E,0x00AD372F,0x01145630,0x01146B27,0x011C8231,
0x01226732,
0x012CC333,0x01413B34,0x019CA335,0x019CB338,0x01ACB736,0x01AD823D,0x01C37F37,
0x02156738,
0x0218AB3B,0x021C9B35,0x021E0738,0x021FB73D,0x0220E335,0x02216B3C,0x02217234,
0x0222B33C,
0x02239B3B,0x0223B23A,0x0224673B,0x0238A739,0x0240B23D,0x024CBF38,0x024CC23D,
0x024D8738,
0x0297AF3A,0x02986727,0x0298A33B,0x0298A738,0x029CAF3B,0x029CC33A,0x02A0AB35,
0x02A3E736,
0x02AC773B,0x02B0B335,0x02B3A73B,0x02C0D73C,0x02C1E735,0x03108E3D,0x03109737,
0x0311D639,
0x03147F3C,0x0314B236,0x0317A639,0x0317D629,0x0317DB33,0x03187627,0x0318AF3B,
0x0318F61A,
0x0319D739,0x031C953B,0x031D633C,0x031FCF39,0x0320873B,0x0320963A,0x03222639,
0x0323833C,
0x03239A27,0x0323EA2F,0x03242631,0x03242B3B,0x03249727,0x0325AB39,0x0327A73C,
0x0327C728,
0x03287727,0x03287E3A,0x03288737,0x032BAA39,0x032C7527,0x032D2337,0x032E9B39,
0x032EA23B,
0x032EBF3C,0x032F7E39,0x0330C63C,0x0332B23B,0x0332F230,0x03339F3B,0x0333EE27,
0x03348F30,
0x0336AB3C,0x0338A73B,0x033A7639,0x033A7F1A,0x033C793B,0x033C9A34,0x033CA33B,
0x033CA738,
0x033D0A3C,0x033DB339,0x033DFF3C,0x033E9739,0x0340CB3C,0x0344573B,0x0344AA3C,
0x0348263B,
0x034C7B3C,0x034CBB3A,0x034CD33C,0x0390B73D,0x0390E937,0x0393653D,0x0394B73B,
0x0394E33D,
0x0394FA38,0x03950A3C,0x0396CF3D,0x03971A36,0x0398673C,0x0398E13B,0x03994E39,
0x039C733B,
0x039D191A,0x039D4536,0x039E053C,0x039E6E3D,0x039E9D34,0x039F8D39,0x03A0C93B,
0x03A67939,
0x03A69D29,0x03A6D637,0x03A85A3C,0x03AE5B3B,0x03AEDB3D,0x03AF2E3C,0x03B0A13B,
0x03B2B139,
0x03B3123B,0x03B36339,0x03B3AD3C,0x03B42E33,0x03B4733B,0x03B4F53C,0x03B51F36,
0x03B59139,
0x03B5CB3C,0x03B61737,0x03B93A3C,0x03B98F39,0x03B9F53C,0x03BA063B,0x03BA2A3C,
0x03BB2739,
0x03BD3B3B,0x03BDC939,0x03BDF534,0x03BF9A39,0x03C1653B,0x03C19E2A,0x03C20527,
0x03C3633B,
0x03C3823C,0x03C3A527,0x03C45A3B,0x03C4993C,0x03C5B23B,0x03C5D527,0x03C9563B,
0x03C9A93C,
0x03CA063B,0x03CB0E3C,0x03CCB53B,0x03CD1E3C,0x03CED23D,0x03CEDF3C,0x03CFFA39,
0x40BC673E,
0xFFFFFF3F
};
```

FIG 18

```
        unsigned short ari_cf_m[64][9] = {
1910 -> {65535,65534,65532,65215,  321,    4,    2,    1,     0}, <- pki=0
1912 -> {65490,65339,64638,58133, 7463,  973,  270,  125,     0}, <- pki=1
        {65530,65509,65319,60216, 5308,  222,   30,    9,     0},      :
        {65534,65528,65470,62535, 3012,   67,    8,    2,     0},
        {65533,65524,65435,62110, 3434,  104,   14,    5,     0},
        {65535,65533,65499,62363, 3173,   37,    3,    1,     0},
        {65535,65534,65522,63164, 2371,   14,    2,    1,     0},
        {65535,65530,65448,59939, 5612,   88,    7,    2,     0},
        {65535,65533,65500,61498, 4044,   38,    3,    1,     0},
        {65535,65530,65444,59855, 5667,   92,    6,    1,     0},
        {65535,65532,65495,61386, 4140,   39,    3,    1,     0},
        {65522,65458,64905,55424,10056,  634,   88,   28,     0},
        {65532,65511,65238,57072, 8457,  297,   27,    6,     0},
        {65534,65522,65364,59096, 6461,  171,   15,    3,     0},
        {65535,65530,65426,59204, 6342,  109,    8,    2,     0},
        {65535,65533,65492,61008, 4512,   43,    3,    1,     0},
        {65535,65529,65417,58998, 6519,  118,    6,    1,     0},
        {65535,65533,65490,60856, 4679,   46,    4,    1,     0},
        {65535,65528,65384,58400, 7127,  149,    9,    1,     0},
        {65535,65532,65483,60544, 4984,   56,    4,    1,     0},
        {65517,65413,64537,53269,12264, 1002,  138,   38,     0},
        {65531,65503,65125,55553, 9985,  420,   37,    7,     0},
        {65534,65518,65303,57889, 7650,  235,   20,    3,     0},
        {65490,65288,63679,49500,15949, 1903,  301,   94,     0},
        {65522,65428,64429,51580,13957, 1113,  114,   22,     0},
        {65526,65447,64600,52808,12743,  937,   93,   17,     0},
        {63814,60228,53108,40709,26294,15412, 8961, 5729,     0},
        {65526,65486,65133,57227, 8244,  400,   58,   20,     0},
        {65500,65346,64297,52845,12477, 1283,  230,   70,     0},
        {65528,65486,65077,56652, 8871,  465,   56,   16,     0},
        {65464,65186,63581,50731,14351, 1992,  396,  128,     0},
        {65489,65278,63861,51225,14185, 1726,  302,   96,     0},
        {65485,65249,63632,50425,14933, 1943,  332,   96,     0},
        {65292,64495,61270,47805,17600, 4502, 1337,  542,     0},
        {65519,65421,64478,52517,12971, 1068,  129,   33,     0},
        {65470,65181,63344,49862,15299, 2233,  418,  132,     0},
        {65472,65197,63407,49933,15445, 2176,  396,  123,     0},
```

FIG 19(1)

<table>
<tr><td rowspan="2">FIG 19</td><td>FIG 19(1)</td></tr>
<tr><td>FIG 19(2)</td></tr>
</table>

```
{65376,64781,62057,48496,16676, 3614,  923,  340,    0},
{65259,64356,60836,47316,18158, 4979, 1517,  623,    0},
{64883,63190,58260,45006,21034, 8378, 3559, 1909,    0},
{65261,64180,60126,46710,18694, 5578, 1582,  531,    0},
{64933,63355,58991,46299,19470, 7245, 2989, 1449,    0},
{63999,61383,56309,44712,24964,14237, 9489, 7028,    0},
{65451,65091,62953,48747,16324, 2626,  522,  168,    0},
{65400,64870,62109,47037,18198, 3526,  794,  278,    0},
{65200,64074,59673,44322,20692, 6133, 1836,  739,    0},
{65376,64798,61822,46437,18673, 3881,  932,  368,    0},
{65151,63887,59083,43617,21491, 6768, 2081,  841,    0},
{64592,62314,56211,42184,24450,11142, 5265, 3075,    0},
{64908,62840,56205,41474,23652, 9844, 3388, 1379,    0},
{65021,63308,57341,42286,22972, 8709, 2895, 1232,    0},
{64790,62474,55461,40843,24327,10719, 3921, 1677,    0},
{64053,60476,52429,39583,26962,15208, 7592, 4166,    0},
{63317,58934,51305,40469,29263,19682,12661, 8553,    0},
{63871,59872,52031,39473,26093,15132, 7866, 4080,    0},
{63226,58553,50425,39191,28586,18779,11388, 7035,    0},
{62219,57006,49569,40492,32376,24784,18716,14447,    0},
{62905,58273,50651,39619,28123,18379,11633, 7478,    0},
{63420,59073,51922,41516,29863,20328,13529, 9237,    0},
{63582,59263,51165,37880,24026,13893, 7771, 4535,    0},
{63223,58418,49833,37279,25503,15421, 9122, 5802,    0},
{62322,56878,48746,39095,30723,22195,15849,11887,    0},
{61826,47222,47123,47015,46913,46806,13713, 6895,    0},
1964 → {60678,44085,44084,44083,44082,44081,16715, 9222,    0} ← pki=63
};
```

FIG 19(2)

| | |
|---|---|
| FIG 19 | FIG 19(1) |
| | FIG 19(2) |

```
static unsigned long ari_s_hash[387] = {
0x0090D52E,0x0090CB1F,0x00A4CB2C,0x00003330,0x00107A07,0x00907A15,0x00207A0C,
0x00147A0C,
0x00247A15,0x00A07A19,0x00947A19,0x00A47A18,0x0010B70D,0x0090B719,0x0020B71D,
0x0014B71D,
0x00A0B718,0x0094B718,0x0024B715,0x00A4B717,0x0110B731,0x0000FE1C,0x0090FE1E,
0x00013B02,
0x00A5C92E,0x0095C92C,0x003A9E0B,0x00000B01,0x00BA9E2E,0x0090992B,0x0011B514,
0x00A5B52E,
0x0095B52B,0x0090D62C,0x0010850D,0x0014851B,0x00248514,0x0020850B,0x00908522,
0x00948520,
0x00A4852B,0x00A0851F,0x00003432,0x00107B08,0x00207B0E,0x00907B1D,0x00147B0E,
0x00247B0C,
0x00A07B14,0x00947B14,0x00A47B18,0x00910928,0x03D0713D,0x00D0713A,0x0000FF1C,
0x0090F52D,
0x0010F521,0x00013C01,0x03D05D3D,0x00A5CA2C,0x0025CA1F,0x0095CA2B,0x003A9F0B,
0x00000C02,
0x0021790B,0x0025791C,0x00917922,0x0015790B,0x00A17924,0x00A5792B,0x00957924,
0x00BA9F2E,
0x00CF2D38,0x00000200,0x0011B615,0x0091B618,0x0021B619,0x0015B619,0x00A1B617,
0x0095B617,
0x0025B618,0x00A5B62B,0x004FB125,0x00108609,0x00148616,0x0020860C,0x00908614,
0x0024861D,
0x00948619,0x00A08622,0x00A4861F,0x0090CD23,0x00003532,0x00010A2E,0x00002B25,
0x0010B90B,
0x0090B91F,0x00A4B92C,0x0001001E,0x03D0213C,0x0090F62D,0x0010F628,0x00A5CB2C,
0x0025CB1F,
0x0095CB2C,0x00000D03,0x00117A12,0x00217A1D,0x00917A14,0x00257A0B,0x00157A1D,
0x00A17A18,
0x00A57A17,0x00957A18,0x0011B70C,0x0091B722,0x0021B715,0x0015B714,0x00A1B71F,
0x0025B722,
0x0095B71F,0x00A5B717,0x004FB21C,0x0010870A,0x00148707,0x00208710,0x0090871D,
0x00248716,
0x00948714,0x00A08714,0x00A48718,0x00907D1C,0x00010B25,0x00002C22,0x0010BA1D,
0x0090BA22,
0x0014BA14,0x00A0BA17,0x0094BA17,0x00A4BA17,0x03D0693D,0x0090F72F,0x0010F728,
0x0025851C,
0x0015850B,0x00218514,0x00A5852C,0x00958524,0x00117B07,0x00217B12,0x00257B1B,
0x00917B15,
0x00157B16,0x00A17B18,0x00A57B1F,0x00957B18,0x0090D92C,0x004FB31C,0x03D0413C,
0x00907E1C,
0x0090C52B,0x00A4C52E,0x00002D14,0x00D02D38,0x03D02D3D,0x0010BB16,0x0090BB19,
0x0014BB15,
0x00A0BB1F,0x0094BB1F,0x00A4BB17,0x0025860B,0x0015861D,0x00218615,0x00918619,
0x00A58617,
0x00958618,0x00A1861F,0x00000F25,0x00CEE938,0x00004C32,0x0011B914,0x00A5B92E,
0x0095B92B,
0x0014890B,0x0024891C,0x00908918,0x00A4892B,0x00A08917,0x00907F14,0x0010C615,
0x0090C61F,
0x0014C614,0x0094C617,0x00A4C62B,0x00A0C617,0x00910D25,0x00107504,0x00907514,
0x00147516,
0x0020751D,0x00247514,0x00A0751F,0x00947518,0x00A47524,0x0090F925,0x0011870E,
0x0025871B,
0x0015870C,0x0021870C,0x00918714,0x00A5871F,0x00A18718,0x00958718,0x03D06139,
0x0000101C,
0x03D04D3D,0x0011BA15,0x0091BA18,0x0021BA22,0x00A1BA17,0x0025BA1F,0x00A5BA2C,
0x0095BA17,
0x00148A1D,0x00208A1D,0x00248A15,0x00908A19,0x00948A18,0x00A08A18,0x00A48A17,
0x0010393D,
```

FIG 20(1)

| FIG 20 | FIG 20(1) |
|---|---|
| | FIG 20(2) |

```
0x0010C70C,0x0090C718,0x0014C715,0x0094C717,0x00A0C717,0x00A4C72B,0x00010E25,
0x00002F2D,
0x00107605,0x00907615,0x00147610,0x00207612,0x0024761D,0x00A07614,0x00947614,
0x00A47618,
0x0110762F,0x0090BD1C,0x00CDD938,0x0000FA02,0x0090FA2E,0x0000110B,0x03D0113B,
0x00A5C52E,
0x0095C52C,0x0011BB1D,0x0091BB18,0x0021BB19,0x0014950B,0x00A1BB17,0x0025BB18,
0x00A5BB2C,
0x0095BB17,0x00909523,0x00108B0E,0x00148B16,0x00208B0C,0x00248B1D,0x00908B14,
0x00948B18,
0x00A08B18,0x00A48B17,0x00010F25,0x0000302B,0x00107706,0x00907716,0x00147711,
0x00207713,
0x0024770E,0x00A07715,0x0094771D,0x00A47714,0x0091052F,0x00110528,0x0090BE1C,
0x0015052D,
0x03D06D3D,0x0000FB01,0x0090FB2D,0x0025890B,0x00A5892C,0x00158914,0x0021891C,
0x0095892B,
0x0011C619,0x0025C61F,0x00A5C62C,0x0095C617,0x00117516,0x0021750B,0x0015750B,
0x00917519,
0x0025751C,0x00A17524,0x00957520,0x00A5752C,0x0014961D,0x0090961F,0x0090C917,
0x00A4C92E,
0x0000312B,0x00D0313A,0x03D0313D,0x0090BF1C,0x0091062F,0x0010B50B,0x0090B517,
0x00A0B52B,
0x00A4B52C,0x0000FC1C,0x00258A1D,0x00A58A17,0x00158A15,0x00218A15,0x00918A18,
0x00A18A17,
0x00958A17,0x00013938,0x00001327,0x0011C715,0x0025C718,0x00A5C72C,0x0095C717,
0x0011760E,
0x0021760C,0x00917615,0x0015760C,0x0025760B,0x00A17622,0x00957622,0x00A57617,
0x00005031,
0x00908D24,0x0090CA1F,0x00A4CA2C,0x0010790D,0x00907919,0x0020791D,0x0014791D,
0x00247914,
0x00A0791F,0x0094791F,0x00A4792B,0x00CE2D38,0x0010B60C,0x0090B618,0x0014B615,
0x0020B615,
0x00A0B61F,0x0094B61F,0x0024B619,0x00A4B617,0x0110B632,0x00258B1B,0x00158B1D,
0x00218B1D,
0x00A58B17,0x00918B18,0x00A18B17,0x00958B1F,0x0090FD1E,0x00013A04,0x0000142F,
0x003A9D1C,
0x00BA9D2D,0x0011770F,0x0021770E,0x00157710,0x0091771D,0x0025771B,0x00A17714,
0x00957714,
0x00A57718,0x00005131,0x03D0513C
};
```

FIG 20(2)

| | |
|---|---|
| FIG 20 | FIG 20(1) |
| | FIG 20(2) |

AUDIO ENCODER, AUDIO DECODER, METHOD FOR ENCODING AN AUDIO INFORMATION, METHOD FOR DECODING AN AUDIO INFORMATION AND COMPUTER PROGRAM USING A DETECTION OF A GROUP OF PREVIOUSLY-DECODED SPECTRAL VALUES

CROSS-REFERENCE TO RELATED APPLICATIONS

This application is a continuation of copending U.S. patent application Ser. No. 15/845,616, filed Dec. 18, 2017, which is a continuation of U.S. patent application Ser. No. 14/083,412, filed Nov. 18, 2013, now U.S. Pat. No. 9,978,380, issued May 22, 2018, which is a continuation of U.S. patent application Ser. No. 13/450,014, Apr. 18, 2012, now U.S. Pat. No. 8,706,510, issued Apr. 22, 2014, which is a continuation of copending International Application No. PCT/EP2010/065725, filed Oct. 19, 2010, which are incorporated herein by reference in their entirety, and additionally claims priority from U.S. Application No. 61/253,459, filed Oct. 20, 2009, which is also incorporated herein by reference in its entirety.

Embodiments according to the invention are related to an audio decoder for providing a decoded audio information on the basis of an encoded audio information, an audio encoder for providing an encoded audio information on the basis of an input audio information, a method for providing a decoded audio information on the basis of an encoded audio information, a method for providing an encoded audio information on the basis of an input audio information and a computer program.

Embodiments according to the invention are related an improved spectral noiseless coding, which can be used in an audio encoder or decoder, like, for example, a so-called unified speech-and-audio coder (USAC).

BACKGROUND OF THE INVENTION

In the following, the background of the invention will be briefly explained in order to facilitate the understanding of the invention and the advantages thereof. During the past decade, big efforts have been put on creating the possibility to digitally store and distribute audio contents with good bitrate efficiency. One important achievement on this way is the definition of the International Standard ISO/IEC 14496-3. Part 3 of this Standard is related to an encoding and decoding of audio contents, and subpart 4 of part 3 is related to general audio coding. ISO/IEC 14496 part 3, subpart 4 defines a concept for encoding and decoding of general audio content. In addition, further improvements have been proposed in order to improve the quality and/or to reduce the bit rate that may be used.

According to the concept described in said Standard, a time-domain audio signal is converted into a time-frequency representation. The transform from the time-domain to the time-frequency-domain is typically performed using transform blocks, which are also designated as “frames”, of time-domain samples. It has been found that it is advantageous to use overlapping frames, which are shifted, for example, by half a frame, because the overlap allows to efficiently avoid (or at least reduce) artifacts. In addition, it has been found that a windowing should be performed in order to avoid the artifacts originating from this processing of temporally limited frames.

By transforming a windowed portion of the input audio signal from the time-domain to the time-frequency domain, an energy compaction is obtained in many cases, such that some of the spectral values comprise a significantly larger magnitude than a plurality of other spectral values. Accordingly, there are, in many cases, a comparatively small number of spectral values having a magnitude, which is significantly above an average magnitude of the spectral values. A typical example of a time-domain to time-frequency domain transform resulting in an energy compaction is the so-called modified-discrete-cosine-transform (MDCT).

The spectral values are often scaled and quantized in accordance with a psychoacoustic model, such that quantization errors are comparatively smaller for psychoacoustically more important spectral values, and are comparatively larger for psychoacoustically less-important spectral values. The scaled and quantized spectral values are encoded in order to provide a bitrate-efficient representation thereof.

For example, the usage of a so-called Huffman coding of quantized spectral coefficients is described in the International Standard ISO/IEC 14496-3:2005(E), part 3, subpart 4.

However, it has been found that the quality of the coding of the spectral values has a significant impact on the bitrate that may be used. Also, it has been found that the complexity of an audio decoder, which is often implemented in a portable consumer device, and which should therefore be cheap and of low power consumption, is dependent on the coding used for encoding the spectral values.

In view of this situation, there is a need for a concept for an encoding and decoding of an audio content, which provides for an improved trade-off between bitrate-efficiency and resource efficiency.

SUMMARY

According to an embodiment, an audio decoder for providing a decoded audio information on the basis of an encoded audio information may have: an arithmetic decoder for providing a plurality of decoded spectral values on the basis of an arithmetically-encoded representation of the spectral values; and a frequency-domain-to-time-domain converter for providing a time-domain audio representation using the decoded spectral values, in order to acquire the decoded audio information; wherein the arithmetic decoder is configured to select a mapping rule describing a mapping of a code value onto a symbol code in dependence on a context state; and wherein the arithmetic decoder is configured to determine the current context state in dependence on a plurality of previously-decoded spectral values, wherein the arithmetic decoder is configured to detect a group of a plurality of previously-decoded spectral values, which fulfill, individually or taken together, a predetermined condition regarding their magnitudes, and to determine or modify the current context state in dependence on a result of the detection.

According to another embodiment, an audio encoder for providing an encoded audio information on the basis of an input audio information may have: an energy-compacting time-domain-to-frequency-domain converter for providing a frequency-domain audio representation on the basis of a time-domain representation of the input audio information, such that the frequency-domain audio representation has a set of spectral values; and an arithmetic encoder configured to encode a spectral value or a preprocessed version thereof, using a variable length codeword, wherein the arithmetic encoder is configured to map a spectral value, or a value of a most significant bitplane of a spectral value onto a code value, wherein the arithmetic encoder is configured to select a mapping rule describing a mapping of a spectral value, or of a most significant bitplane of a spectral value, onto a code value, in dependence on a context state; and wherein the arithmetic encoder is configured to determine the current context state in dependence on a plurality of previously-encoded spectral values, wherein the arithmetic encoder is configured to detect a group of a plurality of previously-encoded spectral values, which fulfill, individually or taken together, a predetermined condition regarding their magnitudes, and to determine or modify the current context state in dependence on a result of the detection.

According to another embodiment, a method for providing a decoded audio information on the basis of an encoded audio information may have the steps of: providing a plurality of decoded spectral values on the basis of an arithmetically-encoded representation of the spectral values; and providing a time-domain audio representation using the decoded spectral values, in order to acquire the decoded audio information; wherein providing the plurality of decoded spectral values includes selecting a mapping rule describing a mapping of a code value representing a spectral value, or a most-significant bit-plane of a spectral value, in an encoded form onto a symbol code representing a spectral value, or a most-significant bit-plane of a spectral value, in a decoded form, in dependence on a context state; and wherein the current context state is determined in dependence on a plurality of previously decoded spectral values, wherein a group of a plurality of previously-decoded spectral values, which fulfill, individually or taken together, a predetermined condition regarding their magnitudes is detected, and wherein the current context state is determined or modified in dependence on a result of the detection.

According to another embodiment, a method for providing an encoded audio information on the basis of an input audio information may have the steps of: providing a frequency-domain audio representation on the basis of a time-domain representation of the input audio information using an energy-compacting time-domain-to-frequency-domain conversion, such that the frequency-domain audio representation has a set of spectral values; and arithmetically encoding a spectral value, or a preprocessed version thereof, using a variable-length codeword, wherein a spectral value or a value of a most significant bitplane of a spectral value is mapped onto a code value; wherein a mapping rule describing a mapping of a spectral value, or of a most significant bitplane of a spectral value, onto a code value is selected in dependence on a context state; and wherein a current context state is determined in dependence on a plurality of previously-encoded adjacent spectral values; and wherein a group of a plurality of previously-decoded spectral values, which fulfill, individually or together, a predetermined condition regarding their magnitudes, is detected and the current context state is determined or modified in dependence on a result of the detection.

Another embodiment may have a computer program for performing the method for providing a decoded audio information on the basis of an encoded audio information, which method may have the steps of: providing a plurality of decoded spectral values on the basis of an arithmetically-encoded representation of the spectral values; and providing a time-domain audio representation using the decoded spectral values, in order to acquire the decoded audio information; wherein providing the plurality of decoded spectral values includes selecting a mapping rule describing a mapping of a code value representing a spectral value, or a most-significant bit-plane of a spectral value, in an encoded form onto a symbol code representing a spectral value, or a most-significant bit-plane of a spectral value, in a decoded form, in dependence on a context state; and wherein the current context state is determined in dependence on a plurality of previously decoded spectral values, wherein a group of a plurality of previously-decoded spectral values, which fulfill, individually or taken together, a predetermined condition regarding their magnitudes is detected, and wherein the current context state is determined or modified in dependence on a result of the detection, when the program runs on a computer.

Another embodiment may have a computer program for performing the method for providing an encoded audio information on the basis of an input audio information, which method may have the steps of: providing a frequency-domain audio representation on the basis of a time-domain representation of the input audio information using an energy-compacting time-domain-to-frequency-domain conversion, such that the frequency-domain audio representation has a set of spectral values; and arithmetically encoding a spectral value, or a preprocessed version thereof, using a variable-length codeword, wherein a spectral value or a value of a most significant bitplane of a spectral value is mapped onto a code value; wherein a mapping rule describing a mapping of a spectral value, or of a most significant bitplane of a spectral value, onto a code value is selected in dependence on a context state; and wherein a current context state is determined in dependence on a plurality of previously-encoded adjacent spectral values; and wherein a group of a plurality of previously-decoded spectral values, which fulfill, individually or together, a predetermined condition regarding their magnitudes, is detected and the current context state is determined or modified in dependence on a result of the detection, when the program runs on a computer.

An embodiment according to the invention creates an audio decoder for providing a decoded audio information (or decoded audio representation) on the basis of an encoded audio information (or encoded audio representation). The audio decoder comprises an arithmetic decoder for providing a plurality of decoded spectral values on the basis of an arithmetically-encoded representation of the spectral values. The audio decoder also comprises a frequency-domain to time-domain converter for providing a time-domain audio representation using the decoded spectral values, in order to obtain the decoded audio information. The arithmetic decoder is configured to select a mapping rule describing a mapping of a code-value onto a symbol code in dependence on a context state. The arithmetic decoder is configured to determine the current context state in dependence on a plurality of previously-decoded spectral values. The arithmetic decoder is configured to detect a group of a plurality of previously-decoded spectral values, which fulfil, individually or taken together, a predetermined condition regarding their magnitudes, and to determine or modify the current context state in dependence on a result of the detection.

This embodiment according to the invention is based on the finding that the presence of a group of a plurality of previously-decoded (advantageously, but not necessarily, adjacent) spectral values, which fulfill the predetermined condition regarding their magnitudes, allows for a particularly efficient determination of the current context state since such a group of previously-decoded (advantageously adjacent) spectral values is a characteristic feature within the spectral representation, and can therefore be used to facilitate the determination of the current context state. By detecting a group of a plurality of previously-decoded (advantageously adjacent) spectral values which comprise, for example, a particularly small magnitude, it is possible to recognize portions of comparatively low amplitude within the spectrum, and to adjust (determine or modify) the current context state accordingly, such that further spectral values can be encoded and decoded with good coding efficiency (in terms of bitrate). Alternatively, groups of a plurality of previously-decoded adjacent spectral values which comprise a comparatively large amplitude can be detected, and the context can be appropriately adjusted (determined or modified) to increase the efficiency of the encoding and decoding. Furthermore, the detection of groups of a plurality of previously-decoded (advantageously adjacent) spectral values which fulfill, individually or taken together, the predetermined condition, is often executable with lower computational effort than a context computation in which many previously-decoded spectral values are combined. To summarize, the above discussed embodiment according to the invention, allows for a simplified context computation and allows for an adjustment of the context to specific signal constellations in which, there are groups of adjacent comparatively small spectral values or groups of adjacent comparatively large spectral values.

In an advantageous embodiment, the arithmetic decoder is configured to determine or modify the current context state independent from the previously decoded spectral values in response to the detection that the predetermined condition is fulfilled. Accordingly, a computationally particularly efficient mechanism is obtained for the derivation of a value describing the context. It has been found that a meaningful adaptation of the context can be achieved if the detection of a group of a plurality of previously decoded spectral values, which fulfill the predetermined condition, results in a simple mechanism, which does not require a computationally demanding numeric combination of previously decoded spectral values. Thus, the computational effort is reduced when compared to other approaches. Also, an acceleration of the context derivation can be achieved by omitting complex calculation steps which are dependent on the detection, because such a concept is typically inefficient in a software implementation executed on a processor.

In an advantageous embodiment, the arithmetic decoder is configured to detect a group of a plurality of previously-decoded adjacent spectral values, which fulfill, individually or taken together, a predetermined condition regarding their magnitudes.

In an advantageous embodiment, the arithmetic decoder is configured to detect a group of a plurality of previously-decoded adjacent spectral values which, individually or taken together, comprise a magnitude which is smaller than a predetermined threshold magnitude, and to determine the current context state in dependence on the result of the detection. It has been found that a group of a plurality of adjacent comparatively low spectral values may be used for selecting a context which is well-adapted to this situation. If there is a group of adjacent comparatively small spectral values, there is a significant probability that the spectral value to be decoded next also comprises a comparatively small value. Accordingly, an adjustment of the context provides a good encoding efficiency and may assist in the avoidance of time consuming context computations.

In an advantageous embodiment, the arithmetic decoder is configured to detect a group of a plurality of previously-decoded adjacent spectral values, wherein each of the previously-decoded spectral values is a zero value, and to determine the context state in dependence on the result of the detection. It has been found that due to spectral or temporal masking effects, there are often groups of adjacent spectral values which take a zero value. The described embodiment provides an efficient handling for this situation. In addition, the presence of a group of adjacent spectral values, which are quantized to zero, makes it very probable that the spectral value to be decoded next is either, a zero value or a comparatively large spectral value, which results in the masking effect.

In an advantageous embodiment, the arithmetic decoder is configured to detect a group of a plurality of previously-decoded adjacent spectral values, which comprise a sum value which is smaller than a predetermined threshold value, and to determine the context state in dependence on a result of the detection. It has been found that in addition to groups of adjacent spectral values which are zero, also groups of adjacent spectral values which are almost zero in an average (i.e. a sum value of which is smaller than a predetermined threshold value), constitute a characteristic feature of a spectral representation (e.g. a time-frequency representation of the audio content) which can be used for the adaptation of the context.

In an advantageous embodiment, the arithmetic decoder is configured to set the current context state to a predetermined value in response to the detection of the predetermined condition. It has been found that this reaction is very simple to implement and still results in an adaptation of the context which provides for a good coding efficiency.

In an advantageous embodiment, the arithmetic decoder is configured to selectively omit a calculation of the current context state in dependence on the numeric values of a plurality of previously-decoded spectral values in response to the detection of the predetermined condition. Accordingly, the context computation is significantly simplified in response to the detection of a group of a plurality of previously-decoded adjacent spectral values which fulfill the predetermined condition. By saving computational effort, a power consumption of the audio signal decoder is also reduced, which provides for significant advantages in mobile devices.

In an advantageous embodiment, the arithmetic decoder is configured to set the current context state to a value which signals the detection of the predetermined condition. By setting the context state to such a value, which may be within a predetermined range of values, the later evaluation of the context state may be controlled. However, it should be noted that the value to which the current context state is set, may be dependent on other criteria as well, even though the value may be in a characteristic range of values which signals the detection of the predetermined condition.

In an advantageous embodiment, the arithmetic decoder is configured to map a symbol code onto a decoded spectral value.

In an advantageous embodiment, the arithmetic decoder is configured to evaluate spectral values of a first time-frequency region, to detect a group of a plurality of spectral values which fulfill, individually or taken together, the predetermined condition regarding their magnitudes. The arithmetic decoder is configured to obtain a numeric value which represents the context state, in dependence on spectral values of a second time frequency region, which is different from the first time frequency region, if the predetermined condition is not fulfilled. It has been found that it is recommendable to detect a group of a plurality of spectral values that fulfill the predetermined condition regarding the magnitude within a region which differs from the region normally used for the context computation. This is due to the fact that an extension, for example, a frequency extension, of regions comprising comparatively small spectral values, or comparatively large spectral values, is typically larger than a dimension of a region of spectral values that are to be considered for a numeric calculation of a numeric value representing the context state. Accordingly, it is recommendable to analyze different regions for the detection of a group of a plurality of spectral values fulfilling the predetermined condition, and for the numeric computation of a numeric value representing the context state (wherein the numeric calculation may only be expected in a second step if the detection does not provide a bit.

In an advantageous embodiment, the arithmetic decoder is configured to evaluate one or more hash tables to select a mapping rule in dependence on the context state. It has been found that the selection of the mapping rule can be controlled by the mechanism of detecting a plurality of adjacent spectral values which fulfill the predetermined condition.

An embodiment according to the invention creates an audio encoder for providing an encoded audio information, on the basis of an input audio information. The audio encoder comprises an energy-compacting time-domain-to-frequency-domain converter for providing a frequency-domain audio representation, on the basis of a time-domain representation of the input audio information, such that the frequency-domain audio representation comprises a set of spectral values. The audio encoder also comprises an arithmetic encoder configured to encode a spectral value, or a pre-processed version thereof, using a variable-length codeword. The arithmetic encoder is configured to map a spectral value or a value of a most-significant bit-plane of a spectral value onto a code value. The arithmetic encoder is configured to select a mapping rule describing a mapping of a spectral value or of a most-significant bit-plane of a spectral value onto a code value in dependence on the context state. The arithmetic encoder is configured to determine the current context state in dependence on a plurality of previously-encoded adjacent spectral values. The arithmetic encoder is configured to detect a group of a plurality of previously-encoded adjacent spectral values, which fulfill, individually or taken together, a predetermined condition regarding their magnitudes, and to determine the current context state in dependence on a result of the detection.

This audio signal encoder is based on the same findings as the audio signal decoder discussed above. It has been found that the mechanism for the adaptation of the context, which has been shown to be efficient for the decoding of an audio content, should also be applied at the encoder side, in order to allow for a consistent system.

An embodiment according to the invention creates a method for providing decoded audio information on the basis of encoded audio information.

Yet another embodiment according to the invention creates a method for providing encoded audio information on the basis of an input audio information.

Another embodiment according to the invention creates a computer program for performing one of said methods.

The methods and the computer program are based on the same findings as the above described audio decoder and the above described audio encoder.

BRIEF DESCRIPTION OF THE DRAWINGS

Embodiments according to the present invention will subsequently be described taking reference to the enclosed figures, in which:

FIG. 3 shows a pseudo-program-code representation of an algorithm "value_decode( )" for decoding a spectral value;

FIG. 5*a* shows a pseudo-program-code representation of an algorithm "arith_map_context( )" for mapping a context;

FIGS. 5*b* and 5*c* show a pseudo-program-code representation of an algorithm "arith_get_context( )" for obtaining a context state value;

FIGS. 5*d*1 and 5*d*2 show a pseudo-program-code representation of an algorithm "get_pk(s)" for deriving a cumulative-frequencies-table index value "pki" from a state variable;

FIG. 5*e* shows a pseudo-program-code representation of an algorithm "arith_get_pk(s)" for deriving a cumulative-frequencies-table index value "pki" from a state value;

FIG. 5*f* shows a pseudo-program-code representation of an algorithm "get_pk(unsigned long s)" for deriving a cumulative-frequencies-table index value "pki" from a state value;

FIGS. 5*g*1 and 5*g*2 show a pseudo-program-code representation of an algorithm "arith_decode( )" for arithmetically decoding a symbol from a variable-length codeword;

FIG. 5*h* shows a pseudo-program-code representation of an algorithm "arith_update_context( )" for updating the context;

FIG. 5*i* shows a legend of definitions and variables;

FIG. 6*a* shows as syntax representation of a unified-speech-and-audio-coding (USAC) raw data block;

FIG. 6*b* shows a syntax representation of a single channel element;

FIG. 6*c* shows syntax representation of a channel pair element;

FIG. 6*d* shows a syntax representation of an "ics" control information;

FIG. 6*e* shows a syntax representation of a frequency-domain channel stream;

FIG. 6*f* shows a syntax representation of arithmetically-coded spectral data;

FIG. 6*g* shows a syntax representation for decoding a set of spectral values;

FIG. 6*h* shows a legend of data elements and variables;

FIG. 11*a* shows an overview of the table as used in the arithmetic coding scheme according to the working draft 4 of the USAC draft standard;

FIG. 11*b* shows an overview of the table as used in the arithmetic coding scheme according to the present invention;

FIG. 13*a* shows a table representation of average bitrates which are used by a unified-speech-and-audio-coding coder, using an arithmetic coder according to the working draft 3 of the USAC draft standard and an arithmetic decoder according to an embodiment of the present invention;

FIG. 13*b* shows a table representation of a bit reservoir control for a unified-speech-and-audio-coding coder, using the arithmetic coder according to the working draft 3 of the USAC draft standard and the arithmetic coder according to an embodiment of the present invention;

FIG. 14 shows a table representation of average bitrates for a USAC coder according to the working draft 3 of the USAC draft standard, and according to an embodiment of the present invention;

FIG. 15 shows a table representation of minimum, maximum and average bitrates of USAC on a frame basis;

FIG. 16 shows a table representation of the best and worst cases on a frame basis;

FIGS. 17(1) and 17(2) show a table representation of a content of a table "ari_s_hash[387]";

FIG. 18 shows a table representation of a content of a table "ari_gs_hash[225]";

FIGS. 19(1) and 19(2) show a table representation of a content of a table "ari_cf_m[64][9]"; and FIGS. 20(1) and 20(2) show a table representation of a content of a table "ari_s_hash[387].

DETAILED DESCRIPTION OF THE INVENTION

1. Audio Encoder According to FIG. 7

Figure 7:
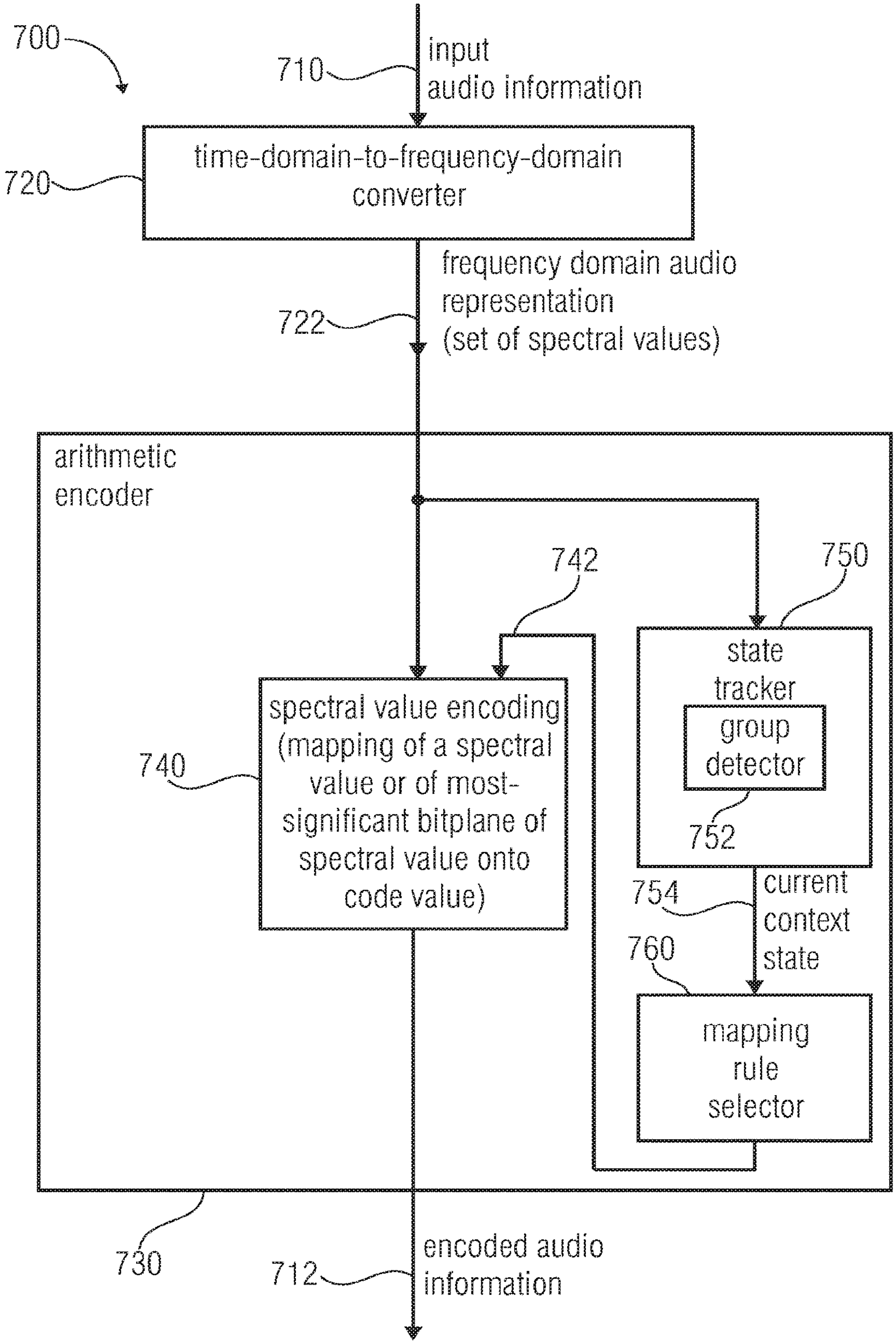
FIG. 7 shows a block schematic diagram of an audio encoder, according to another embodiment of the invention.

FIG. 7 shows a block schematic diagram of an audio encoder, according to an embodiment of the invention. The audio encoder 700 is configured to receive an input audio information 710 and to provide, on the basis thereof, an encoded audio information 712. The audio encoder comprises an energy-compacting time-domain-to-frequency-domain converter 720 which is configured to provide a frequency-domain audio representation 722 on the basis of a time-domain representation of the input audio information 710, such that the frequency-domain audio representation 722 comprises a set of spectral values. The audio encoder 700 also comprises an arithmetic encoder 730 configured to encode a spectral value (out of the set of spectral values forming the frequency-domain audio representation 722), or a pre-processed version thereof, using a variable-length codeword, to obtain the encoded audio information 712 (which may comprise, for example, a plurality of variable-length codewords).

The arithmetic encoder 730 is configured to map a spectral value or a value of a most-significant bit-plane of a spectral value onto a code value (i.e. onto a variable-length codeword), in dependence on a context state. The arithmetic encoder 730 is configured to select a mapping rule describing a mapping of a spectral value, or of a most-significant bit-plane of a spectral value, onto a code value, in dependence on a context state. The arithmetic encoder is configured to determine the current context state in dependence on a plurality of previously-encoded (advantageously, but not necessarily, adjacent) spectral values. For this purpose, the arithmetic encoder is configured to detect a group of a plurality of previously-encoded adjacent spectral values, which fulfill, individually or taken together, a predetermined condition regarding their magnitudes, and determine the current context state in dependence on a result of the detection.

As can be seen, the mapping of a spectral value or of a most-significant bit-plane of a spectral value onto a code value may be performed by a spectral value encoding 740 using a mapping rule 742. A state tracker 750 may be configured to track the context state and may comprise a group detector 752 to detect a group of a plurality of previously-encoded adjacent spectral values which fulfill, individually or taken together, the predetermined condition regarding their magnitudes. The state tracker 750 is also advantageously configured to determine the current context state in dependence on the result of said detection performed by the group detector 752. Accordingly, the state tracker 750 provides an information 754 describing the current context state. A mapping rule selector 760 may select a mapping rule, for example, a cumulative-frequencies-table, describing a mapping of a spectral value, or of a most-significant bit-plane of a spectral value, onto a code value. Accordingly, the mapping rule selector 760 provides the mapping rule information 742 to the spectral encoding 740.

To summarize the above, the audio encoder 700 performs an arithmetic encoding of a frequency-domain audio representation provided by the time-domain-to-frequency-domain converter. The arithmetic encoding is context-dependent, such that a mapping rule (e.g., a cumulative-frequencies-table) is selected in dependence on previously-encoded spectral values. Accordingly, spectral values adjacent in time and/or frequency (or at least, within a predetermined environment) to each other and/or to the currently-encoded spectral value (i.e. spectral values within a predetermined environment of the currently encoded spectral value) are considered in the arithmetic encoding to adjust the probability distribution evaluated by the arithmetic encoding. When selecting an appropriate mapping rule, a detection is performed in order to detect whether there is a group of a plurality of previously-encoded adjacent spectral values which fulfill, individually or taken together, a predetermined condition regarding their magnitudes. The result of this detection is applied in the selection of the current context state, i.e. in the selection of a mapping rule. By detecting whether there is a group of a plurality of spectral values which are particularly small or particularly large, it is possible to recognize special features within the frequency-domain audio representation, which may be a time-frequency representation. Special features such as, for example, a group of a plurality of particularly small or particularly large spectral values, indicate that a specific context state should be used as this specific context state may provide a particularly good coding efficiency. Thus, the detection of the group of adjacent spectral values which fulfill the predetermined condition, which is typically used in combination with an alternative context evaluation based on a combination of a plurality of previously-coded spectral values, provides a mechanism which allows for an efficient selection of an appropriate context if the input audio information takes some special states (e.g., comprises a large masked frequency range).

Accordingly, an efficient encoding can be achieved while keeping the context calculation sufficiently simple.

2. Audio Decoder According to FIG. 8

Figure 8:
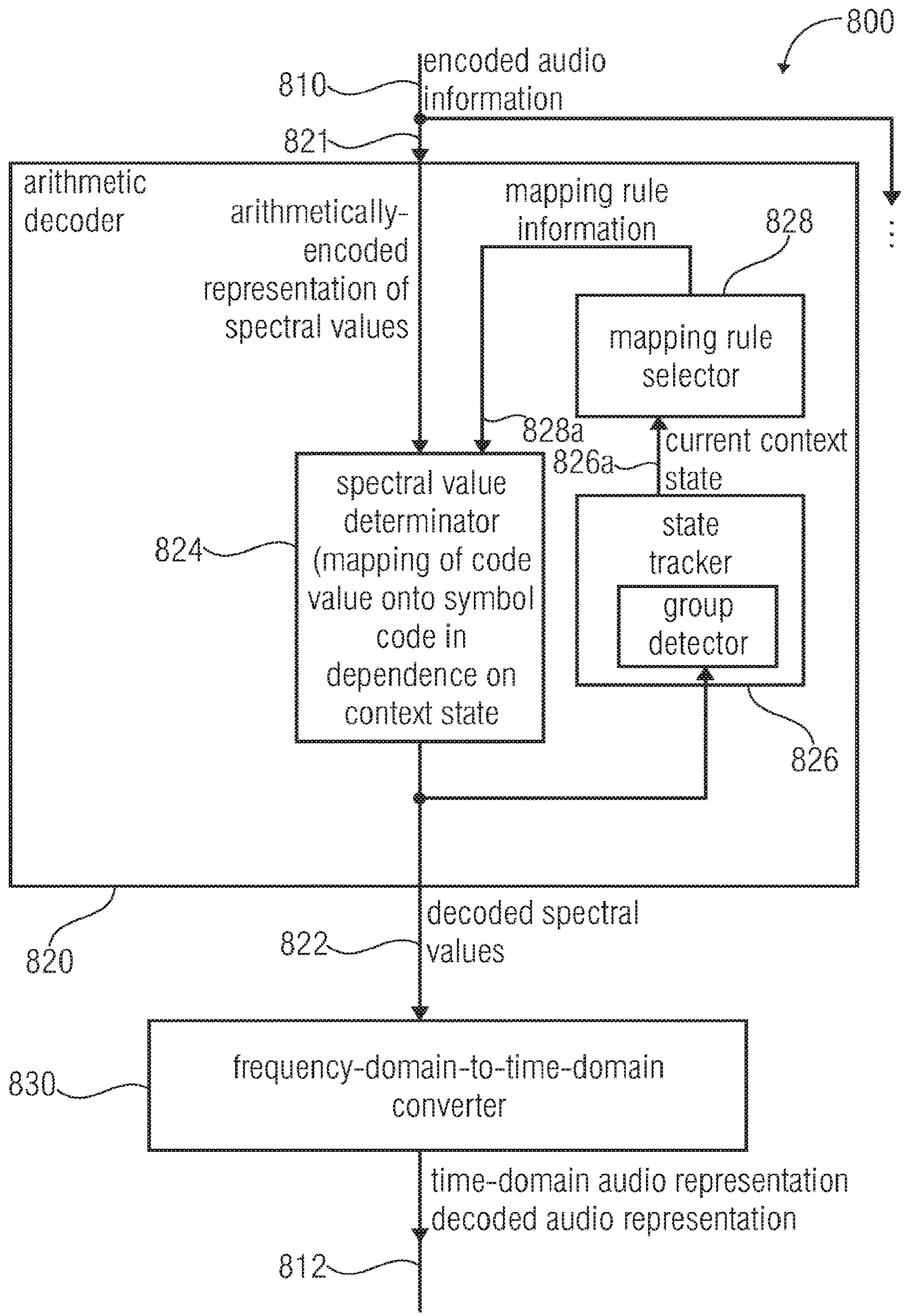
FIG. 8 shows a block schematic diagram of an audio decoder, according to another embodiment of the invention.

FIG. 8 shows a block schematic diagram of an audio decoder 800. The audio decoder 800 is configured to receive an encoded audio information 810 and to provide, on the basis thereof, a decoded audio information 812. The audio decoder 800 comprises an arithmetic decoder 820 that is configured to provide a plurality of decoded spectral values 822 on the basis of an arithmetically-encoded representation 821 of the spectral values. The audio decoder 800 also comprises a frequency-domain-to-time-domain converter 830 which is configured to receive the decoded spectral values 822 and to provide the time-domain audio representation 812, which may constitute the decoded audio information, using the decoded spectral values 822, in order to obtain a decoded audio information 812.

The arithmetic decoder 820 comprises a spectral value determinator 824 which is configured to map a code value of the arithmetically-encoded representation 821 of spectral values onto a symbol code representing one or more of the decoded spectral values, or at least a portion (for example, a most-significant bit-plane) of one or more of the decoded spectral values. The spectral value determinator 824 may be configured to perform the mapping in dependence on a mapping rule, which may be described by a mapping rule information 828*a*.

The arithmetic decoder 820 is configured to select a mapping rule (e.g. a cumulative-frequencies-table) describing a mapping of a code-value (described by the arithmetically-encoded representation 821 of spectral values) onto a symbol code (describing one or more spectral values) in dependence on a context state (which may be described by the context state information 826*a*). The arithmetic decoder 820 is configured to determine the current context state in dependence on a plurality of previously-decoded spectral values 822. For this purpose, a state tracker 826 may be used, which receives an information describing the previously-decoded spectral values. The arithmetic decoder is also configured to detect a group of a plurality of previously-decoded (advantageously, but not necessarily, adjacent) spectral values, which fulfill, individually or taken together, a predetermined condition regarding their magnitudes, and to determine the current context state (described, for example, by the context state information 826*a*) in dependence on a result of the detection.

The detection of the group of a plurality of previously-decoded adjacent spectral values which fulfill the predetermined condition regarding their magnitudes may, for example, be performed by a group detector, which is part of the state tracker 826. Accordingly, a current context state information 826*a* is obtained. The selection of the mapping rule may be performed by a mapping rule selector 828, which derives a mapping rule information 828*a* from the current context state information 826*a*, and which provides the mapping rule information 828*a* to the spectral value determinator 824.

Regarding the functionality of the audio signal decoder 800, it should be noted that the arithmetic decoder 820 is configured to select a mapping rule (e.g. a cumulative-frequencies-table) which is, on an average, well-adapted to the spectral value to be decoded, as the mapping rule is selected in dependence on the current context state, which in turn is determined in dependence on a plurality of previously-decoded spectral values. Accordingly, statistical dependencies between adjacent spectral values to be decoded can be exploited. Moreover, by detecting a group of a plurality of previously-decoded adjacent spectral values which fulfill, individually or taken together, a predetermined condition regarding their magnitudes, it is possible to adapt the mapping rule to special conditions (or patterns) of previously-decoded spectral values. For example, a specific mapping rule may be selected if a group of a plurality of comparatively small previously-decoded adjacent spectral values is identified, or if a group of a plurality of comparatively large previously-decoded adjacent spectral values is identified. It has been found that the presence of a group of comparatively large spectral values or of a group of comparatively small spectral values may be considered as a significant indication that a dedicated mapping rule, specifically adapted to such a condition, should be used. Accordingly, a context computation can be facilitated (or accelerated) by exploiting the detection of such a group of a plurality of spectral values. Also, characteristics of an audio content can be considered that could not be considered as easily without applying the above-mentioned concept. For example, the detection of a group of a plurality of spectral values which fulfill, individually or taken together, a predetermined condition regarding their magnitudes, can be performed on the basis of a different set of spectral values, when compared to the set of spectral values used for a normal context computation.

Further details will be described below.

3. Audio Encoder According to FIG. 1

Figure 1A:
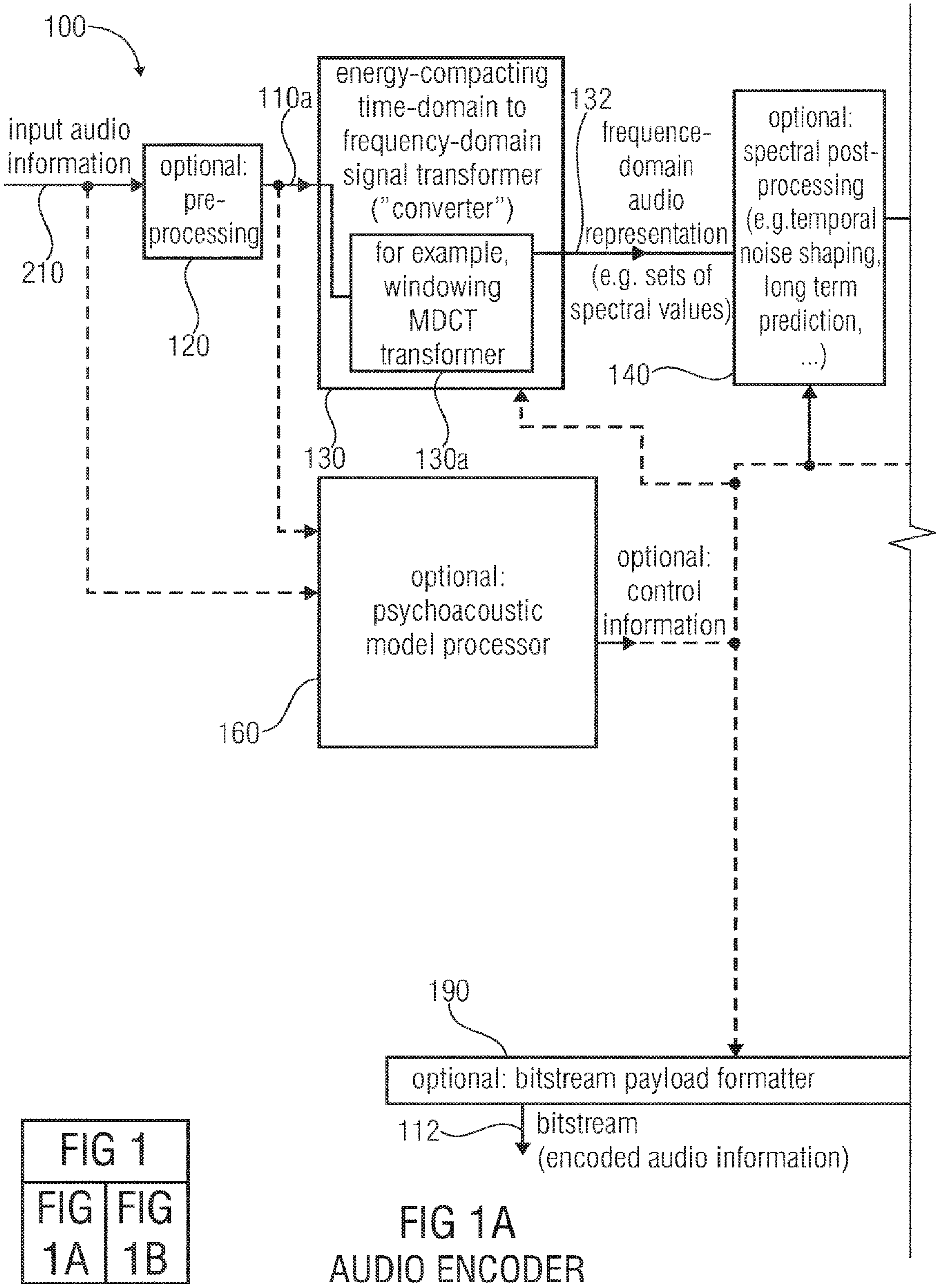
FIGS. 1*a*-1*b* show a block schematic diagram of an audio encoder, according to an embodiment of the invention.
Figure 1B:
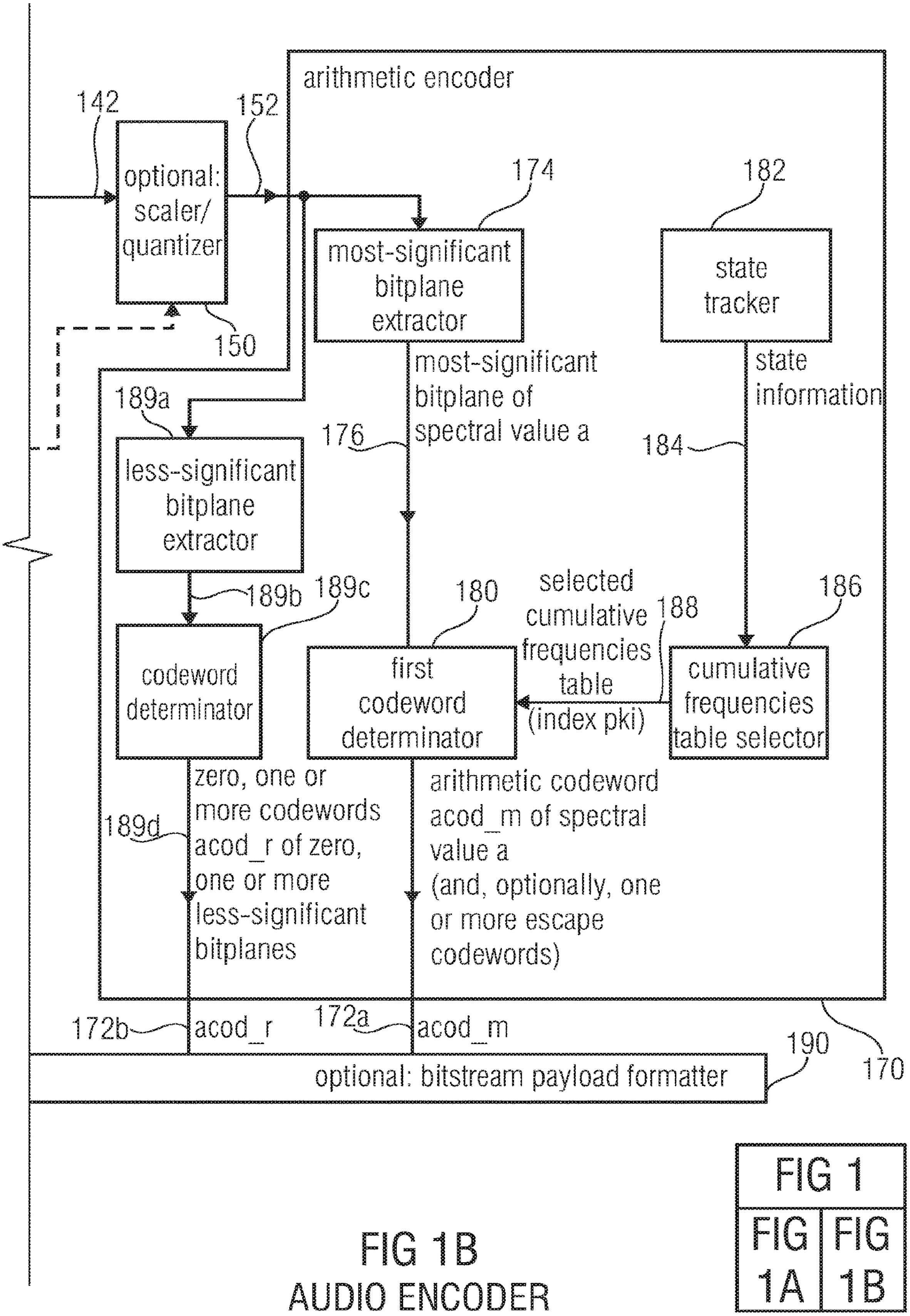

In the following, an audio encoder according to an embodiment of the present invention will be described. FIG. 1 shows a block schematic diagram of such an audio encoder 100.

The audio encoder 100 is configured to receive an input audio information 110 and to provide, on the basis thereof, a bitstream 112, which constitutes an encoded audio information. The audio encoder 100 optionally comprises a preprocessor 120, which is configured to receive the input audio information 110 and to provide, on the basis thereof, a pre-processed input audio information 110*a*. The audio encoder 100 also comprises an energy-compacting time-domain to frequency-domain signal transformer 130, which is also designated as signal converter. The signal converter 130 is configured to receive the input audio information 110, 110*a* and to provide, on the basis thereof, a frequency-domain audio information 132, which advantageously takes the form of a set of spectral values. For example, the signal transformer 130 may be configured to receive a frame of the input audio information 110, 110*a* (e.g. a block of time-domain samples) and to provide a set of spectral values representing the audio content of the respective audio frame. In addition, the signal transformer 130 may be configured to receive a plurality of subsequent, overlapping or non-overlapping, audio frames of the input audio information 110, 110*a* and to provide, on the basis thereof, a time-frequency-domain audio representation, which comprises a sequence of subsequent sets of spectral values, one set of spectral values associated with each frame.

The energy-compacting time-domain to frequency-domain signal transformer 130 may comprise an energy-compacting filterbank, which provides spectral values associated with different, overlapping or non-overlapping, frequency ranges. For example, the signal transformer 130 may comprise a windowing MDCT transformer 130*a*, which is configured to window the input audio information 110, 110*a* (or a frame thereof) using a transform window and to perform a modified-discrete-cosine-transform of the windowed input audio information 110, 110*a* (or of the windowed frame thereof). Accordingly, the frequency-domain audio representation 132 may comprise a set of, for example, 1024 spectral values in the form of MDCT coefficients associated with a frame of the input audio information.

The audio encoder 100 may further, optionally, comprise a spectral post-processor 140, which is configured to receive the frequency-domain audio representation 132 and to provide, on the basis thereof, a post-processed frequency-domain audio representation 142. The spectral post-processor 140 may, for example, be configured to perform a temporal noise shaping and/or a long term prediction and/or any other spectral post-processing known in the art. The audio encoder further comprises, optionally, a scaler/quantizer 150, which is configured to receive the frequency-domain audio representation 132 or the post-processed version 142 thereof and to provide a scaled and quantized frequency-domain audio representation 152.

The audio encoder 100 further comprises, optionally, a psycho-acoustic model processor 160, which is configured to receive the input audio information 110 (or the post-processed version 110*a* thereof) and to provide, on the basis thereof, an optional control information, which may be used for the control of the energy-compacting time-domain to frequency-domain signal transformer 130, for the control of the optional spectral post-processor 140 and/or for the control of the optional scaler/quantizer 150. For example, the psycho-acoustic model processor 160 may be configured to analyze the input audio information, to determine which components of the input audio information 110, 110*a* are particularly important for the human perception of the audio content and which components of the input audio information 110, 110*a* are less important for the perception of the audio content. Accordingly, the psycho-acoustic model processor 160 may provide control information, which is used by the audio encoder 100 in order to adjust the scaling of the frequency-domain audio representation 132, 142 by the scaler/quantizer 150 and/or the quantization resolution applied by the scaler/quantizer 150. Consequently, perceptually important scale factor bands (i.e. groups of adjacent spectral values which are particularly important for the human perception of the audio content) are scaled with a large scaling factor and quantized with comparatively high resolution, while perceptually less-important scale factor bands (i.e. groups of adjacent spectral values) are scaled with a comparatively smaller scaling factor and quantized with a comparatively lower quantization resolution. Accordingly, scaled spectral values of perceptually more important frequencies are typically significantly larger than spectral values of perceptually less important frequencies.

The audio encoder also comprises an arithmetic encoder 170, which is configured to receive the scaled and quantized version 152 of the frequency-domain audio representation 132 (or, alternatively, the post-processed version 142 of the frequency-domain audio representation 132, or even the frequency-domain audio representation 132 itself) and to provide arithmetic codeword information 172*a* on the basis thereof, such that the arithmetic codeword information represents the frequency-domain audio representation 152.

The audio encoder 100 also comprises a bitstream payload formatter 190, which is configured to receive the arithmetic codeword information 172*a*. The bitstream payload formatter 190 is also typically configured to receive additional information, like, for example, scale factor information describing which scale factors have been applied by the scaler/quantizer 150. In addition, the bitstream payload formatter 190 may be configured to receive other control information. The bitstream payload formatter 190 is configured to provide the bitstream 112 on the basis of the received information by assembling the bitstream in accordance with a desired bitstream syntax, which will be discussed below.

In the following, details regarding the arithmetic encoder 170 will be described. The arithmetic encoder 170 is configured to receive a plurality of post-processed and scaled and quantized spectral values of the frequency-domain audio representation 132. The arithmetic encoder comprises a most-significant-bit-plane-extractor 174, which is configured to extract a most-significant bit-plane m from a spectral value. It should be noted here that the most-significant bit-plane may comprise one or even more bits (e.g. two or three bits), which are the most-significant bits of the spectral value. Thus, the most-significant bit-plane extractor 174 provides a most-significant bit-plane value 176 of a spectral value.

The arithmetic encoder 170 also comprises a first codeword determinator 180, which is configured to determine an arithmetic codeword acod_m [pki][m] representing the most-significant bit-plane value m. Optionally, the codeword determinator 180 may also provide one or more escape codewords (also designated herein with "ARITH_ESCAPE") indicating, for example, how many less-significant bit-planes are available (and, consequently, indicating the numeric weight of the most-significant bit-plane). The first codeword determinator 180 may be configured to provide the codeword associated with a most-significant bit-plane value m using a selected cumulative-frequencies-table having (or being referenced by) a cumulative-frequencies-table index ph.

In order to determine as to which cumulative-frequencies-table should be selected, the arithmetic encoder advantageously comprises a state tracker 182, which is configured to track the state of the arithmetic encoder, for example, by observing which spectral values have been encoded previously. The state tracker 182 consequently provides a state information 184, for example, a state value designated with "s" or "t". The arithmetic encoder 170 also comprises a cumulative-frequencies-table selector 186, which is configured to receive the state information 184 and to provide an information 188 describing the selected cumulative-frequencies-table to the codeword determinator 180. For example, the cumulative-frequencies-table selector 186 may provide a cumulative-frequencies-table index "pki" describing which cumulative-frequencies-table, out of a set of 64 cumulative-frequencies-tables, is selected for usage by the codeword determinator. Alternatively, the cumulative-frequencies-table selector 186 may provide the entire selected cumulative-frequencies-table to the codeword determinator. Thus, the codeword determinator 180 may use the selected cumulative-frequencies-table for the provision of the codeword acod_m[pki][m] of the most-significant bit-plane value m, such that the actual codeword acod_m[pki][m] encoding the most-significant bit-plane value m is dependent on the value of m and the cumulative-frequencies-table index pki, and consequently on the current state information 184. Further details regarding the coding process and the obtained codeword format will be described below.

The arithmetic encoder 170 further comprises a less-significant bit-plane extractor 189*a*, which is configured to extract one or more less-significant bit-planes from the scaled and quantized frequency-domain audio representation 152, if one or more of the spectral values to be encoded exceed the range of values encodable using the most-significant bit-plane only. The less-significant bit-planes may comprise one or more bits, as desired. Accordingly, the less-significant bit-plane extractor 189*a* provides a less-significant bit-plane information 189*b*. The arithmetic encoder 170 also comprises a second codeword determinator 189*c*, which is configured to receive the less-significant bit-plane information 189*d* and to provide, on the basis thereof, 0, 1 or more codewords "acod_r" representing the content of 0, 1 or more less-significant bit-planes. The second codeword determinator 189*c* may be configured to apply an arithmetic encoding algorithm or any other encoding algorithm in order to derive the less-significant bit-plane codewords "acod_r" from the less-significant bit-plane information 189*b*.

It should be noted here that the number of less-significant bit-planes may vary in dependence on the value of the scaled and quantized spectral values 152, such that there may be no less-significant bit-plane at all, if the scaled and quantized spectral value to be encoded is comparatively small, such that there may be one less-significant bit-plane if the current scaled and quantized spectral value to be encoded is of a medium range and such that there may be more than one less-significant bit-plane if the scaled and quantized spectral value to be encoded takes a comparatively large value.

To summarize the above, the arithmetic encoder 170 is configured to encode scaled and quantized spectral values, which are described by the information 152, using a hierarchical encoding process. The most-significant bit-plane (comprising, for example, one, two or three bits per spectral value) is encoded to obtain an arithmetic codeword "acod_m [pki][m]" of a most-significant bit-plane value. One or more less-significant bit-planes (each of the less-significant bit-planes comprising, for example, one, two or three bits) are encoded to obtain one or more codewords "acod_r". When encoding the most-significant bit-plane, the value m of the most-significant bit-plane is mapped to a codeword acod_m [pki][m]. For this purpose, 64 different cumulative-frequencies-tables are available for the encoding of the value m in dependence on a state of the arithmetic encoder 170, i.e. in dependence on previously-encoded spectral values. Accordingly, the codeword "acod_m[pki][m]" is obtained. In addition, one or more codewords "acod_r" are provided and included into the bitstream if one or more less-significant bit-planes are present.

Reset Description

The audio encoder 100 may optionally be configured to decide whether an improvement in bitrate can be obtained by resetting the context, for example by setting the state index to a default value. Accordingly, the audio encoder 100 may be configured to provide a reset information (e.g. named "arith_reset_flag") indicating whether the context for the arithmetic encoding is reset, and also indicating whether the context for the arithmetic decoding in a corresponding decoder should be reset.

Details regarding the bitstream format and the applied cumulative-frequency tables will be discussed below.

4. Audio Decoder

Figure 2A:
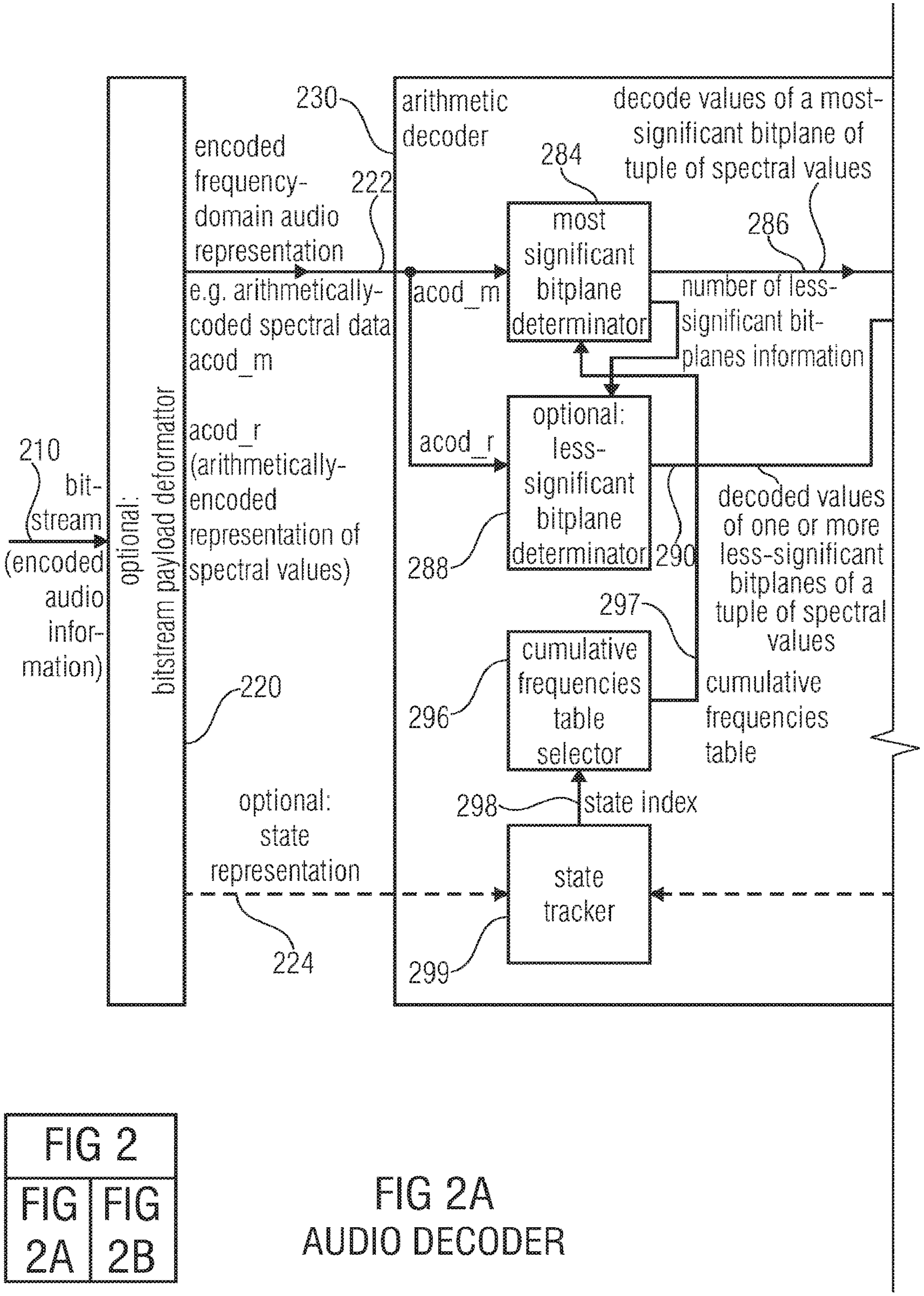
FIGS. 2*a*-2*b* show a block schematic diagram of an audio decoder, according to an embodiment of the invention.
Figure 2B:
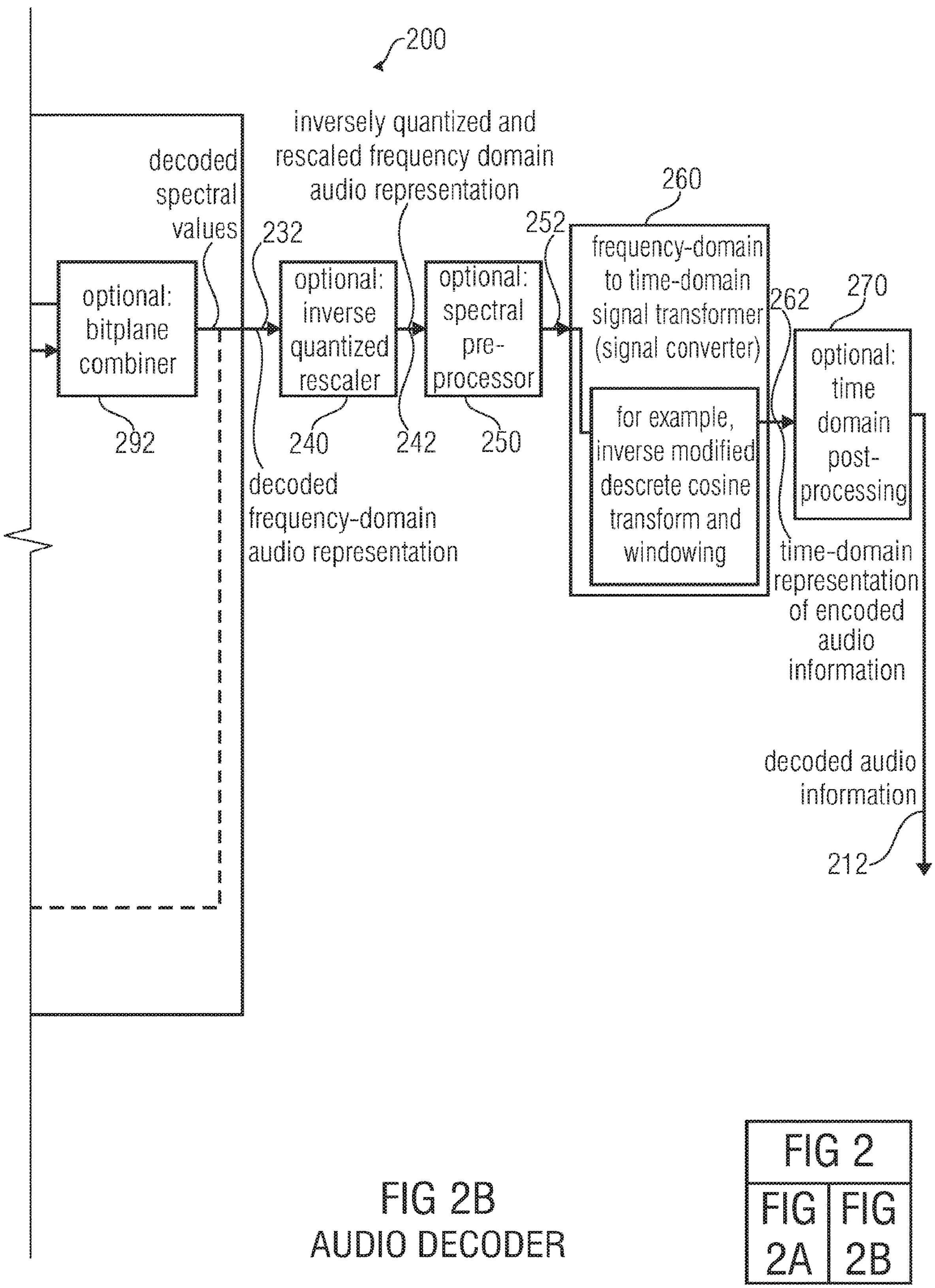

In the following, an audio decoder according to an embodiment of the invention will be described. FIG. 2 shows a block schematic diagram of such an audio decoder 200.

The audio decoder 200 is configured to receive a bitstream 210, which represents an encoded audio information and which may be identical to the bitstream 112 provided by the audio encoder 100. The audio decoder 200 provides a decoded audio information 212 on the basis of the bitstream 210.

The audio decoder 200 comprises an optional bitstream payload de-formatter 220, which is configured to receive the bitstream 210 and to extract from the bitstream 210 an encoded frequency-domain audio representation 222. For example, the bitstream payload de-formatter 220 may be configured to extract from the bitstream 210 arithmetically-coded spectral data like, for example, an arithmetic codeword "acod_m [pki][m]" representing the most-significant bit-plane value m of a spectral value a, and a codeword "acod_r" representing a content of a less-significant bit-plane of the spectral value a of the frequency-domain audio representation. Thus, the encoded frequency-domain audio representation 222 constitutes (or comprises) an arithmetically-encoded representation of spectral values. The bitstream payload deformatter 220 is further configured to extract from the bitstream additional control information, which is not shown in FIG. 2. In addition, the bitstream payload deformatter is optionally configured to extract from the bitstream 210 a state reset information 224, which is also designated as arithmetic reset flag or "arith_reset_flag".

The audio decoder 200 comprises an arithmetic decoder 230, which is also designated as "spectral noiseless decoder". The arithmetic decoder 230 is configured to receive the encoded frequency-domain audio representation 220 and, optionally, the state reset information 224. The arithmetic decoder 230 is also configured to provide a decoded frequency-domain audio representation 232, which may comprise a decoded representation of spectral values. For example, the decoded frequency-domain audio representation 232 may comprise a decoded representation of spectral values, which are described by the encoded frequency-domain audio representation 220.

The audio decoder 200 also comprises an optional inverse quantizer/rescaler 240, which is configured to receive the decoded frequency-domain audio representation 232 and to provide, on the basis thereof, an inversely-quantized and rescaled frequency-domain audio representation 242.

The audio decoder 200 further comprises an optional spectral pre-processor 250, which is configured to receive the inversely-quantized and rescaled frequency-domain audio representation 242 and to provide, on the basis thereof, a pre-processed version 252 of the inversely-quantized and rescaled frequency-domain audio representation 242. The audio decoder 200 also comprises a frequency-domain to time-domain signal transformer 260, which is also designated as a "signal converter". The signal transformer 260 is configured to receive the pre-processed version 252 of the inversely-quantized and rescaled frequency-domain audio representation 242 (or, alternatively, the inversely-quantized and rescaled frequency-domain audio representation 242 or the decoded frequency-domain audio representation 232) and to provide, on the basis thereof, a time-domain representation 262 of the audio information. The frequency-domain to time-domain signal transformer 260 may, for example, comprise a transformer for performing an inverse-modified-discrete-cosine transform (IMDCT) and an appropriate windowing (as well as other auxiliary functionalities, like, for example, an overlap-and-add).

The audio decoder 200 may further comprise an optional time-domain post-processor 270, which is configured to receive the time-domain representation 262 of the audio information and to obtain the decoded audio information 212 using a time-domain post-processing. However, if the post-processing is omitted, the time-domain representation 262 may be identical to the decoded audio information 212.

It should be noted here that the inverse quantizer/rescaler 240, the spectral pre-processor 250, the frequency-domain to time-domain signal transformer 260 and the time-domain post-processor 270 may be controlled in dependence on control information, which is extracted from the bitstream 210 by the bitstream payload deformatter 220.

To summarize the overall functionality of the audio decoder 200, a decoded frequency-domain audio representation 232, for example, a set of spectral values associated with an audio frame of the encoded audio information, may be obtained on the basis of the encoded frequency-domain representation 222 using the arithmetic decoder 230. Subsequently, the set of, for example, 1024 spectral values, which may be MDCT coefficients, are inversely quantized, rescaled and pre-processed. Accordingly, an inversely-quantized, rescaled and spectrally pre-processed set of spectral values (e.g., 1024 MDCT coefficients) is obtained. Afterwards, a time-domain representation of an audio frame is derived from the inversely-quantized, rescaled and spectrally pre-processed set of frequency-domain values (e.g. MDCT coefficients). Accordingly, a time-domain representation of an audio frame is obtained. The time-domain representation of a given audio frame may be combined with time-domain representations of previous and/or subsequent audio frames. For example, an overlap-and-add between time-domain representations of subsequent audio frames may be performed in order to smoothen the transitions between the time-domain representations of the adjacent audio frames and in order to obtain an aliasing cancellation. For details regarding the reconstruction of the decoded audio information 212 on the basis of the decoded time-frequency domain audio representation 232, reference is made, for example, to the International Standard ISO/IEC 14496-3, part 3, sub-part 4 where a detailed discussion is given. However, other more elaborate overlapping and aliasing-cancellation schemes may be used.

In the following, some details regarding the arithmetic decoder 230 will be described. The arithmetic decoder 230 comprises a most-significant bit-plane determinator 284, which is configured to receive the arithmetic codeword acod_m [pki][m] describing the most-significant bit-plane value m. The most-significant bit-plane determinator 284 may be configured to use a cumulative-frequencies table out of a set comprising a plurality of 64 cumulative-frequencies-tables for deriving the most-significant bit-plane value m from the arithmetic codeword "acod_m [pki][m]".

The most-significant bit-plane determinator 284 is configured to derive values 286 of a most-significant bit-plane of spectral values on the basis of the codeword acod_m. The arithmetic decoder 230 further comprises a less-significant bit-plane determinator 288, which is configured to receive one or more codewords "acod_r" representing one or more less-significant bit-planes of a spectral value. Accordingly, the less-significant bit-plane determinator 288 is configured to provide decoded values 290 of one or more less-significant bit-planes. The audio decoder 200 also comprises a bit-plane combiner 292, which is configured to receive the decoded values 286 of the most-significant bit-plane of the spectral values and the decoded values 290 of one or more less-significant bit-planes of the spectral values if such less-significant bit-planes are available for the current spectral values. Accordingly, the bit-plane combiner 292 provides decoded spectral values, which are part of the decoded frequency-domain audio representation 232. Naturally, the arithmetic decoder 230 is typically configured to provide a plurality of spectral values in order to obtain a full set of decoded spectral values associated with a current frame of the audio content.

The arithmetic decoder 230 further comprises a cumulative-frequencies-table selector 296, which is configured to select one of the 64 cumulative-frequencies tables in dependence on a state index 298 describing a state of the arithmetic decoder. The arithmetic decoder 230 further comprises a state tracker 299, which is configured to track a state of the arithmetic decoder in dependence on the previously-decoded spectral values. The state information may optionally be reset to a default state information in response to the state reset information 224. Accordingly, the cumulative-frequencies-table selector 296 is configured to provide an index (e.g. ph) of a selected cumulative-frequencies-table, or a selected cumulative-frequencies-table itself, for application in the decoding of the most-significant bit-plane value m in dependence on the codeword "acod_m".

To summarize the functionality of the audio decoder 200, the audio decoder 200 is configured to receive a bitrate-efficiently-encoded frequency-domain audio representation 222 and to obtain a decoded frequency-domain audio representation on the basis thereof. In the arithmetic decoder 230, which is used for obtaining the decoded frequency-domain audio representation 232 on the basis of the encoded frequency-domain audio representation 222, a probability of different combinations of values of the most-significant bit-plane of adjacent spectral values is exploited by using an arithmetic decoder 280, which is configured to apply a cumulative-frequencies-table. In other words, statistic dependencies between spectral values are exploited by selecting different cumulative-frequencies-tables out of a set comprising 64 different cumulative-frequencies-tables in dependence on a state index 298, which is obtained by observing the previously-computed decoded spectral values.

5. Overview Over the Tool of Spectral Noiseless Coding

In the following, details regarding the encoding and decoding algorithm, which is performed, for example, by the arithmetic encoder 170 and the arithmetic decoder 230 will be explained.

Focus is put on the description of the decoding algorithm. It should be noted, however, that a corresponding encoding algorithm can be performed in accordance with the teachings of the decoding algorithm, wherein mappings are inversed.

It should be noted that the decoding, which will be discussed in the following, is used in order to allow for a so-called "spectral noiseless coding" of typically post-processed, scaled and quantized spectral values. The spectral noiseless coding is used in an audio encoding/decoding concept to further reduce the redundancy of the quantized spectrum, which is obtained, for example, by an energy-compacting time-domain to a frequency-domain transformer.

Figure 4:
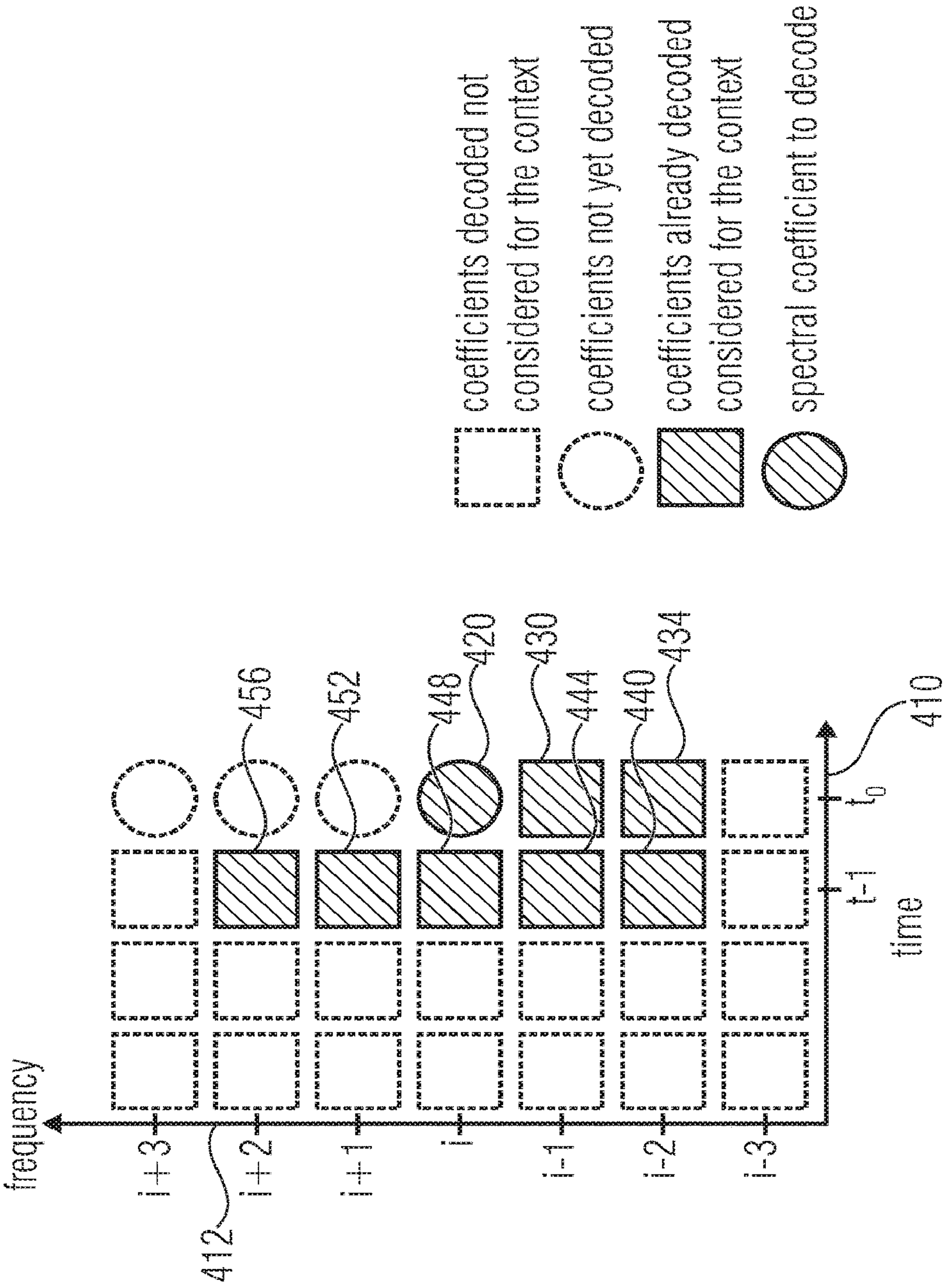
FIG. 4 shows a schematic representation of a context for a state calculation.

The spectral noiseless coding scheme, which is used in embodiments of the invention, is based on an arithmetic coding in conjunction with a dynamically-adapted context. The noiseless coding is fed by (original or encoded representations of) quantized spectral values and uses context-dependent cumulative-frequencies-tables derived, for example, from a plurality of previously-decoded neighboring spectral values. Here, the neighborhood in both time and frequency is taken into account as illustrated in FIG. 4. The cumulative-frequencies-tables (which will be explained below) are then used by the arithmetic coder to generate a variable-length binary code and by the arithmetic decoder to derive decoded values from a variable-length binary code.

For example, the arithmetic coder 170 produces a binary code for a given set of symbols in dependence on the respective probabilities. The binary code is generated by mapping a probability interval, where the set of symbol lies, to a codeword.

In the following, another short overview of the tool of spectral noiseless coding will be given. Spectral noiseless coding is used to further reduce the redundancy of the quantized spectrum. The spectral noiseless coding scheme is based on an arithmetic coding in conjunction with a dynamically adapted context. The noiseless coding is fed by the quantized spectral values and uses context dependent cumulative-frequencies-tables derived from, for example, seven previously-decoded neighboring spectral values Here, the neighborhood in both, time and frequency, is taken into account, as illustrated in FIG. 4. The cumulative-frequencies-tables are then used by the arithmetic coder to generate a variable length binary code.

The arithmetic coder produces a binary code for a given set of symbols and their respective probabilities. The binary code is generated by mapping a probability interval, where the set of symbols lies to a codeword.

6. Decoding Process

6.1 Decoding Process Overview

In the following, an overview of the process of decoding a spectral value will be given taking reference to FIG. 3, which shows a pseudo-program code representation of the process of decoding a plurality of spectral values.

The process of decoding a plurality of spectral values comprises an initialization 310 of a context. The initialization 310 of the context comprises a derivation of the current context from a previous context using the function "arith_map_context (lg)". The derivation of the current context from a previous context may comprise a reset of the context. Both the reset of the context and the derivation of the current context from a previous context will be discussed below.

The decoding of a plurality of spectral values also comprises an iteration of a spectral value decoding 312 and a context update 314, which context update is performed by a function "Arith_update_context(a,i,lg)" which is described below. The spectral value decoding 312 and the context update 314 are repeated lg times, wherein lg indicates the number of spectral values to be decoded (e.g. for an audio frame). The spectral value decoding 312 comprises a context-value calculation 312*a*, a most-significant bit-plane decoding 312*b*, and a less-significant bit-plane addition 312*c*.

The state value computation 312*a* comprises the computation of a first state value s using the function "arith_get_context(i, lg, arith_reset_flag, N/2)" which function returns the first state values. The state value computation 312*a* also comprises a computation of a level value "lev0" and of a level value "lev", which level values "lev0", "lev" are obtained by shifting the first state value s to the right by 24 bits. The state value computation 312*a* also comprises a computation of a second state value t according to the formula shown in FIG. 3 at reference numeral 312*a*.

The most-significant bit-plane decoding 312*b* comprises an iterative execution of a decoding algorithm 312*ba*, wherein a variable j is initialized to 0 before a first execution of the algorithm 312*ba*.

The algorithm 312*ba* comprises a computation of a state index "ph" (which also serves as a cumulative-frequencies-table index) in dependence on the second state value t, and also in dependence on the level values "lev" and lev0, using a function "arith_get_pk( )", which is discussed below. The algorithm 312*ba* also comprises the selection of a cumulative-frequencies-table in dependence on the state index ph, wherein a variable "cum_freq" may be set to a starting address of one out of 64 cumulative-frequencies-tables in dependence on the state index ph. Also, a variable "cfl" may be initialized to a length of the selected cumulative-frequencies-table, which is, for example, equal to the number of symbols in the alphabet, i.e. the number of different values which can be decoded. The lengths of all the cumulative-frequencies-tables from "arith_cf_m[pki=0][9]" to "arith_cf_m[pki=63][9]" available for the decoding of the most-significant bit-plane value m is 9, as eight different most-significant bit-plane values and an escape symbol can be decoded. Subsequently, a most-significant bit-plane value m may be obtained by executing a function "arith_decode( )", taking into consideration the selected cumulative-frequencies-table (described by the variable "cum_freq" and the variable "cfl"). When deriving the most-significant bit-plane value m, bits named "acod_m" of the bitstream 210 may be evaluated (see, for example, FIG. 6*g*).

The algorithm 312*ba* also comprises checking whether the most-significant bit-plane value m is equal to an escape symbol "ARITH_ESCAPE", or not. If the most-significant bit-plane value m is not equal to the arithmetic escape symbol, the algorithm 312*ba* is aborted ("break"-condition) and the remaining instructions of the algorithm 312*ba* are therefore skipped. Accordingly, execution of the process is continued with the setting of the spectral value a to be equal to the most-significant bit-plane value m (instruction "a=m"). In contrast, if the decoded most-significant bit-plane value m is identical to the arithmetic escape symbol "ARITH_ESCAPE", the level value "lev" is increased by one. As mentioned, the algorithm 312*ba* is then repeated until the decoded most-significant bit-plane value m is different from the arithmetic escape symbol.

As soon as most-significant bit-plane decoding is completed, i.e. a most-significant bit-plane value m different from the arithmetic escape symbol has been decoded, the spectral value variable, a" is set to be equal to the most-significant bit-plane value m. Subsequently, the less-significant bit-planes are obtained, for example, as shown at reference numeral 312*c* in FIG. 3. For each less-significant bit-plane of the spectral value, one out of two binary values is decoded. For example, a less-significant bit-plane value r is obtained. Subsequently, the spectral value variable, a" is updated by shifting the content of the spectral value variable a" to the left by 1 bit and by adding the currently-decoded les-significant bit-plane value r as a least-significant bit. However, it should be noted that the concept for obtaining the values of the less-significant bit-planes is not of particular relevance for the present invention. In some embodiments, the decoding of any less-significant bit-planes may even be omitted. Alternatively, different decoding algorithms may be used for this purpose.

6.2 Decoding Order According to FIG. 4

In the following, the decoding order of the spectral values will be described.

Spectral coefficients are noiselessly coded and transmitted (e.g. in the bitstream) starting from the lowest-frequency coefficient and progressing to the highest-frequency coefficient.

Coefficients from an advanced audio coding (for example obtained using a modified-discrete-cosine-transform, as discussed in ISO/IEC 14496, part 3, subpart 4) are stored in an array called "x_ac_quant[g][win][sfb][bin]", and the order of transmission of the noiseless-coding-codeword (e.g.

acod_m, acod_r) is such that when they are decoded in the order received and stored in the array, "bin" (the frequency index) is the most rapidly incrementing index and "g" is the most slowly incrementing index.

Spectral coefficients associated with a lower frequency are encoded before spectral coefficients associated with a higher frequency.

Coefficients from the transform-coded-excitation (tcx) are stored directly in an array x_tcx_invquant[win][bin], and the order of the transmission of the noiseless coding codewords is such that when they are decoded in the order received and stored in the array, "bin" is the most rapidly incrementing index and "win" is the slowest incrementing index. In other words, if the spectral values describe a transform-coded-excitation of the linear-prediction filter of a speech coder, the spectral values a are associated to adjacent and increasing frequencies of the transform-coded-excitation.

Spectral coefficients associated to a lower frequency are encoded before spectral coefficients associated with a higher frequency.

Notably, the audio decoder 200 may be configured to apply the decoded frequency-domain audio representation 232, which is provided by the arithmetic decoder 230, both for a "direct" generation of a time-domain audio signal representation using a frequency-domain to time-domain signal transform and for an "indirect" provision of an audio signal representation using both a frequency-domain to time-domain decoder and a linear-prediction-filter excited by the output of the frequency-domain to time-domain signal transformer.

In other words, the arithmetic decoder 200, the functionality of which is discussed here in detail, is well-suited for decoding spectral values of a time-frequency-domain representation of an audio content encoded in the frequency-domain and for the provision of a time-frequency-domain representation of a stimulus signal for a linear-prediction-filter adapted to decode a speech signal encoded in the linear-prediction-domain. Thus, the arithmetic decoder is well-suited for use in an audio decoder which is capable of handling both frequency-domain-encoded audio content and linear-predictive-frequency-domain-encoded audio content (transform-coded-excitation linear prediction domain mode).

6.3. Context Initialization According to FIGS. 5*a* and 5*b*

In the following, the context initialization (also designated as a "context mapping"), which is performed in a step 310, will be described.

The context initialization comprises a mapping between a past context and a current context in accordance with the algorithm "arith_map_context( )", which is shown in FIG. 5*a*. As can be seen, the current context is stored in a global variable q[2][n_context] which takes the form of an array having a first dimension of two and a second dimension of n_context. A past context is a stored in a variable qs[n_context], which takes the form of a table having a dimension of n_context. The variable "previous_lg" describes a number of spectral values of a past context.

The variable "lg" describes a number of spectral coefficients to decode in the frame. The variable "previous_lg" describes a previous number of spectral lines of a previous frame.

A mapping of the context may be performed in accordance with the algorithm "arith_map_context( )". It should be noted here that the function "arith_map_context( )" sets the entries q[0][i] of the current context array q to the values qs[i] of the past context array qs, if the number of spectral values associated with the current (e.g. frequency-domain-encoded) audio frame is identical to the number of spectral values associated with the previous audio frame for i=0 to i=lg−1.

However, a more complicated mapping is performed if the number of spectral values associated to the current audio frame is different from the number of spectral values associated to the previous audio frame. However, details regarding the mapping in this case are not particularly relevant for the key idea of present invention, such that reference is made to the pseudo program code of FIG. 5*a* for details.

6.4 State Value Computation According to FIGS. 5*b* and 5*c*

In the following, the state value computation 312*a* will be described in more detail.

It should be noted that the first state value s (as shown in FIG. 3) can be obtained as a return value of the function "arith_get_context(i, lg, arith_reset_flag, N/2)", a pseudo program code representation of which is shown in FIGS. 5*b* and 5*c*.

Regarding the computation of the state value, reference is also made to FIG. 4, which shows the context used for a state evaluation. FIG. 4 shows a two-dimensional representation of spectral values, both over time and frequency. An abscissa 410 describes the time, and an ordinate 412 describes the frequency. As can be seen in FIG. 4, a spectral value 420 to decode, is associated with a time index t0 and a frequency index i. As can be seen, for the time index t0, the tuples having frequency indices i−1, i−2 and i−3 are already decoded at the time at which the spectral value 420 having the frequency index i is to be decoded. As can be seen from FIG. 4, a spectral value 430 having a time index t0 and a frequency index i−1 is already decoded before the spectral value 420 is decoded, and the spectral value 430 is considered for the context which is used for the decoding of the spectral value 420. Similarly, a spectral value 434 having a time index t0 and a frequency index i−2, is already decoded before the spectral value 420 is decoded, and the spectral value 434 is considered for the context which is used for decoding the spectral value 420. Similarly, a spectral value 440 having a time index t−1 and a frequency index of i−2, a spectral value 444 having a time index t−1 and a frequency index i−1, a spectral value 448 having a time index t−1 and a frequency index i, a spectral value 452 having a time index t−1 and a frequency index i+1, and a spectral value 456 having a time index t−1 and a frequency index i+2, are already decoded before the spectral value 420 is decoded, and are considered for the determination of the context, which is used for decoding the spectral value 420. The spectral values (coefficients) already decoded at the time when the spectral value 420 is decoded and considered for the context are shown by shaded squares. In contrast, some other spectral values already decoded (at the time when the spectral value 420 is decoded), which are represented by squares having dashed lines, and other spectral values, which are not yet decoded (at the time when the spectral value 420 is decoded) and which are shown by circles having dashed lines, are not used for determining the context for decoding the spectral value 420.

However, it should be noted that some of these spectral values, which are not used for the "regular" (or "normal") computation of the context for decoding the spectral value 420 may, nevertheless, be evaluated for a detection of a plurality of previously-decoded adjacent spectral values which fulfill, individually or taken together, a predetermined condition regarding their magnitudes.

Taking reference now to FIGS. 5*b* and 5*c*, which show the functionality of the function "arith_get_context( )" in the form of a pseudo program code, some more details regarding the calculation of the first context value "s", which is performed by the function "arith_get_context( )", will be described.

It should be noted that the function "arith_get_context( )" receives, as input variables an index i of the spectral value to decode. The index i is typically a frequency index. An input variable lg describes a (total) number of expected quantized coefficients (for a current audio frame). A variable N describes a number of lines of the transformation. A flag "arith_reset_flag" indicates whether the context should be reset. The function "arith_get_context" provides, as an output value, a variable, t", which represents a concatenated state index s and a predicted bit-plane level lev0.

The function "arith_get_context( )" uses integer variables a0, c0, c1, c2, c3, c4, c5, c6, lev0, and "region".

The function "arith_get_context( )" comprises as main functional blocks, a first arithmetic reset processing 510, a detection 512 of a group of a plurality of previously-decoded adjacent zero spectral values, a first variable setting 514, a second variable setting 516, a level adaptation 518, a region value setting 520, a level adaptation 522, a level limitation 524, an arithmetic reset processing 526, a third variable setting 528, a fourth variable setting 530, a fifth variable setting 532, a level adaptation 534, and a selective return value computation 536.

In the first arithmetic reset processing 510, it is checked whether the arithmetic reset flag "arith_reset_flag" is set, while the index of the spectral value to decode is equal to zero. In this case, a context value of zero is returned, and the function is aborted.

In the detection 512 of a group of a plurality of previously-decoded zero spectral values, which is only performed if the arithmetic reset flag is inactive and the index i of the spectral value to decode is different from zero, a variable named "flag" is initialized to 1, as shown at reference numeral 512*a*, and a region of spectral value that is to be evaluated is determined, as shown at reference numeral 512*b*. Subsequently, the region of spectral values, which is determined as shown at reference number 512*b*, is evaluated as shown at reference numeral 512*c*. If it is found that there is a sufficient region of previously-decoded zero spectral values, a context value of 1 is returned, as shown at reference numeral 512*d*. For example, an upper frequency index boundary "lim_max" is set to i+6, unless index i of the spectral value to be decoded is close to a maximum frequency index lg−1, in which case a special setting of the upper frequency index boundary is made, as shown at reference numeral 512*b*. Moreover, a lower frequency index boundary "lim_min" is set to −5, unless the index i of the spectral value to decode is close to zero (i+lim_min<0), in which case a special computation of the lower frequency index boundary lim_min is performed, as shown at reference numeral 512*b*. When evaluating the region of spectral values determined in step 512*b*, an evaluation is first performed for negative frequency indices k between the lower frequency index boundary lim_min and zero. For frequency indices k between lim_min and zero, it is verified whether at least one out of the context values q[0][k].c and q[1][k].c is equal to zero. If, however, both of the context values q[0][k].c and q[1][k].c are different from zero for any frequency indices k between lim_min and zero, it is concluded that there is no sufficient group of zero spectral values and the evaluation 512*c* is aborted. Subsequently, context values q[0][k].c for frequency indices between zero and lim_max are evaluated. If it found that any of the context values q[0][k].c for any of the frequency indices between zero and lim_max is different from zero, it is concluded that there is no sufficient group of previously-decoded zero spectral values, and the evaluation 512*c* is aborted. If, however, it is found that for every frequency indices k between lim_min and zero, there is at least one context value q[0][k].c or q[1][k].c which is equal to zero and if there is a zero context value q[0][k].c for every frequency index k between zero and lim_max, it is concluded that there is a sufficient group of previously-decoded zero spectral values. Accordingly, a context value of 1 is returned in this case to indicate this condition, without any further calculation. In other words, calculations 514, 516, 518, 520, 522, 524, 526, 528, 530, 532, 534, 536 are skipped, if a sufficient group of a plurality of context values q[0] [k].c, q[1] [k].c having a value of zero is identified. In other words, the returned context value, which describes the context state (s), is determined independent from the previously decoded spectral values in response to the detection that the predetermined condition is fulfilled.

Otherwise, i.e. if there is no sufficient group of context values [q] [0] [k].c, [q][1][k].c, which are zero at least some of the computations 514, 516, 518, 520, 522, 524,526, 528, 530, 532, 534, 536 are executed.

In the first variable setting 514, which is selectively executed if (and only if) index i of the spectral value to be decoded is less than 1, the variable a0 is initialized to take the context value q[1][i−1], and the variable c0 is initialized to take the absolute value of the variable a0. The variable, lev0" is initialized to take the value of zero. Subsequently, the variables, lev0" and c0 are increased if the variable a0 comprises a comparatively large absolute value, i.e. is smaller than −4, or larger or equal to 4. The increase of the variables, lev0" and c0 is performed iteratively, until the value of the variable a0 is brought into a range between −4 and 3 by a shift-to-the-right operation (step 514*b*).

Subsequently, the variables c0 and, lev0" are limited to maximum values of 7 and 3, respectively (step 514*c*).

If the index i of the spectral value to be decoded is equal to 1 and the arithmetic reset flag ("arith_reset_flag") is active, a context value is returned, which is computed merely on the basis of the variables c0 and lev( )(step 514*d*). Accordingly, only a single previously-decoded spectral value having the same time index as the spectral value to decode and having a frequency index which is smaller, by 1, than the frequency index i of the spectral value to be decoded, is considered for the context computation (step 514*d*). Otherwise, i.e. if there is no arithmetic reset functionality, the variable c4 is initialized (step 514*e*).

To conclude, in the first variable setting 514, the variables c0 and, lev0" are initialized in dependence on a previously-decoded spectral value, decoded for the same frame as the spectral value to be currently decoded and for a preceding spectral bin i−1. The variable c4 is initialized in dependence on a previously-decoded spectral value, decoded for a previous audio frame (having time index t−1) and having a frequency which is lower (e.g., by one frequency bin) than the frequency associated with the spectral value to be currently decoded.

The second variable setting 516 which is selectively executed if (and only if) the frequency index of the spectral value to be currently decoded is larger than 1, comprises an initialization of the variables c1 and c6 and an update of the variable lev0. The variable c1 is updated in dependence on a context value q[1][i−2].c associated with a previously-decoded spectral value of the current audio frame, a frequency of which is smaller (e.g. by two frequency bins) than a frequency of a spectral value currently to be decoded. Similarly, variable c6 is initialized in dependence on a context value q[0][i−2].c, which describes a previously-decoded spectral value of a previous frame (having time index t−1), an associated frequency of which is smaller (e.g. by two frequency bins) than a frequency associated with the spectral value to currently be decoded. In addition, the level variable, lev0" is set to a level value q[1][i−2].1 associated with a previously-decoded spectral value of the current frame, an associated frequency of which is smaller (e.g. by two frequency bins) than a frequency associated with the spectral value to currently be decoded, if q[1][i−2].1 is larger than lev0.

The level adaptation 518 and the region value setting 520 are selectively executed, if (and only if) the index i of the spectral value to be decoded is larger than 2. In the level adaptation 518, the level variable, lev0" is increased to a value of q[1][i−3].1, if the level value q[1][i−3].1 which is associated to a previously-decoded spectral value of the current frame, an associated frequency of which is smaller (e.g. by three frequency bins) than the frequency associated with the spectral value to currently be decoded, is larger than the level value lev0.

In the region value setting 520, a variable "region" is set in dependence on an evaluation, in which spectral region, out of a plurality of spectral regions, the spectral value to currently be decoded is arranged. For example, if it is found that the spectral value to be currently decoded is associated to a frequency bin (having frequency bin index i) which is in the first (lower most) quarter of the frequency bins ($0 \le i < N/4$), the region variable "region" is set to zero. Otherwise, if the spectral value currently to be decoded is associated to a frequency bin which is in a second quarter of the frequency bins associated to the current frame ($N/4 \le i < N/2$), the region variable is set to a value of 1. Otherwise, i.e. if the spectral value currently to be decoded is associated to a frequency bin which is in the second (upper) half of the frequency bins ($N/2 \le i < N$), the region variable is set to 2. Thus, a region variable is set in dependence on an evaluation to which frequency region the spectral value currently to be decoded is associated. Two or more frequency regions may be distinguished.

An additional level adaptation 522 is executed if (and only if) the spectral value currently to be decoded comprises a spectral index which is larger than 3. In this case, the level variable lev0" is increased (set to the value q[1][i−4].1) if the level value q[i][i−4].1, which is associated to a previously-decoded spectral value of the current frame, which is associated to a frequency which is smaller, for example, by four frequency bins, than a frequency associated to the spectral value currently to be decoded is larger than the current level, lev0" (step 522). The level variable, lev0" is limited to a maximum value of 3 (step 524).

If an arithmetic reset condition is detected and the index i of the spectral value currently to be decoded is larger than 1, the state value is returned in dependence on the variables c0, c1, lev0, as well as in dependence on the region variable "region" (step 526). Accordingly, previously-decoded spectral values of any previous frames are left out of consideration if an arithmetic reset condition is given.

In the third variable setting 528, the variable c2 is set to the context value q[0][i].c, which is associated to a previously-decoded spectral value of the previous audio frame (having time index t−1), which previously-decoded spectral value is associated with the same frequency as the spectral value currently to be decoded.

In the fourth variable setting 530, the variable c3 is set to the context value q[0][i+1].c, which is associated to a previously-decoded spectral value of the previous audio frame having a frequency index i+1, unless the spectral value currently to be decoded is associated with the highest possible frequency index lg-1.

In the fifth variable setting 532, the variable c5 is set to the context value q[0][i+2].c, which is associated with a previously-decoded spectral value of the previous audio frame having frequency index i+2, unless the frequency index i of the spectral value currently to be decoded is too close to the maximum frequency index value (i.e. takes the frequency index value lg-2 or lg-1).

An additional adaptation of the level variable, lev0" is performed if the frequency index i is equal to zero (i.e. if the spectral value currently to be decoded is the lowermost spectral value). In this case, the level variable, lev0" is increased from zero to 1, if the variable c2 or c3 takes a value of 3, which indicates that a previously-decoded spectral value of a previous audio frame, which is associated with the same frequency or even a higher frequency, when compared to the frequency associated with the spectral value currently to be encoded, takes a comparatively large value.

In the selective return value computation 536, the return value is computed in dependence on whether the index i of the spectral values currently to be decoded takes the value zero, 1, or a larger value. The return value is computed in dependence on the variables c2, c3, c5 and lev0, as indicated at reference numeral **536*a*, if index i takes the value of zero. The return value is computed in dependence on the variables c0, c2, c3, c4, c5, and, lev0" as shown at reference numeral 536*b*, if index i takes the value of 1. The return value is computed in dependence on the variable c0, c2, c3, c4, c1, c5, c6, "region", and lev0, if the index i takes a value which is different from zero or 1 (reference numeral 536*c***).

To summarize the above, the context value computation "arith_get_context( )" comprises a detection 512 of a group of a plurality of previously-decoded zero spectral values (or at least, sufficiently small spectral values). If a sufficient group of previously-decoded zero spectral values is found, the presence of a special context is indicated by setting the return value to 1. Otherwise, the context value computation is performed. It can generally be said that in the context value computation, the index value i is evaluated in order to decide how many previously-decoded spectral values should be evaluated. For example, a number of evaluated previously-decoded spectral values is reduced if a frequency index i of the spectral value currently to be decoded is close to a lower boundary (e.g. zero), or close to an upper boundary (e.g. lg-1). In addition, even if the frequency index i of the spectral value currently to be decoded is sufficiently far away from a minimum value, different spectral regions are distinguished by the region value setting 520. Accordingly, different statistical properties of different spectral regions (e.g. first, low frequency spectral region, second, medium frequency spectral region, and third, high frequency spectral region) are taken into consideration. The context value, which is calculated as a return value, is dependent on the variable "region", such that the returned context value is dependent on whether a spectral value currently to be decoded is in a first predetermined frequency region or in a second predetermined frequency region (or in any other predetermined frequency region).

6.5 Mapping Rule Selection

In the following, the selection of a mapping rule, for example, a cumulative-frequencies-table, which describes a mapping of a code value onto a symbol code, will be described. The selection of the mapping rule is made in dependence on the context state, which is described by the state value s or t.

6.5.1 Mapping Rule Selection Using the Algorithm According to FIG. 5*d*

In the following, the selection of a mapping rule using the function "get_pk" according to FIG. 5*d* will be described. It should be noted that the function "get_pk" may be performed to obtain the value of "pki" in the sub-algorithm 312*ba* of the algorithm of FIG. 3. Thus, the function "get_pk" may take the place of the function "arith_get_pk" in the algorithm of FIG. 3.

It should also be noted that a function "get_pk" according to FIG. 5*d* may evaluate the table "ari_s_hash[387]" according to FIGS. 17(1) and 17(2) and a table "ari_gs_hash"[225] according to FIG. 18.

The function "get_pk" receives, as an input variable, a state value s, which may be obtained by a combination of the variable, t" according to FIG. 3 and the variables "led", "lev0" according to FIG. 3. The function "get_pk" is also configured to return, as a return value, a value of a variable "pki", which designates a mapping rule or a cumulative-frequencies-table. The function "get_pk" is configured to map the state value s onto a mapping rule index value "pki".

The function "get_pk" comprises a first table evaluation 540, and a second table evaluation 544. The first table evaluation 540 comprises a variable initialization 541 in which the variables i_min, i_max, and i are initialized, as shown at reference numeral 541. The first table evaluation 540 also comprises an iterative table search 542, in the course of which a determination is made as to whether there is an entry of the table "ari_s_hash" which matches the state value s. If such a match is identified during the iterative table search 542, the function get_pk is aborted, wherein a return value of the function is determined by the entry of the table "ari_s_hash" which matches the state value s, as will be explained in more detail. If, however, no perfect match between the state value s and an entry of the table "ari_s_hash" is found during the course of the iterative table search 542, a boundary entry check 543 is performed.

Turning now to the details of the first table evaluation 540, it can be seen that a search interval is defined by the variables i_min and i_max. The iterative table search 542 is repeated as long as the interval defined by the variables i_min and i_max is sufficiently large, which may be true if the condition i_max−i_min>1 is fulfilled. Subsequently, the variable i is set, at least approximately, to designate the middle of the interval (i=i_min+(i_max−i_min)/2). Subsequently, a variable j is set to a value which is determined by the array "ari_s_hash" at an array position designated by the variable i (reference numeral 542). It should be noted here that each entry of the table "ari_s_hash" describes both, a state value, which is associated to the table entry, and a mapping rule index value which is associated to the table entry. The state value, which is associated to the table entry, is described by the more-significant bits (bits 8-31) of the table entry, while the mapping rule index values are described by the lower bits (e.g. bits 0-7) of said table entry. The lower boundary i_min or the upper boundary i_max are adapted in dependence on whether the state value s is smaller than a state value described by the most-significant 24 bits of the entry "ari_s_hash[i]" of the table "ari_s_hash" referenced by the variable i. For example, if the state value s is smaller than the state value described by the most-significant 24 bits of the entry "ari_s_hash[i]", the upper boundary i_max of the table interval is set to the value i. Accordingly, the table interval for the next iteration of the iterative table search 542 is restricted to the lower half of the table interval (from i_min to i_max) used for the present iteration of the iterative table search 542. If, in contrast, the state value s is larger than the state values described by the most-significant 24 bits of the table entry "ari_s_hash[i]", then the lower boundary i_min of the table interval for the next iteration of the iterative table search 542 is set to value i, such that the upper half of the current table interval (between i_min and i_max) is used as the table interval for the next iterative table search. If, however, it is found that the state value s is identical to the state value described by the most-significant 24 bits of the table entry "ari_s_hash [i]", the mapping rule index value described by the least-significant 8-bits of the table entry "ari_s_hash[i]" is returned by the function "get_pk", and the function is aborted.

The iterative table search 542 is repeated until the table interval defined by the variables i_min and i_max is sufficiently small.

A boundary entry check 543 is (optionally) executed to supplement the iterative table search 542. If the index variable i is equal to index variable i_max after the completion of the iterative table search 542, a final check is made whether the state value s is equal to a state value described by the most-significant 24 bits of a table entry "ari_s_hash [i_min]", and a mapping rule index value described by the least-significant 8 bits of the entry "ari_s_hash[i_min]" is returned, in this case, as a result of the function "get_pk". In contrast, if the index variable i is different from the index variable i_max, then a check is performed as to whether a state value s is equal to a state value described by the most-significant 24 bits of the table entry "ari_s_ hash[i_max]", and a mapping rule index value described by the least-significant 8 bits of said table entry "ari_s_hash [i_max]" is returned as a return value of the function "get_pk" in this case.

However, it should be noted that the boundary entry check 543 may be considered as optional in its entirety.

Subsequent to the first table evaluation 540, the second table evaluation 544 is performed, unless a "direct hit" has occurred during the first table evaluation 540, in that the state value s is identical to one of the state values described by the entries of the table "ari_s_hash" (or, more precisely, by the 24 most-significant bits thereof).

The second table evaluation 544 comprises a variable initialization 545, in which the index variables i_min, i and i_max are initialized, as shown at reference numeral 545. The second table evaluation 544 also comprises an iterative table search 546, in the course of which the table "ari_gs_hash" is searched for an entry which represents a state value identical to the state value s. Finally, the second table search 544 comprises a return value determination 547.

The iterative table search 546 is repeated as long as the table interval defined by the index variables i_min and i_max is large enough (e.g. as long as i_max−i_min>1). In the iteration of the iterative table search 546, the variable i is set to the center of the table interval defined by i_min and i_max (step 546*a*). Subsequently, an entry j of the table "ari_gs_hash" is obtained at a table location determined by the index variable i (546*b*). In other words, the table entry "ari_gs_hash[i]" is a table entry at the center of the current table interval defined by the table indices i_min and i_max. Subsequently, the table interval for the next iteration of the iterative table search 546 is determined. For this purpose, the index value i_max describing the upper boundary of the table interval is set to the value i, if the state value s is smaller than a state value described by the most-significant 24 bits of the table entry "j=ari_gs_hash[i]" (546*c*). In other words, the lower half of the current table interval is selected as the new table interval for the next iteration of the iterative table search 546 (step 546*c*). Otherwise, if the state value s is larger than a state value described by the most-significant 24 bits of the table entry "j=ari_gs_hash[i]", the index value i_min is set to the value i. Accordingly, the upper half of the current table interval is selected as the new table interval for the next iteration of the iterative table search 546 (step 546*d*). If, however, it is found that the state value s is identical to a state value described by the uppermost 24 bits of the table entry "j=ari_gs_hash[i]", the index variable i_max is set to the value i+1 or to the value 224 (if i+1 is larger than 224), and the iterative table search 546 is aborted. However, if the state value s is different from the state value described by the 24 most-significant bits of "j=ari_gs_hash [i]", the iterative table search 546 is repeated with the newly set table interval defined by the updated index values i_min and i_max, unless the table interval is too small (i_max−i_min<1). Thus, the interval size of the table interval (defined by i_min and i_max) is iteratively reduced until a "direct hit" is detected (s==(j>>8)) or the interval reaches a minimum allowable size (i_max−i_min≤1). Finally, following an abortion of the iterative table search 546, a table entry "j=ari_gs_hash[i_max]" is determined and a mapping rule index value, which is described by the 8 least-significant bits of said table entry "j=ari_gs_hash[i_max]" is returned as the return value of the function "get_pk". Accordingly, the mapping rule index value is determined in dependence on the upper boundary i_max of the table interval (defined by i_min and i_max) after the completion or abortion of the iterative table search 546.

The above-described table evaluations 540, 544, which both use iterative table search 542, 546, allow for the examination of tables "ari_s_hash" and "ari_gs_hash" for the presence of a given significant state with very high computational efficiency. In particular, a number of table access operations can be kept reasonably small, even in a worst case. It has been found that a numeric ordering of the table "ari_s_hash" and "ari_gs_hash" allows for the acceleration of the search for an appropriate hash value. In addition, a table size can be kept small as the inclusion of escape symbols in tables "ari_s_hash" and "ari_gs_hash" is not required. Thus, an efficient context hashing mechanism is established even though there are a large number of different states: In a first stage (first table evaluation 540), a search for a direct hit is conducted (s==(j>>8)).

In the second stage (second table evaluation 544) ranges of the state value s can be mapped onto mapping rule index values. Thus, a well-balanced handling of particularly significant states, for which there is an associated entry in the table "ari_s_hash", and less-significant states, for which there is a range-based handling, can be performed. Accordingly, the function "get_pk" constitutes an efficient implementation of a mapping rule selection.

For any further details, reference is made to the pseudo program code of FIG. 5*d*, which represents the functionality of the function "get_pk" in a representation in accordance with the well-known programming language C.

6.5.2 Mapping Rule Selection Using the Algorithm According to FIG. 5*e*

In the following, another algorithm for a selection of the mapping rule will be described taking reference to FIG. 5*e*. It should be noted that the algorithm "arith_get_pk" according to FIG. 5*e* receives, as an input variable, a state value s describing a state of the context. The function "arith_get_pk" provides, as an output value, or return value, an index "pki" of a probability model, which may be an index for selecting a mapping rule, (e.g., a cumulative-frequencies-table).

It should be noted that the function "arith_get_pk" according to FIG. 5*e* may take the functionality of the function "arith_get_pk" of the function "value_decode" of FIG. 3.

It should also be noted that the function "arith_get_pk" may, for example, evaluate the table ari_s_hash according to FIG. 20, and the table ari_gs_hash according to FIG. 18.

The function "arith_get_pk" according to FIG. 5*e* comprises a first table evaluation 550 and a second table evaluation 560. In the first table evaluation 550, a linear scan is made through the table ari_s_hash, to obtain an entry j=ari_s_hash[i] of said table. If a state value described by the most-significant 24 bits of a table entry j=ari_s_hash[i] of the table ari_s_hash is equal to the state value s, a mapping rule index value "pki" described by the least-significant 8 bits of said identified table entry j=ari_s_hash[i] is returned and the function "arith_get_pk" is aborted. Accordingly, all 387 entries of the table ari_s_hash are evaluated in an ascending sequence unless a "direct hit" (state value s equal to the state value described by the most-significant 24 bits of a table entry j) is identified.

If a direct hit is not identified within the first table evaluation 550, a second table evaluation 560 is executed. In the course of the second table evaluation, a linear scan with entry indices i increasing linearly from zero to a maximum value of 224 is performed. During the second table evaluation, an entry "ari_gs_hash[i]" of the table "ari_gs_hash" for table i is read, and the table entry "j=ari_gs_hash[i] is evaluated in that it is determined whether the state value represented by the 24 most-significant bits of the table entry j is larger than the state value s. If this is the case, a mapping rule index value described by the 8 least-significant bits of said table entry j is returned as the return value of the function "arith_get_pk", and the execution of the function "arith_get_pk" is aborted. If, however, the state value s is not smaller than the state value described by the 24 most-significant bits of the current table entry j=ari_gs_hash[i], the scan through the entries of the table ari_gs_hash is continued by increasing the table index i. If, however, the state value s is larger than or equal to any of the state values described by the entries of the table ari_gs_hash, a mapping rule index value pki" defined by the 8 least-significant bits of the last entry of the table ari_gs_hash is returned as the return value of the function "arith_get_pk".

To summarize, the function "arith_get_pk" according to FIG. 5*e* performs a two-step hashing. In a first step, a search for a direct hit is performed, wherein it is determined whether the state value s is equal to the state value defined by any of the entries of a first table "ari_s_hash". If a direct hit is identified in the first table evaluation 550, a return value is obtained from the first table "ari_s_hash" and the function "arith_get_pk" is aborted. If, however, no direct hit is identified in the first table evaluation 550, the second table evaluation 560 is performed. In the second table evaluation, a range-based evaluation is performed. Subsequent entries of the second table "ari_gs_hash" define ranges. If it is found that the state value s lies within such a range (which is indicated by the fact that the state value described by the 24 most-significant bits of the current table entry "j=ari_gs_hash[i] is larger than the state value s, the mapping rule index value "pki" described by the 8 least-significant bits of the table entry j=ari_gs_hash[i] is returned.

6.5.3 Mapping Rule Selection Using the Algorithm According to FIG. 5*f*

The function "get_pk" according to FIG. 5*f* is substantially equivalent to the function "arith_get_pk" according to FIG. 5*e*. Accordingly, reference is made to the above discussion. For further details, reference is made to the pseudo program representation in FIG. 5*f*.

It should be noted that the function, get_pk" according to FIG. 5*f* may take the place of the function "arith_get_pk" called in the function "value_decode" of FIG. 3.

6.6. Function "Arith_Decode( )" According to FIG. 5*g*

In the following, the functionality of the function "arith_decode( )" will be discussed in detail taking reference to FIG. 5*g*. It should be noted that the function "arith_decode( )" uses the helper function "arith_first_symbol (void)", which returns TRUE, if it is the first symbol of the sequence and FALSE otherwise. The function "arith_decode( )" also uses the helper function "arith_get_next_bit (void)", which gets and provides the next bit of the bitstream.

In addition, the function "arith_decode( )" uses the global variables "low", "high" and "value". Further, the function "arith_decode( )" receives, as an input variable, the variable "cum_freq[ ]", which points towards a first entry or element (having element index or entry index 0) of the selected cumulative-frequencies-table. Also, the function "arith_decode( )" uses the input variable "cfl", which indicates the length of the selected cumulative-frequencies-table designated by the variable "cum_freq[ ]".

The function "arith_decode( )" comprises, as a first step, a variable initialization 570*a*, which is performed if the helper function "arith_first_symbol( )" indicates that the first symbol of a sequence of symbols is being decoded. The value initialization 550*a* initializes the variable "value" in dependence on a plurality of, for example, 20 bits, which are obtained from the bitstream using the helper function "arith_get_next_bit", such that the variable "value" takes the value represented by said bits. Also, the variable "low" is initialized to take the value of 0, and the variable "high" is initialized to take the value of 1048575.

In a second step 570*b*, the variable "range" is set to a value, which is larger, by 1, than the difference between the values of the variables "high" and "low". The variable "cum" is set to a value which represents a relative position of the value of the variable "value" between the value of the variable "low" and the value of the variable "high". Accordingly, the variable "cum" takes, for example, a value between 0 and $2^{16}$ in dependence on the value of the variable "value".

The pointer p is initialized to a value which is smaller, by 1, than the starting address of the selected cumulative-frequencies-table.

The algorithm "arith_decode( )" also comprises an iterative cumulative-frequencies-table-search 570*c*. The iterative cumulative-frequencies-table-search is repeated until the variable cfl is smaller than or equal to 1. In the iterative cumulative-frequencies-table-search 570*c*, the pointer variable q is set to a value, which is equal to the sum of the current value of the pointer variable p and half the value of the variable "cfl". If the value of the entry *q of the selected cumulative-frequencies-table, which entry is addressed by the pointer variable q, is larger than the value of the variable "cum", the pointer variable p is set to the value of the pointer variable q, and the variable "cfl" is incremented. Finally, the variable "cfl" is shifted to the right by one bit, thereby effectively dividing the value of the variable "cfl" by 2 and neglecting the modulo portion.

Accordingly, the iterative cumulative-frequencies-table-search 570*c* effectively compares the value of the variable "cum" with a plurality of entries of the selected cumulative-frequencies-table, in order to identify an interval within the selected cumulative-frequencies-table, which is bounded by entries of the cumulative-frequencies-table, such that the value cum lies within the identified interval. Accordingly, the entries of the selected cumulative-frequencies-table define intervals, wherein a respective symbol value is associated to each of the intervals of the selected cumulative-frequencies-table. Also, the widths of the intervals between two adjacent values of the cumulative-frequencies-table define probabilities of the symbols associated with said intervals, such that the selected cumulative-frequencies-table in its entirety defines a probability distribution of the different symbols (or symbol values). Details regarding the available cumulative-frequencies-tables will be discussed below taking reference to FIG. 19.

Taking reference again to FIG. 5*g*, the symbol value is derived from the value of the pointer variable p, wherein the symbol value is derived as shown at reference numeral 570*d*. Thus, the difference between the value of the pointer variable p and the starting address "cum_freq" is evaluated in order to obtain the symbol value, which is represented by the variable "symbol".

The algorithm "arith_decode" also comprises an adaptation 570*e* of the variables "high" and "low". If the symbol value represented by the variable "symbol" is different from 0, the variable "high" is updated, as shown at reference numeral 570*e*. Also, the value of the variable "low" is updated, as shown at reference numeral 570*e*. The variable "high" is set to a value which is determined by the value of the variable "low", the variable "range" and the entry having the index "symbol —1" of the selected cumulative-frequencies-table. The variable "low" is increased, wherein the magnitude of the increase is determined by the variable "range" and the entry of the selected cumulative-frequencies-table having the index "symbol". Accordingly, the difference between the values of the variables "low" and "high" is adjusted in dependence on the numeric difference between two adjacent entries of the selected cumulative-frequencies-table.

Accordingly, if a symbol value having a low probability is detected, the interval between the values of the variables "low" and "high" is reduced to a narrow width. In contrast, if the detected symbol value comprises a relatively large probability, the width of the interval between the values of the variables "low" and "high" is set to a comparatively large value. Again, the width of the interval between the values of the variable "low" and "high" is dependent on the detected symbol and the corresponding entries of the cumulative-frequencies-table.

The algorithm "arith_decode( )" also comprises an interval renormalization 570*f*, in which the interval determined in the step 570*e* is iteratively shifted and scaled until the "break"-condition is reached. In the interval renormalization 570*f*, a selective shift-downward operation 570*fa* is performed. If the variable "high" is smaller than 524286, nothing is done, and the interval renormalization continues with an interval-size-increase operation 570*fb*. If, however, the variable "high" is not smaller than 524286 and the variable "low" is greater than or equal to 524286, the variables "values", "low" and "high" are all reduced by 524286, such that an interval defined by the variables "low" and "high" is shifted downwards, and such that the value of the variable "value" is also shifted downwards. If, however, it is found that the value of the variable "high" is not smaller than 524286, and that the variable "low" is not greater than or equal to 524286, and that the variable "low" is greater than or equal to 262143 and that the variable "high" is smaller than 786429, the variables "value", "low" and "high" are all reduced by 262143, thereby shifting down the interval between the values of the variables "high" and "low" and also the value of the variable "value". If, however, neither of the above conditions is fulfilled, the interval renormalization is aborted.

If, however, any of the above-mentioned conditions, which are evaluated in the step 570*fa*, is fulfilled, the interval-increase-operation 570*fb* is executed. In the interval-increase-operation 570*fb*, the value of the variable "low" is doubled. Also, the value of the variable "high" is doubled, and the result of the doubling is increased by 1. Also, the value of the variable "value" is doubled (shifted to the left by one bit), and a bit of the bitstream, which is obtained by the helper function "arith_get_next_bit" is used as the least-significant bit. Accordingly, the size of the interval between the values of the variables "low" and "high" is approximately doubled, and the precision of the variable "value" is increased by using a new bit of the bitstream. As mentioned above, the steps 570*fa* and 570*fb* are repeated until the "break" condition is reached, i.e. until the interval between the values of the variables "low" and "high" is large enough.

Regarding the functionality of the algorithm "arith_decode( )", it should be noted that the interval between the values of the variables "low" and "high" is reduced in the step 570*e* in dependence on two adjacent entries of the cumulative-frequencies-table referenced by the variable "cum_freq". If an interval between two adjacent values of the selected cumulative-frequencies-table is small, i.e. if the adjacent values are comparatively close together, the interval between the values of the variables "low" and "high", which is obtained in the step 570*e*, will be comparatively small. In contrast, if two adjacent entries of the cumulative-frequencies-table are spaced further, the interval between the values of the variables "low" and "high", which is obtained in the step 570*e*, will be comparatively large.

Consequently, if the interval between the values of the variables "low" and "high", which is obtained in the step 570*e*, is comparatively small, a large number of interval renormalization steps will be executed to re-scale the interval to a "sufficient" size (such that neither of the conditions of the condition evaluation 570*fa* is fulfilled). Accordingly, a comparatively large number of bits from the bitstream will be used in order to increase the precision of the variable "value". If, in contrast, the interval size obtained in the step 570*e* is comparatively large, only a smaller number of repetitions of the interval normalization steps 570*fa* and 570*fb* may be used in order to renormalize the interval between the values of the variables "low" and "high" to a "sufficient" size. Accordingly, only a comparatively small number of bits from the bitstream will be used to increase the precision of the variable "value" and to prepare a decoding of a next symbol.

To summarize the above, if a symbol is decoded, which comprises a comparatively high probability, and to which a large interval is associated by the entries of the selected cumulative-frequencies-table, only a comparatively small number of bits will be read from the bitstream in order to allow for the decoding of a subsequent symbol. In contrast, if a symbol is decoded, which comprises a comparatively small probability and to which a small interval is associated by the entries of the selected cumulative-frequencies-table, a comparatively large number of bits will be taken from the bitstream in order to prepare a decoding of the next symbol.

Accordingly, the entries of the cumulative-frequencies-tables reflect the probabilities of the different symbols and also reflect a number of bits that may be used for decoding a sequence of symbols. By varying the cumulative-frequencies-table in dependence on a context, i.e. in dependence on previously-decoded symbols (or spectral values), for example, by selecting different cumulative-frequencies-tables in dependence on the context, stochastic dependencies between the different symbols can be exploited, which allows for a particular bitrate-efficient encoding of the subsequent (or adjacent) symbols.

To summarize the above, the function "arith_decode( )", which has been described with reference to FIG. 5*g*, is called with the cumulative-frequencies-table "arith_cf_m[pki][ ]", corresponding to the index "pki" returned by the function "arith_get_pk( )" to determine the most-significant bit-plane value m (which may be set to the symbol value represented by the return variable "symbol").

6.7 Escape Mechanism

While the decoded most-significant bit-plane value m (which is returned as a symbol value by the function "arith_decode( )" is the escape symbol "ARITH_ESCAPE", an additional most-significant bit-plane value m is decoded and the variable "led" is incremented by 1.

Accordingly, an information is obtained about the numeric significance of the most-significant bit-plane value m as well as on the number of less-significant bit-planes to be decoded.

If an escape symbol "ARITH_ESCAPE" is decoded, the level variable "led" is increased by 1. Accordingly, the state value which is input to the function "arith_get_pk" is also modified in that a value represented by the uppermost bits (bits 24 and up) is increased for the next iterations of the algorithm 312*ba*.

6.8 Context Update According to FIG. 5*h*

Once the spectral value is completely decoded (i.e. all of the least-significant bit-planes have been added, the context tables q and qs are updated by calling the function "arith_update_context(a,i,lg))". In the following, details regarding the function "arith_update_context(a,i,lg)" will be described taking reference to FIG. 5*h*, which shows a pseudo program code representation of said function.

The function "arith_update_context( )" receives, as input variables, the decoded quantized spectral coefficient a, the index i of the spectral value to be decoded (or of the decoded spectral value) and the number lg of spectral values (or coefficients) associated with the current audio frame.

In a step 580, the currently decoded quantized spectral value (or coefficient) a is copied into the context table or context array q. Accordingly, the entry q[1] [i] of the context table q is set to a. Also, the variable "a0" is set to the value of "a".

In a step 582, the level value q[1][i]0.1 of the context table q is determined. By default, the level value q[1][i]0.1 of the context table q is set to zero. However, if the absolute value of the currently coded spectral value a is larger than 4, the level value q[1][i]0.1 is incremented. With each increment, the variable "a" is shifted to the right by one bit. The increment of the level value q[1][i]0.1 is repeated until the absolute value of the variable a0 is smaller than, or equal to, 4.

In a step 584, a 2-bit context value q[1][i].c of the context table q is set. The 2-bit context value q[1] [i].c is set to the value of zero if the currently decoded spectral value a is equal to zero. Otherwise, if the absolute value of the decoded spectral value a is smaller than, or equal to, 1, the 2-bit context value q[1][i].c is set to 1. Otherwise, if the absolute value of the currently decoded spectral value a is smaller than, or equal to, 3, the 2-bit context value q[1][i].c is set to 2. Otherwise, i.e. if the absolute value of the currently decoded spectral value a is larger than 3, the 2-bit context value q[1][i].c is set to 3. Accordingly, the 2-bit context value q[1][i].c is obtained by a very coarse quantization of the currently decoded spectral coefficient a.

In a subsequent step 586, which is only performed if the index i of the currently decoded spectral value is equal to the number lg of coefficients (spectral values) in the frame, that is, if the last spectral value of the frame has been decoded) and the core mode is a linear-prediction-domain core mode (which is indicated by "core_mode==1"), the entries q[1][j].c are copied into the context table qs [k]. The copying is performed as shown at reference numeral 586, such that the number lg of spectral values in the current frame is taken into consideration for the copying of the entries q[1][j].c to the context table qs [k]. In addition, the variable "previous_lg" takes the value 1024.

Alternatively, however, the entries q[1][j].c of the context table q are copied into the context table qs[j] if the index i of the currently decoded spectral coefficient reaches the value of lg and the core mode is a frequency-domain core mode (indicated by "core_mode==0").

In this case, the variable "previous_lg" is set to the minimum between the value of 1024 and the number lg of spectral values in the frame.

6.9 Summary of the Decoding Process

In the following, the decoding process will briefly be summarized. For details, reference is made to the above discussion and also to FIGS. 3, 4 and 5*a* to 5*i*.

The quantized spectral coefficients a are noiselessly coded and transmitted, starting from the lowest frequency coefficient and progressing to the highest frequency coefficient.

The coefficients from the advanced-audio coding (AAC) are stored in the array "x_ac_quant[g][win][sfb][bin]", and the order of transmission of the noiseless coding codewords is such, that when they are decoded in the order received and stored in the array, bin is the most rapidly incrementing index and g is the most slowly incrementing index. Index bin designates frequency bins. The index "sfb" designates scale factor bands. The index "win" designates windows. The index "g" designates audio frames.

The coefficients from the transform-coded-excitation are stored directly in an array "x_tcx_invquant[win][bin]", and the order of the transmission of the noiseless coding codewords is such that when they are decoded in the order received and stored in the array, "bin" is the most rapidly incrementing index and "win" is the most slowly incrementing index.

First, a mapping is done between the saved past context stored in the context table or array "qs" and the context of the current frame q (stored in the context table or array q). The past context "qs" is stored onto 2-bits per frequency line (or per frequency bin).

The mapping between the saved past context stored in the context table "qs" and the context of the current frame stored in the context table "q" is performed using the function "arith_map_context( )", a pseudo-program-code representation of which is shown in FIG. 5*a*.

The noiseless decoder outputs signed quantized spectral coefficients "a".

At first, the state of the context is calculated based on the previously-decoded spectral coefficients surrounding the quantized spectral coefficients to decode. The state of the context s corresponds to the 24 first bits of the value returned by the function "arith_get_context( )". The bits beyond the $24^{th}$ bit of the returned value correspond to the predicted bit-plane-level lev0. The variable "lev" is initialized to lev0. A pseudo program code representation of the function "arith_get_context" is shown in FIGS. 5*b* and 5*c*.

Once the state s and the predicted level "lev0" are known, the most-significant 2-bits wise plane m is decoded using the function "arith_decode( )", fed with the appropriated cumulative-frequencies-table corresponding to the probability model corresponding to the context state.

The correspondence is made by the function "arith_get_pk( )".

A pseudo-program-code representation of the function "arith_get_pk( )" is shown in FIG. 5*e*.

A pseudo program code of another function "get_pk" which may take the place of the function "arith_get_pk( )" is shown in FIG. 5*f*. A pseudo program code of another function "get_pk", which may take over the place of the function "arith_get_pk( )" is shown in FIG. 5*d*.

The value m is decoded using the function "arith_decode( )" called with the cumulative-frequencies-table, "arith_cf_m[pki][ ], where, pki" corresponds to the index returned by the function "arith_get_pk( )" (or, alternatively, by the function "get_pk( )").

The arithmetic coder is an integer implementation using the method of tag generation with scaling (see, e.g., K. Sayood "Introduction to Data Compression" third edition, 2006, Elsevier Inc.). The pseudo-C-code shown in FIG. 5*g* describes the used algorithm.

When the decoded value m is the escape symbol, "ARITH_ESCAPE", another value m is decoded and the variable "lev" is incremented by 1. Once the value m is not the escape symbol, "ARITH_ESCAPE", the remaining bit-planes are then decoded from the most-significant to the least-significant level, by calling "lev" times the function "arith_decode( )" with the cumulative-frequencies-table "arith_cf_r[ ]". Said cumulative-frequencies-table "arith_cf_r[ ]" may, for example, describe an even probability distribution.

The decoded bit planes r permit the refining of the previously-decoded value m in the following manner

```
a = m;
for (i=0; i<lev;i++) {
   r = arith_decode (arith_cf_r,2);
   a = (a<<1) | (r&1);
}
```

Once the spectral quantized coefficient a is completely decoded, the context tables q, or the stored context qs, is updated by the function "arith_update_context( )", for the next quantized spectral coefficients to decode.

A pseudo program code representation of the function "arith_update_context( )" is shown in FIG. 5*h*.

In addition, a legend of the definitions is shown in FIG. 5*i*.

7. Mapping Tables

In an embodiment according to the invention, particularly advantageous tables "ari_s_hash" and "ari_gs_hash" and "ari_cf_m" are used for the execution of the function "get_pk", which has been discussed with reference to FIG. 5*d*, or for the execution of the function "arith_get_pk", which has been discussed with reference to FIG. 5*e*, or for the execution of the function "get_pk", which was discussed with reference 5*f*, and for the execution of the function "arith_decode" which was discussed with reference to FIG. 5*g*.

7.1. Table "Ari_s_Hash[387]" According to FIG. 17

A content of a particularly advantageous implementation of the table "ari_s_hash", which is used by the function "get_pk" which was described with reference to FIG. 5*d*, is shown in the table of FIG. 17. It should be noted that the table of FIG. 17 lists the 387 entries of the table "ari_s_hash [387]". It should also be noted that the table representation of FIG. 17 shows the elements in the order of the element indices, such that the first value "0x00000200" corresponds to a table entry "ari_s_hash[0]" having element index (or table index) 0, such that the last value "0x03D0713D" corresponds to a table entry "ari_s_hash[386]" having element index or table index 386. It should further be noted her that "0x" indicates that the table entries of the table "ari_s_hash" are represented in a hexadecimal format. Furthermore, the table entries of the table "ari_s_hash" according to FIG. 17 are arranged in numeric order in order to allow for the execution of the first table evaluation 540 of the function "get_pk".

It should further be noted that the most-significant 24 bits of the table entries of the table "ari_s_hash" represent state values, while the least-significant 8-bits represent mapping rule index values pki.

Thus, the entries of the table "ari_s_hash" describe a "direct hit" mapping of a state value onto a mapping rule index value "pki".

7.2 Table "Ari_Gs_Hash" According to FIG. 18

A content of a particularly advantageous embodiment of the table "ari_gs_hash" is shown in the table of FIG. 18. It should be noted here that the table of table 18 lists the entries of the table "ari_gs_hash". Said entries are referenced by a one-dimensional integer-type entry index (also designated as "element index" or "array index" or "table index"), which is, for example, designated with "i". It should be noted that the table "ari_gs_hash" which comprises a total of 225 entries, is well-suited for the use by the second table evaluation 544 of the function "get_pk" described in FIG. 5*d*.

It should be noted that the entries of the table "ari_gs_hash" are listed in an ascending order of the table index i for table index values i between zero and 224. The term "0x" indicates that the table entries are described in a hexadecimal format. Accordingly, the first table entry "0X00000401" corresponds to table entry "ari_gs_hash[0]" having table index 0 and the last table entry "0Xffffff3f" corresponds to table entry "ari_gs_hash[224]" having table index 224.

It should also be noted that the table entries are ordered in a numerically ascending manner, such that the table entries are well-suited for the second table evaluation 544 of the function "get_pk". The most-significant 24 bits of the table entries of the table "ari_gs_hash" describe boundaries between ranges of state values, and the 8 least-significant bits of the entries describe mapping rule index values "pki" associated with the ranges of state values defined by the 24 most-significant bits.

7.3 Table "Ari_Cf_m" According to FIG. 19

FIG. 19 shows a set of 64 cumulative-frequencies-tables "ari_cf_m[pki][9]", one of which is selected by an audio encoder 100, 700, or an audio decoder 200, 800, for example, for the execution of the function "arith_decode", i.e. for the decoding of the most-significant bit-plane value. The selected one of the 64 cumulative-frequencies-tables shown in FIG. 19 takes the function of the table "cum_freq[ ]" in the execution of the function "arith_decode( )".

As can be seen from FIG. 19, each line represents a cumulative-frequencies-table having 9 entries. For example, a first line 1910 represents the 9 entries of a cumulative-frequencies-table for "pki=0". A second line 1912 represents the 9 entries of a cumulative-frequencies-table for "pki=1". Finally, a 64$^{th}$ line 1964 represents the 9 entries of a cumulative-frequencies-table for "pki=63". Thus, FIG. 19 effectively represents 64 different cumulative-frequencies-tables for "pki=0" to a "pki=63", wherein each of the 64 cumulative-frequencies-tables is represented by a single line and wherein each of said cumulative-frequencies-tables comprises 9 entries.

Within a line (e.g. a line 1910 or a line 1912 or a line 1964), a leftmost value describes a first entry of a cumulative-frequencies-table and a rightmost value describes the last entry of a cumulative-frequencies-table.

Accordingly, each line 1910, 1912, 1964 of the table representation of FIG. 19 represents the entries of a cumulative-frequencies-table for use by the function "arith_decode" according to FIG. 5*g*. The input variable "cum_freq[ ]" of the function "arith_decode" describes which of the 64 cumulative-frequencies-tables (represented by individual lines of 9 entries) of the table "ari_cf_m" should be used for the decoding of the current spectral coefficients.

7.4 Table "Ari_s_Hash" According to FIG. 20

FIG. 20 shows an alternative for the table "ari_s_hash", which may be used in combination with the alternative function "arith_get_pk( )" or "get_pk( )" according to FIG. 5*e* or 5*f*.

The table "ari_s_hash" according to FIG. 20 comprises 386 entries, which are listed in FIG. 20 in an ascending order of the table index. Thus, the first table value "0x0090D52E" corresponds to the table entry "ari_s_hash[0]" having table index 0, and the last table entry "0x03D0513C" corresponds to the table entry "ari_s_hash[386]" having table index 386.

The "0x" indicates that the table entries are represented in a hexadecimal form. The 24 most-significant bits of the entries of the table "ari_s_hash" describe significant states, and the 8 least-significant bits of the entries of the table "ari_s_hash" describe mapping rule index values.

Accordingly, the entries of the table "ari_s_hash" describe a mapping of significant states onto mapping rule index values "pki".

8. Performance Evaluation and Advantages

The embodiments according to the invention use updated functions (or algorithms) and an updated set of tables, as discussed above, in order to obtain an improved tradeoff between computation complexity, memory requirements, and coding efficiency.

Generally speaking, the embodiments according to the invention create an improved spectral noiseless coding.

The present description describes embodiments for the CE on improved spectral noiseless coding of spectral coefficients. The proposed scheme is based on the "original" context-based arithmetic coding scheme, as described in the working draft 4 of the USAC draft standard, but significantly reduces memory requirements (RAM, ROM), while maintaining a noiseless coding performance A lossless transcoding of WD3 (i.e. of the output of an audio encoder providing a bitstream in accordance with the working draft 3 of the USAC draft standard) was proven to be possible. The scheme described herein is, in general, scalable, allowing further alternative tradeoffs between memory requirements and encoding performance. Embodiments according to the invention aim at replacing the spectral noiseless coding scheme as used in the working draft 4 of the USAC draft standard.

The arithmetic coding scheme described herein is based on the scheme as in the reference model 0 (RM0) or the working draft 4 (WD4) of the USAC draft standard. Spectral coefficients previous in frequency or in time model a context. This context is used for the selection of cumulative-frequencies-tables for the arithmetic coder (encoder or decoder). Compared to the embodiment according to WD4, the context modeling is further improved and the tables holding the symbol probabilities were retrained. The number of different probability models was increased from 32 to 64.

Embodiments according to the invention reduce the table sizes (data ROM demand) to 900 words of length 32-bits or 3600 bytes. In contrast, embodiments according to WD4 of the USAC draft standard may use 16894.5 words or 76578 bytes. The static RAM demand is reduced, in some embodiments according to the invention, from 666 words (2664 bytes) to 72 (288 bytes) per core coder channel. At the same time, it fully preserves the coding performance and can even reach a gain of approximately 1.04% to 1.39%, compared to the overall data rate over all 9 operating points. All working draft 3 (WD3) bitstreams can be transcoded in a lossless manner without affecting the bit reservoir constraints.

The proposed scheme according to the embodiments of the invention is scalable: flexible tradeoffs between memory demand and coding performance are possible. By increasing the table sizes to the coding gain can be further increased.

Figure 10A:
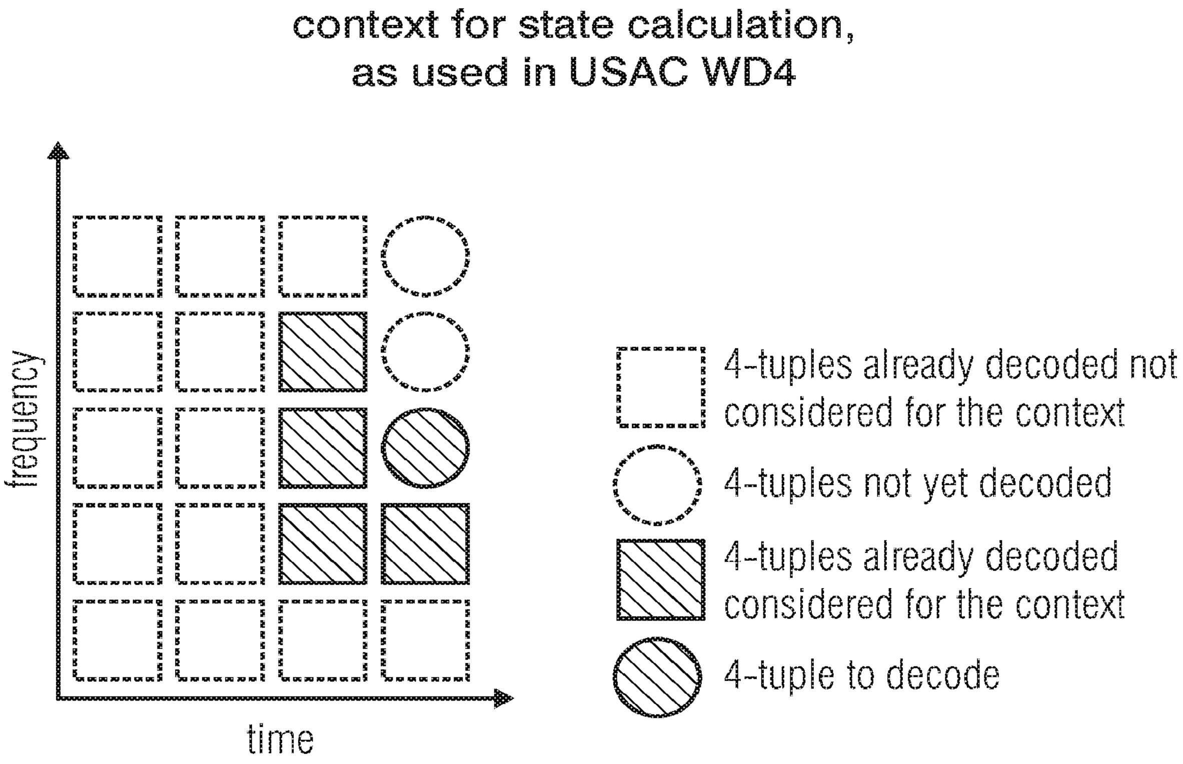
FIG. 10*a* shows a schematic representation of a context for a state calculation, as it is used in accordance with the working draft 4 of the USAC draft standard.

In the following, a brief discussion of the coding concept according to WD4 of the USAC draft standard will be provided to facilitate the understanding of the advantages of the concept described herein. In USAC WD4, a context based arithmetic coding scheme is used for noiseless coding of quantized spectral coefficients. As context, the decoded spectral coefficients are used, which are previous in frequency and time. According to WD4, a maximum number of 16 spectral coefficients are used as context, 12 of which are previous in time. Both, spectral coefficients used for the context and to be decoded, are grouped as 4-tuples (i.e. four spectral coefficients neighbored in frequency, see FIG. 10*a*). The context is reduced and mapped on a cumulative-frequencies-table, which is then used to decode the next 4-tuple of spectral coefficients.

For the complete WD4 noiseless coding scheme, a memory demand (ROM) of 16894.5 words (67578 bytes) may be used. Additionally, 666 words (2664 byte) of static ROM per core-coder channel may be used to store the states for the next frame.

The table representation of FIG. 11*a* describes the tables as used in the USAC WD4 arithmetic coding scheme.

A total memory demand of a complete USAC WD4 decoder is estimated to be 37000 words (148000 byte) for data ROM without a program code and 10000 to 17000 words for the static RAM. It can clearly be seen that the noiseless coder tables consume approximately 45% of the total data ROM demand. The largest individual table already consumes 4096 words (16384 byte).

It has been found that both, the size of the combination of all tables and the large individual tables exceed typical cache sizes as provided by fixed point chips for low-budget portable devices, which is in a typical range of 8-32 kByte (e.g. ARM9e, TIC64xx, etc.). This means that the set of tables can probably not be stored in the fast data RAM, which enables a quick random access to the data. This causes the whole decoding process to slow down.

In the following, the proposed new scheme will briefly be described.

To overcome the problems mentioned above, an improved noiseless coding scheme is proposed to replace the scheme as in WD4 of the USAC draft standard. As a context based arithmetic coding scheme, it is based on the scheme of WD4 of the USAC draft standard, but features a modified scheme for the derivation of cumulative-frequencies-tables from the context. Further on, context derivation and symbol coding is performed on granularity of a single spectral coefficient (opposed to 4-tuples, as in WD4 of the USAC draft standard). In total, 7 spectral coefficients are used for the context (at least in some cases). By reduction in mapping, one of in total 64 probability models or cumulative frequency tables (in WD4: 32) is selected.

Figure 10B:
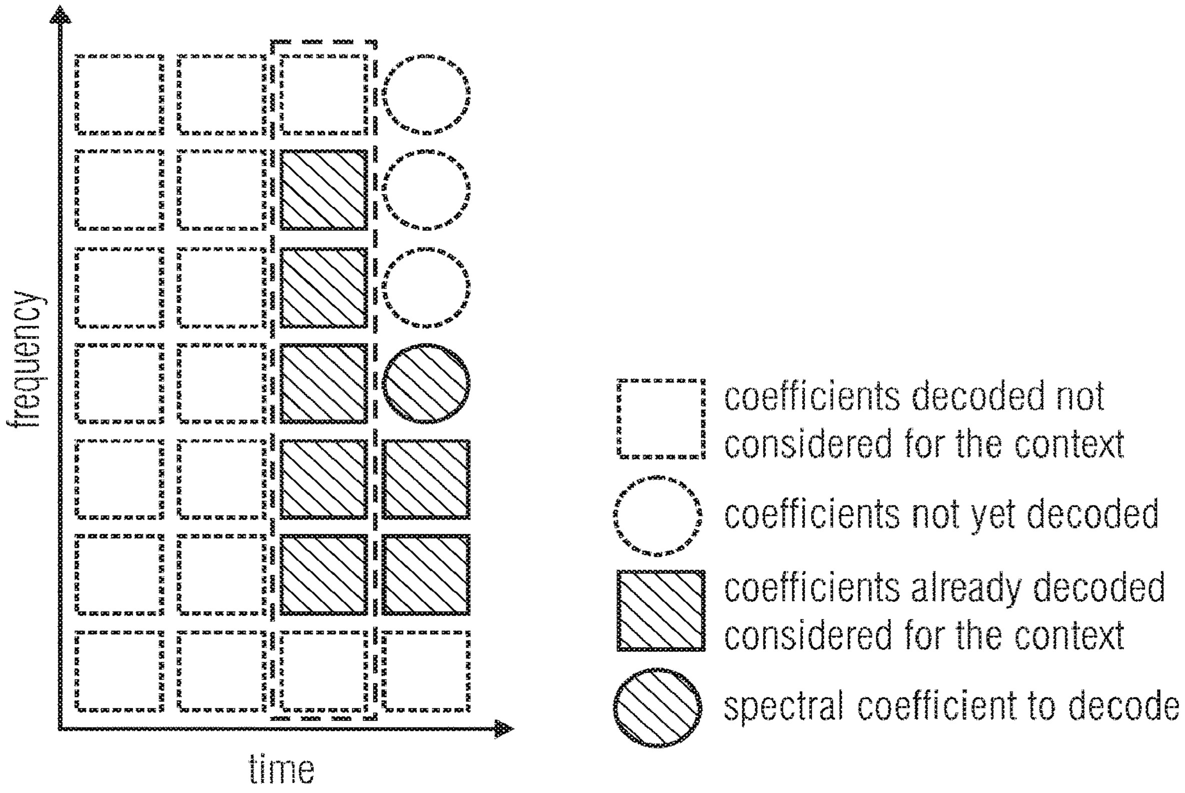
FIG. 10*b* shows a schematic representation of a context for a state calculation, as it is used in embodiments according to the invention.

FIG. 10*b* shows a graphical representation of a context for the state calculation, as used in the proposed scheme (wherein a context used for the zero region detection is not shown in FIG. 10*b*).

In the following, a brief discussion will be provided regarding the reduction of the memory demand, which can be achieved by using the proposed coding scheme. The proposed new scheme exhibits a total ROM demand of 900 words (3600 Bytes) (see the table of FIG. 11*b* which describes the tables as used in the proposed coding scheme).

Figure 12A:
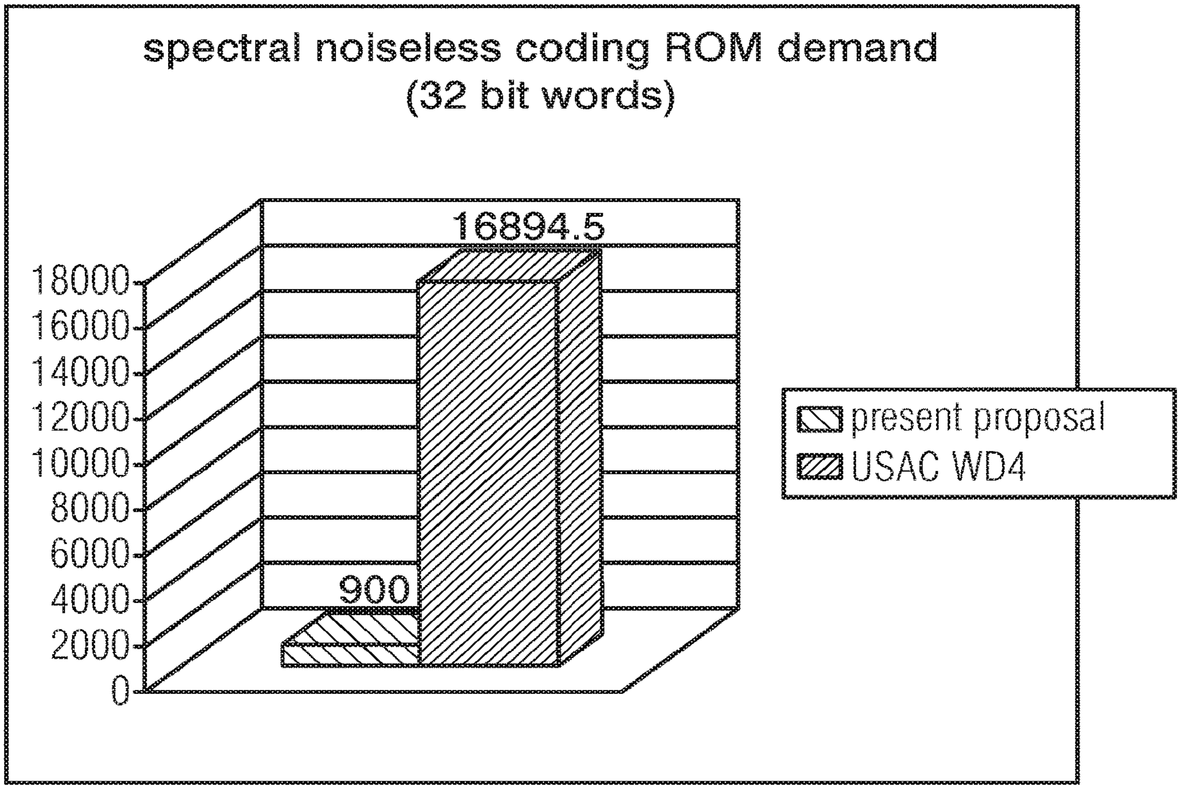
FIG. 12*a* shows a graphical representation of a read-only memory demand for the noiseless coding schemes according to the present invention and according to the working draft 4 of the USAC draft standard.
Figure 12B:
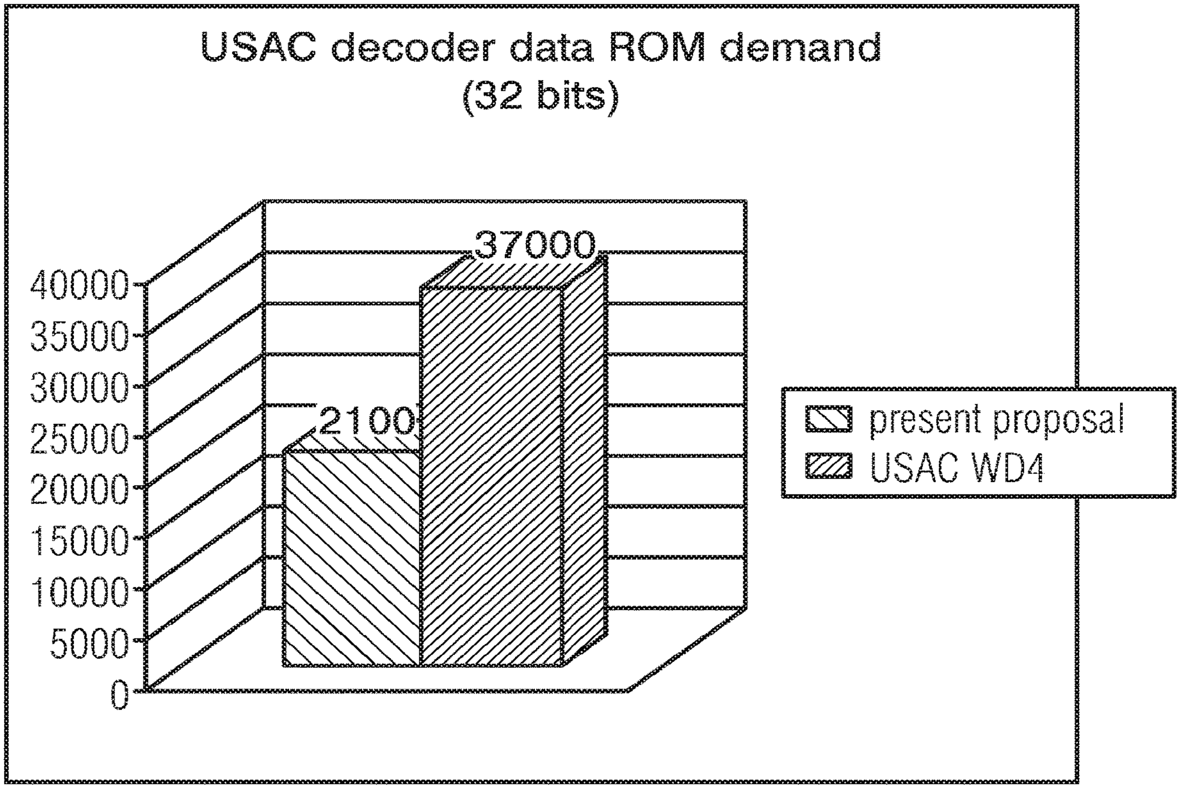
FIG. 12*b* shows a graphical representation of a total USAC decoder data read-only memory demand in accordance with the present invention and in accordance with the concept according to the working draft 4 of the USAC draft standard.

Compared to the ROM demand of the noiseless coding scheme in WD4 of the USAC draft standard, the ROM demand is reduced by 15994.5 words (64978 Bytes)(see also FIG. 12*a*, which figure shows a graphical representation of the ROM demand of the noiseless coding scheme as proposed and of the noiseless coding scheme in WD4 of the USAC draft standard). This reduces the overall ROM demand of a complete USAC decoder from approximately 37000 words to approximately 21000 words, or by more than 43% (see FIG. 12*b*, which shows a graphical representation of a total USAC decoder data ROM demand in accordance with WD4 of the USAC draft standard, as well as in accordance with the present proposal).

Further on, the amount of information needed for the context derivation in the next frame (static RAM) is also reduced. According to WD4, the complete set of coefficients (maximally 1152) with a resolution of typically 16-bits additional to a group index per 4-tuple of resolution 10-bits needed to be stored, which sums up to 666 words (2664 Bytes) per core-coder channel (complete USAC WD4 decoder: approximately 10000 to 17000 words).

The new scheme, which is used in embodiments according to the invention, reduces the persistent information to only 2-bits per spectral coefficient, which sums up to 72 words (288 Bytes) in total per core-coder channel. The demand on static memory can be reduced by 594 words (2376 Bytes).

Figure 9:
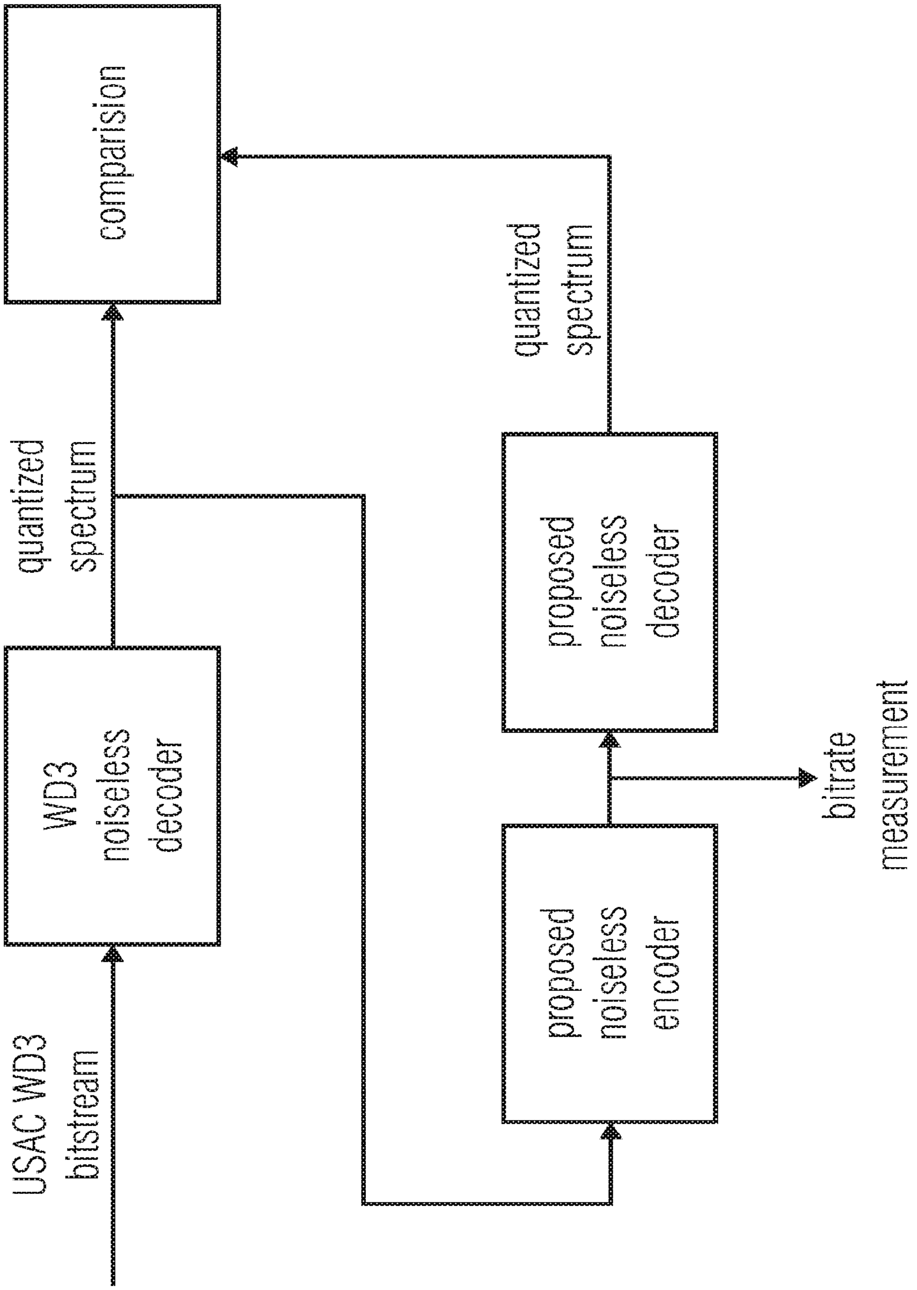
FIG. 9 shows an arrangement for a comparison of a noiseless coding according to a working draft 3 of the USAC draft standard with a coding scheme according to the present invention.

In the following, some details regarding a possible increase of coding efficiency will be described. The coding efficiency of embodiments according to the new proposal was compared against the reference quality bitstreams according to WD3 of the USAC draft standard. The comparison was performed by means of a transcoder, based on a reference software decoder. For details regarding the comparison of the noiseless coding according to WD3 of the USAC draft standard and the proposed coding scheme, reference is made to FIG. 9, which shows a schematic representation of a test arrangement.

Although the memory demand is drastically reduced in embodiments according to the invention when compared to embodiments according to WD3 or WD4 of the USAC draft standard, the coding efficiency is not only maintained, but slightly increased. The coding efficiency is on average increased by 1.04% to 1.39%. For details, reference is made to the table of FIG. 13*a*, which shows a table representation of average bitrates produced by the USAC coder using the working draft arithmetic coder and an audio coder (e.g., USAC audio coder) according to an embodiment of the invention.

By measurement of the bit reservoir fill level, it was shown that the proposed noiseless coding is able to losslessly transcode the WD3 bitstream for every operating point. For details, reference is made to the table of FIG. 13*b* which shows a table representation of a bit reservoir control for an audio coder according to the USAC WD3 and an audio coder according to an embodiment of the present invention.

Details on average bitrates per operating mode, minimum, maximum and average bitrates on a frame basis and a best/worst case performance on a frame basis can be found in the tables of FIGS. 14, 15, and 16, wherein the table of FIG. 14 shows a table representation of average bitrates for an audio coder according to the USAC WD3 and for an audio coder according to an embodiment of the present invention, wherein the table of FIG. 15 shows a table representation of minimum, maximum, and average bitrates of a USAC audio coder on a frame basis, and wherein the table of FIG. 16 shows a table representation of best and worst cases on a frame basis.

In addition, it should be noted that embodiments according to the present invention provide a good scalability. By adapting the table size, a tradeoff between memory requirements, computational complexity and coding efficiency can be adjusted in accordance with the requirements.

9. Bitstream Syntax

9.1. Payloads of the Spectral Noiseless Coder

In the following, some details regarding the payloads of the spectral noiseless coder will be described. In some embodiments, there is a plurality of different coding modes, such as for example, a so-called linear-prediction-domain, "coding mode" and a "frequency-domain" coding mode. In the linear-prediction-domain coding mode, a noise shaping is performed on the basis of a linear-prediction analysis of the audio signal, and a noise-shaped signal is encoded in the frequency-domain. In the frequency-domain mode, a noise shaping is performed on the basis of a psychoacoustic analysis and a noise-shaped version of the audio content is encoded in the frequency-domain Spectral coefficients from both, a "linear-prediction domain" coded signal and a "frequency-domain" coded signal are scalar quantized and then noiselessly coded by an adaptively context dependent arithmetic coding. The quantized coefficients are transmitted from the lowest-frequency to the highest-frequency. Each individual quantized coefficient is split into the most significant 2-bits-wise plane m, and the remaining less-significant bit-planes r. The value m is coded according to the coefficient's neighborhood. The remaining less-significant bit-planes r are entropy-encoded, without considering the context. The values m and r form the symbols of the arithmetic coder.

A detailed arithmetic decoding procedure is described herein.

9.2. Syntax Elements

In the following, the bitstream syntax of a bitstream carrying the arithmetically-encoded spectral information will be described taking reference to FIGS. 6*a* to 6*h*.

FIG. 6*a* shows a syntax representation of so-called USAC raw data block ("usac_raw_data_block( )").

The USAC raw data block comprises one or more single channel elements ("single_channel_element( )") and/or one or more channel pair elements ("channel_pair_element( )").

Taking reference now to FIG. 6*b*, the syntax of a single channel element is described. The single channel element comprises a linear-prediction-domain channel stream ("lpd_channel_stream( )") or a frequency-domain channel stream ("fd_channel_stream( )") in dependence on the core mode.

FIG. 6*c* shows a syntax representation of a channel pair element. A channel pair element comprises core mode information ("core_mode0", "core_mode1"). In addition, the channel pair element may comprise a configuration information "ics_info( )". Additionally, depending on the core mode information, the channel pair element comprises a linear-prediction-domain channel stream or a frequency-domain channel stream associated with a first of the channels, and the channel pair element also comprises a linear-prediction-domain channel stream or a frequency-domain channel stream associated with a second of the channels.

The configuration information "ics_mfo( )", a syntax representation of which is shown in FIG. 6*d*, comprises a plurality of different configuration information items, which are not of particular relevance for the present invention.

A frequency-domain channel stream ("fd_channel_stream( )"), a syntax representation of which is shown in FIG. 6*e*, comprises a gain information ("global_gain") and a configuration information ("ics_info( )"). In addition, the frequency-domain channel stream comprises scale factor data ("scale_factor_data( )"), which describes scale factors used for the scaling of spectral values of different scale factor bands, and which is applied, for example, by the scaler 150 and the rescaler 240. The frequency-domain channel stream also comprises arithmetically-coded spectral data ("ac_spectral_data( )"), which represents arithmetically-encoded spectral values.

The arithmetically-coded spectral data ("ac_spectral_data( )"), a syntax representation of which is shown in FIG. 6*f*, comprises an optional arithmetic reset flag ("arith_reset_flag"), which is used for selectively resetting the context, as described above. In addition, the arithmetically-coded spectral data comprise a plurality of arithmetic-data blocks ("arith_data"), which carry the arithmetically-coded spectral values. The structure of the arithmetically-coded data blocks depends on the number of frequency bands (represented by the variable "num_bands") and also on the state of the arithmetic reset flag, as will be discussed in the following.

The structure of the arithmetically-encoded data block will be described taking reference to FIG. 6*g*, which shows a syntax representation of said arithmetically-coded data blocks. The data representation within the arithmetically-coded data block depends on the number lg of spectral values to be encoded, the status of the arithmetic reset flag and also on the context, i.e. the previously-encoded spectral values.

The context for the encoding of the current set of spectral values is determined in accordance with the context determination algorithm shown at reference numeral 660. Details with respect to the context determination algorithm have been discussed above taking reference to FIG. 5*a*. The arithmetically-encoded data block comprises lg sets of codewords, each set of codewords representing a spectral value. A set of codewords comprises an arithmetic codeword "acod_m [pki] [m]" representing a most-significant bit-plane value m of the spectral value using between 1 and 20 bits. In addition, the set of codewords comprises one or more codewords "acod_r[r]" if the spectral value uses more bit planes than the most-significant bit plane for a correct representation. The codeword "acod_r [r]" represents a less-significant bit plane using between 1 and 20 bits.

If, however, one or more less-significant bit-planes may be used (in addition to the most-significant bit plane) for a proper representation of the spectral value, this is signaled by using one or more arithmetic escape codewords ("ARITH_ESCAPE"). Thus, it can be generally said that for a spectral value, it is determined how many bit planes (the most-significant bit plane and, possibly, one or more additional less-significant bit planes) may be used. If one or more less-significant bit planes may be used, this is signaled by one or more arithmetic escape codewords "acod_m [ph] [ARITH_ESCAPE]", which are encoded in accordance with a currently-selected cumulative-frequencies-table, a cumulative-frequencies-table-index of which is given by the variable pki. In addition, the context is adapted, as can be seen at reference numerals 664, 662, if one or more arithmetic escape codewords are included in the bitstream. Following the one or more arithmetic escape codewords, an arithmetic codeword "acod_m [ph] [m]" is included in the bitstream, as shown at reference numeral 663, wherein pki designates the currently-valid probability model index (taking into consideration the context adaptation caused by the inclusion of the arithmetic escape codewords), and wherein m designates the most-significant bit-plane value of the spectral value to be encoded or decoded.

As discussed above, the presence of any less-significant-bit planes results in the presence of one or more codewords "acod_r [r]", each of which represents one bit of the least-significant bit plane. The one or more codewords "acod_r [r]" are encoded in accordance with a corresponding cumulative-frequencies-table, which is constant and context-independent.

In addition, it should be noted that the context is updated after the encoding of each spectral value, as shown at reference numeral 668, such that the context is typically different for encoding of two subsequent spectral values.

FIG. 6*h* shows a legend of definitions and help elements defining the syntax of the arithmetically-encoded data block.

To summarize the above, a bitstream format has been described, which may be provided by the audio coder 100, and which may be evaluated by the audio decoder 200. The bitstream of the arithmetically-encoded spectral values is encoded such that it fits the decoding algorithm discussed above.

In addition, it should be generally noted that the encoding is the inverse operation of the decoding, such that it can generally be assumed that the encoder performs a table lookup using the above-discussed tables, which is approximately inverse to the table lookup performed by the decoder. Generally, it can be said that a man skilled in the art who knows the decoding algorithm and/or the desired bitstream syntax will easily be able to design an arithmetic encoder, which provides the data that is defined in the bitstream syntax and may be used by the arithmetic decoder.

10. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While the foregoing has been particularly shown and described with reference to particular embodiments above, it will be understood by those skilled in the art that various other changes in the forms and details may be made without departing from the sprit and cope thereof. It is to be understood that various changes may be made in adapting to different embodiments without departing from the broader concept disclosed herein and comprehended by the claims that follow.

11. Conclusion

To conclude, it can be noted that embodiments according to the invention create an improved spectral noiseless coding scheme. Embodiments according to the new proposal allows for the significant reduction of the memory demand from 16894.5 words to 900 words (ROM) and from 666 words to 72 (static RAM per core-coder channel). This allows for the reduction of the data ROM demand of the complete system by approximately 43% in one embodiment. Simultaneously, the coding performance is not only fully maintained, but on average even increased. A lossless transcoding of WD3 (or of a bitstream provided in accordance with WD3 of the USAC draft standard) was proven to be possible. Accordingly, an embodiment according to the invention is obtained by adopting the noiseless decoding described herein into the upcoming working draft of the USAC draft standard.

To summarize, in an embodiment the proposed new noiseless coding may engender the modifications in the MPEG USAC working draft with respect to the syntax of the bitstream element "arith_data( )" as shown in FIG. 6*g*, with respect to the payloads of the spectral noiseless coder as described above and as shown in FIG. 5*h*, with respect to the spectral noiseless coding, as described above, with respect to the context for the state calculation as shown in FIG. 4, with respect to the definitions as shown in FIG. 5*i*, with respect to the decoding process as described above with reference to FIGS. 5*a*, 5*b*, 5*c*, 5*e*, 5*g*, 5*h*, and with respect to the tables as shown in FIGS. 17, 18, 20, and with respect to the function "get_pk" as shown in FIG. 5*d*. Alternatively, however, the table "ari_s_hash" according to FIG. 20 may be used instead of the table "ari_s_hash" of FIG. 17, and the function "get_pk" of FIG. 5*f* may be used instead of the function "get_pk" according to FIG. 5*d*.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio decoder for providing a decoded audio information on the basis of an encoded audio information, the audio decoder comprising:

an arithmetic decoder for providing a plurality of decoded spectral values on the basis of an arithmetically-encoded representation of the spectral values; and a frequency-domain-to-time-domain converter for providing a time-domain audio representation using the decoded spectral values, in order to acquire the decoded audio information;

wherein the arithmetic decoder is configured to select a mapping rule describing a mapping of a code value onto a symbol code in dependence on a context state; and wherein the arithmetic decoder is configured to determine the current context state in dependence on a plurality of previously-decoded spectral values, wherein the arithmetic decoder is configured to detect a group of a plurality of previously-decoded adjacent spectral values which, taken together, comprise a magnitude which is smaller than a predetermined threshold magnitude, and to modify the current context state in dependence on a result of the detection by setting the current context state to be within a range of values which signals the detection of a group of a plurality of previously-decoded adjacent spectral values which fulfill, taken together, a predetermined condition regarding their magnitudes, in response to the detection;

wherein the audio decoder is implemented using a hardware apparatus, or using a computer, or using a combination of a hardware apparatus and a computer.

2. The audio decoder according to claim 1, wherein the arithmetic decoder is configured to determine or modify the current context state independent from the previously decoded spectral values in response to the detection that the predetermined condition is fulfilled.

3. The audio decoder according to claim 1, wherein the arithmetic decoder is configured to detect a group of a plurality of previously-decoded adjacent spectral values, which fulfill, individually or taken together, a predetermined condition regarding their magnitudes.

4. The audio decoder according to claim 1, wherein the arithmetic decoder is configured to detect a group of a plurality of previously-decoded adjacent spectral values which, individually or taken together, comprise a magnitude which is smaller than a predetermined threshold magnitude, and to determine or modify the current context state in dependence on a result of the detection.

5. The audio decoder according to claim 1, wherein the arithmetic decoder is configured to detect a group of a plurality of previously-decoded adjacent spectral values, wherein each of the previously-decoded spectral values is a zero value, and to determine or modify the context state in dependence on a result of the detection.

6. The audio decoder according to claim 1, wherein the arithmetic decoder is configured to detect a group of a plurality of previously-decoded adjacent spectral values, which comprise a sum value which is smaller than a predetermined threshold value, and to determine or modify the current state in dependence on a result of the detection.

7. The audio decoder according to claim 1, wherein the arithmetic decoder is configured to set the current context state to a predetermined value in response to the detection that a group of a plurality of previously-decoded adjacent spectral values fulfill, individually or taken together, a predetermined condition regarding their magnitudes.

8. The audio decoder according to claim 7, wherein the arithmetic decoder is configured to selectively omit a calculation of the context state in dependence on numeric values of a plurality of previously-decoded spectral values in response to the detection that a group of a plurality of previously-decoded adjacent spectral values fulfill, individually or taken together, a predetermined condition regarding their magnitudes.

9. The audio decoder according to claim 1, wherein the arithmetic decoder is configured to set the current context state to be within a range of values which signals the detection of a group of a plurality of previously-decoded adjacent spectral values which fulfill, individually or taken together, a predetermined condition regarding their magnitudes, in response to the detection.

10. The audio decoder according to claim 1, wherein the arithmetic decoder is configured to map a symbol code onto a decoded spectral value.

11. The audio decoder according to claim 1, wherein the arithmetic decoder is configured to evaluate previously-decoded spectral values of a first time-frequency region, to detect a group of a plurality of spectral values which fulfill, individually or taken together, the predetermined condition regarding their magnitudes, and wherein the arithmetic decoder is configured to acquire a numeric value representing the context state if the predetermined condition is not fulfilled, in dependence on previously-decoded spectral values of a second time-frequency region which is different from the first time-frequency region.

12. The audio decoder according to claim 1, wherein the arithmetic decoder is configured to evaluate one or more hash tables to select a mapping rule in dependence on the context state.

* * * * *